(12) United States Patent
Gattani et al.

(10) Patent No.: US 8,315,849 B1
(45) Date of Patent: Nov. 20, 2012

(54) SELECTING TERMS IN A DOCUMENT

(75) Inventors: Abhishek Gattani, Sunnyvale, CA (US);
Anand Rajaraman, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 294 days.

(21) Appl. No.: 12/757,899

(22) Filed: Apr. 9, 2010

(51) Int. Cl.
*G06F 17/28* (2006.01)

(52) U.S. Cl. ........ 704/2; 704/3; 704/9; 704/10; 704/257

(58) Field of Classification Search ............... None
See application file for complete search history.

(56) References Cited

U.S. PATENT DOCUMENTS

| | | | |
|---|---|---|---|
| 5,708,825 A | 1/1998 | Sotomayor | |
| 5,920,859 A | 7/1999 | Li | |
| 6,230,168 B1 | 5/2001 | Unger et al. | |
| 7,788,265 B2 | 8/2010 | Morscher et al. | |
| 2001/0018704 A1 | 8/2001 | Kikugawa | |
| 2007/0073678 A1* | 3/2007 | Scott et al. | 707/5 |
| 2007/0073745 A1* | 3/2007 | Scott et al. | 707/100 |
| 2007/0203789 A1 | 8/2007 | Jain et al. | |
| 2010/0042487 A1 | 2/2010 | Barazani | |
| 2011/0184718 A1* | 7/2011 | Chen | 704/2 |

* cited by examiner

*Primary Examiner* — Leonard Saint Cyr
(74) *Attorney, Agent, or Firm* — David R. Stevens; Stevens Law Group

(57) ABSTRACT

Determining a mapping between a textual representation in a document and a concept is disclosed. A document is received. A set of candidate textual representations in the document is identified. For at least one candidate textual representation included in the set, an associated concept included in a taxonomy of concepts is determined. The candidate textual representation and the associated concept are provided as output.

20 Claims, 37 Drawing Sheets

Joe's Space Blog                                    | Sign In

NASA Unveils Latest Results From Lunar ─252
Mission, Helps Prepare for Next Stage of ─254
Scientific Discovery   Tags: Lunar Reconnaissance Orbiter, Cameras 256─ ─260
NASA's current mission in orbit around the moon, the Lunar Reconnaissance Orbiter, or LRO, has been providing crucial insights about our nearest celestial neighbor since its launch in June. At a scientific meeting today, researchers unveiled the latest findings from three instruments of the powerful suite of seven aboard the satellite. LRO is expected to return more data about the moon than all previous orbital missions combined.

─258
At the American Geophysical Union meeting in San Francisco, scientists discussed the latest findings from the LRO Camera, or LROC, the Cosmic Ray Telescope for the Effects of Radiation, or CRaTER, and the Diviner Lunar Radiometer Experiment. Each instrument is returning surprising data and helping scientists map the moon in incredible detail and understand the lunar environment.

─262
LROC has now mapped in high resolution all the Apollo landing sites and 50 sites that were identified by NASA's Constellation Program to be representative of the wide range of terrains present on the moon.

"From a practical, scientific standpoint, the Apollo landing sites have served as a fantastic source of calibration for the LROC Narrow Angle Cameras," said Mark Robinson, LROC principal investigator at Arizona State University in Tempe. "Since the locations of some of the hardware left by the astronauts are known to about nine feet absolute accuracy, we can tie the Narrow Angle Camera geometric and timing calibration to the coordinates of the Apollo Laser Ranging Retroreflectors and Apollo Lunar Surface Experiments Packages. This ground truth enables more accurate coordinates to be derived for virtually anywhere on the moon. Scientists are currently analyzing brightness differences of the surface material stirred up by the Apollo astronauts, comparing them with the local surroundings to estimate physical properties of the surface material. Such analyses will provide critical information for interpreting remote sensing data from LRO, as well as from India's Chandrayaan-1, and Japan's Kaguya missions."

⋮

Comments aly22 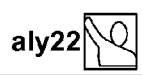   This is great! I want to be a spaceman!
Their helmets are super cool.

FIG. 2B

| ID | Textual Representation | Concept | Score ⟋⁷⁰² | Concept ID |
|---|---|---|---|---|
| [01] | Lunar Reconnaissance Orbiter | Lunar Reconnaissance Orbiter | 0.6042296290039764 | 2381014 |

Feature Vector
TitleTF=0, BodyTF=1, NLP=1, IDF=1655, DocSim=2.26767, Case=3, Position=154, NumWords=3, Homonyms=0,...

...

| ID | Textual Representation | Concept | Score ⟋⁷⁰⁴ | Concept ID |
|---|---|---|---|---|
| [24] | scientific meeting | academic conference | 0.0768521353602409 | 118760 |

Feature Vector
TitleTF=0, BodyTF=1, NLP=0.75, IDF=9759, DocSim=0.0255364, Case=0, Position=298, NumWords=2, Homonyms=0,...

FIG. 7

Medical Forum Site | Register

Home > Health Issues > Diabetes

Fred22
Member since 2002
Posts: 22

Yesterday my doctor told me that I have Type 2 Diabetes. ⌐1002

Basically, I have high blood sugar, high LDL, and low HDL. It turns out I also have low testosterone and supposed to make an appointment with an endocrinologist to see if there is any correlation between the high blood sugar and low testosterone. He doesn't think so but would feel better if an expert checks me out.
1010

Thanks for listening. Anyone have any thoughts?

JanetQ
Member since 2003
Posts: 13

Welcome, Fred! ⌐1004

I was diagnosed with T1 in 1986. One important thing is to learn how to carb count and to test 2 hours after you eat to see how the carbs you ate affected you. Your meter will tell you if what you ate is ok for you or not. You will figure out pretty quickly what works and what doesn't.

The good news is you can live a long, happy, healthy, and fun-filled life with diabetes. It just takes a bit of work. There are lots of T2s on this board who can share their experiences in controlling things with diet/exercise alone or along with meds. ⌐1006

Fred22
Member since 2004
Posts: 23

One thing that has me puzzled is that the doctor did not discuss using a glucose meter at all. Do you think is waiting to see what the endo finds/says? He did tell me that if the endo finds nothing connecting my symptoms, that he would then proceed with treating my diabetes.

Is a glucose meter something that I should get on my own? I'm guessing no, but would like to hear what others think. ⌐1008

Also, he prescribed 500mg of Metformin, once a day with food.

FIG. 10

Pet Forum | Register

Home > Health Issues > Diagnosis  ⌒1302

BillyOO
Member since 2002
Posts: 22

My dog has a rash on his belly.
What could it be?

No Replies Yet. ⌒1304

Causes of Dog Skin Disorders ⌒1306

Most dog skin disorders are immune system related:
- demodectic mange,
- eczema,
- scalp psoriasis,
- ringworm,
- seborrheic dermatitis,
- yeast infection Other disorders:
- scabies

Customize Your News | Register

Add Interest Wizard

Business and Finance

US and World

Sports

Entertainment

Science and Technology ─1402

Health

Lifestyle

A. Select Popular Interests

☐ Business ☐ Venture Capital ☐ Real Estate
☒ Internet Industry ☐ Housing Market Crisis ☐ Wireless Industry
☐ Gas Prices ☐ Electronics Industry ☒ Stock Market
☐ Online Advertising

B. Enter Specific Interest

What companies interest you?
[ Acme Corp. ]─1406

What market news or economic issues concern you?
[ ]─1408

Other Business and Finance Interests?
[ Price of gold ]─1410

Ok, Next Section >>
I'm Done ─1404

```
    ...
1702~ Car Manufacturers | Transportation | 20 ~1714
1704~ Transportation | Society | 20
    ...
1706~ Honda | Car Manufacturers | 10 ~1716
1708~ Honda Civic | Honda | 10
1710~ Honda Civic RX | Honda Civic | 10
    ...
1712~ Car Manufacturers | Kosmix Autos | 5 ~1718
    ...
```

FIG. 17A

```
    Kosmix Root      :     000000
    Kosmix Autos     :     000001
    Kosmix Nature    :     000002
    Kosmix Health    :     000003
    ...
    Jaguar_animal    :     103816
    Rabbit           :     103817
    ...
    Honda Civic RX   :     938173
    ...
```

FIG. 17B

```
    Jaguar | Jaguar_car | 20 | {hom}
    Jaguar | Jaguar_animal | 20 | {hom}
    Jaguar | Mac OS Jaguar | ...
    ...
    Puma | Cougar | 20 | {syn}
    Mountain Lion | Cougar | 20 | {syn}
    Panther | Cougar | 20 | {syn}
```

FIG. 17C

```
1780~ Parent:Countries by Continent   1    3
1782~ Parent:Living People           -1    1
```

FIG. 17D

```
           1906  1908  1910  1912       1914              1916    1918    1920
            ⌒    ⌒     ⌒     ⌒           ⌒                ⌒       ⌒      ⌒
...
Ronald Reagan:U.S. President   var:3 vcor:0 tmpl:1 stree:0 arcrnk:15 occ:m pocc:w cooc:y
Ronald Reagan:Actor            var:3 vcor:0 tmpl:0 stree:0 arcrnk:15 occ:m pocc:x cooc:z
...
 ⌒              ⌒
1902           1904
```

FIG. 19

SELECTING TERMS IN A DOCUMENT

BACKGROUND OF THE INVENTION

Manually determining which words in a document are keywords or are otherwise of more relevance and/or interest than other words in the document is typically a time consuming process and is thus generally not appropriate when used in conjunction with a large corpus of documents. Attempts to automatically determine such words are also problematic. For example, one automated approach is to count the number of occurrences of each word in the document and designate as "key" words those occurring the most frequently. Unfortunately, the most frequently occurring words may not be what a human would consider to be the most important. Automatic attempts to select particular words are generally further exacerbated if the document includes complexities such as contractions, slang usages, and acronyms.

BRIEF DESCRIPTION OF THE DRAWINGS

Various embodiments of the invention are disclosed in the following detailed description and the accompanying drawings.

FIG. 2B illustrates an embodiment of a portion of a web page as rendered in a browser.

FIG. 7 illustrates an example of a portion of output generated by a document processing engine.

FIG. 10 illustrates an embodiment of a portion of a webpage as rendered in a browser.

FIG. 13 illustrates an embodiment of a portion of a webpage as rendered in a browser.

FIG. 14 illustrates an embodiment of a portion of a webpage as rendered in a browser.

FIG. 17A is a portion of an arc list according to one embodiment.

FIG. 17B is a portion of a vertex list according to one embodiment.

FIG. 17C is a portion of an arc list according to one embodiment.

FIG. 17D is a portion of a subtree preferences list according to one embodiment.

FIG. 19 illustrates an example of a vector of weights according to one embodiment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
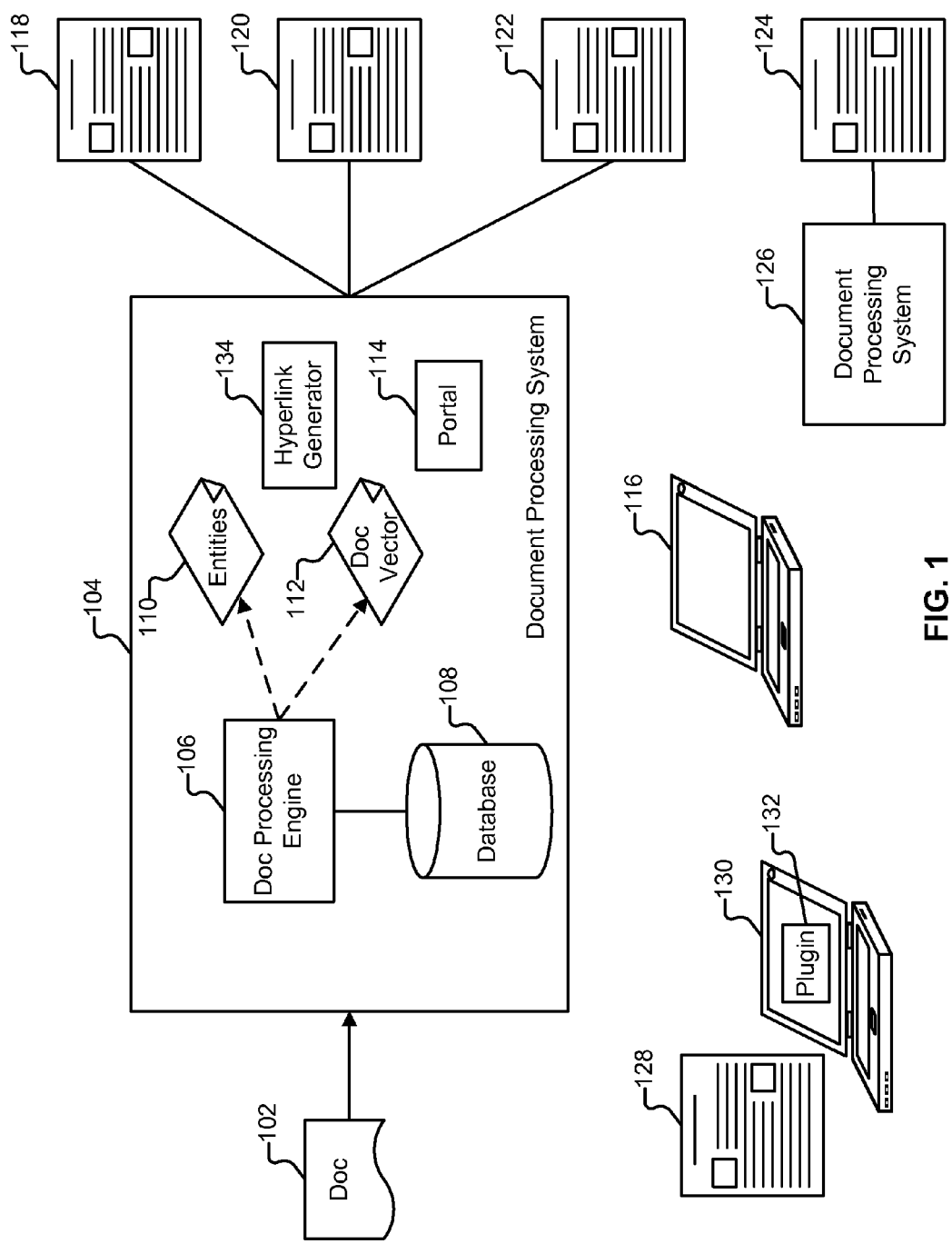
FIG. 1 illustrates an embodiment of an environment in which documents are processed.

FIG. 1 illustrates an embodiment of an environment in which documents are processed. In the example shown, a user of client 116 (hereinafter "Alice") uses a web browser to access a variety of sites 118-124. Site 118 hosts a blog that belongs to Alice's friend, Joe. Joe uses site 118 to make astronomy-related blog posts and to engage in discussions with readers of his blog via a commenting feature. Site 120 is a medically-themed message board on which users discuss various medical conditions and other topics with one another. Site 122 is a news aggregation service. Visitors to site 122 provide information about their interests and are provided with personalized news feeds. Site 124 belongs to the company for which Alice works, Acme Corporation. Site 124 securely makes available internal documents to users such as Alice that have appropriate credentials.

In the example shown, documents, such as document 102, are provided to document processing system 104 for processing. Examples of documents include blog posts made on site 118, forum messages exchanged on site 120, news articles made available through site 122, the various types of documents served by site 124, and any other text (in formats such as HTML, TXT, PDF, etc.) as applicable.

In various embodiments, for a given document 102, document processing engine 106 produces two types of output—a list of entities 110 and a document vector 112. As used herein, an entity is a pair of items—a textual representation (i.e., a string of text appearing in the document) and a concept associated with the textual representation. Unlike the textual representation (which is literally present in the document), the associated concept need not be literally present in the document. Instead, the concept is present in a taxonomy, such as is stored in database 108.

As one example, suppose a news article describes the saving of a baby from a fire by a dog. An excerpt from the article reads "The small, heroic sheltie saved baby Fred on Tuesday." When the article is provided to system 104, one example of an entity 110 that is generated is ("sheltie", "Shetland Sheepdog"). The first portion of the pair (the textual representation) is the fourth word of the excerpt. The second portion of the pair is the associated concept that is included in a taxonomy of concepts—the canonical name of the breed of dog also known as a "sheltie." Document vector 112 is a ranked list of concepts associated with the document. An example of a document vector 112 for the dog article is: (pets:10, dogs:6, Shetland Sheepdog:4, arson:2) with each concept having an associated score. In various embodiments, the associated scores are normalized between 0 and 1.

The administrators of sites 118-122 (also referred to herein as "publishers") each communicate with system 104 via portal 114. Through the portal, they configure information about their respective sites and also specify preferences for how the processing of system 104 is performed with respect to their documents. Joe (the owner of site 118) has specified that system 104 should automatically tag the blog posts that he writes with appropriate keywords and should also insert hyperlinks into the posts that lead to informative topical pages. He is too busy to include such links in his posts when he writes them and uses system 104 to improve the experience of his readers. In some embodiments, if advertisements are displayed on the topical pages to which Joe's pages link, he is afforded a share of the revenue generated from the advertisements. Tags and links are generated by Joe's blog software, in conjunction with an application program interface (API) provided by system 104, when he submits a new entry.

The administrator of site 120 has configured the site to prohibit, for security and spam minimization reasons, message board contributors from including hyperlinks in their messages. When viewers access site 120, however, posts appear to include relevant, informative links. As with Joe's blog, many of the links direct users to custom generated topical pages. In addition, for concepts that monetize well (e.g., diet drugs), a small number of links to advertising sites (or sites other than the topical pages) are included. Links can also direct users to other pages within the publisher's site or network of sites.

The administrator of site 120 provides various configuration information to system 104. System 104 makes available to the administrator a snippet of JavaScript code that is embedded in each page of site 120. When visitors to site 120 retrieve content from the site, execution of the embedded JavaScript results in the text of the page being viewed (i.e. a page of message board posts) being provided to system 104, a set of entities determined, and an appropriate set of hyperlinks being included in the page as rendered. The links can be configured to appear as any other links that might be present (i.e., using the same color scheme) but can also be made to appear different from other links. Behavior such as whether following a link should open the new page in the same window or a new window can also be specified. Unlike the approach used by site 118 (in which static links are generated once, at the time the article is created), which terms are linked and the destination pages associated with those links can change over time. Links can also open an overlay on hover, or on click, which displays content and/or advertisements that are relevant to the linked concept. For example, if a famous rock musician is selected for linking, on the click of a user, an overlay can be created that includes music videos associated with that rock musician.

When users of site 122 first visit the site, they provide a list of topics that are of interest to them. Examples include "entrepreneurism" and "dog health." When new news articles are detected by site 122, they are processed (via an API) by system 104. System 104 provides back to site 122 a document vector 112. As will be described in more detail below, articles are selectively provided to users based on the user's interests and the concepts included in the articles' document vectors.

In the environment shown, Acme Corporation owns a document processing system 126 that provides functionality similar to that of system 104. System 126 is configured to receive as input various internal documents and to categorize and summarize those documents in accordance with the techniques described herein.

The techniques described herein can also be used to process documents without the explicit cooperation of a publisher or other document source. For example, client 130 includes a web browser application that is configured to use a plugin 132 that is in communication with site 104. When a user of client 130 visits a page on website 128, the plugin provides a copy of the page to system 104. System 104 processes the document in accordance with the techniques described herein and provides information to plugin 132 that is used when the browser application renders the page for the user. Plugin 132 can be configured to provide a variety of enhancements to the user's viewing experience pages. As one example, the browser can include additional links in the rendered page (similar to the functionality of site 120). The browser can also provide a separate window, frame, or sidebar into which information, such as a summary of the page, key terms in the page, concepts related to the page, and even custom widgets/modules, are displayed, without altering the rendering of the page itself.

In the example shown in FIG. 1, system 104 comprises standard commercially available server hardware (e.g., having a multi-core processor, 4G+ of RAM, and Gigabit network interface adaptors) running a typical server-class operating system (e.g., Linux). In various embodiments, system 104 is implemented across a scalable infrastructure comprising multiple such servers, solid state drives, and other applicable high-performance hardware.

Whenever system 104 is described as performing a task (such as communicating with a client or accessing information in a database), either a single component or a subset of components or all components of system 104 may cooperate to perform the task. Similarly, whenever a component of system 104 is described as performing a task, a subcomponent may perform the task and/or the component may perform the task in conjunction with other components. In various embodiments, portions of system 104 are provided by one or more third parties. As one example, database 108 stores a taxonomy comprising millions of concepts. The taxonomy can be created by system 104 (using techniques described in more detail below) and can also be supplied to system 104 by a separate component, or by a third party. As another example, database 108 also includes various statistical information, such as inverse document frequency information, that can be periodically computed by system 104, supplied by a separate component, or provided by a third party.

Figure 2A:
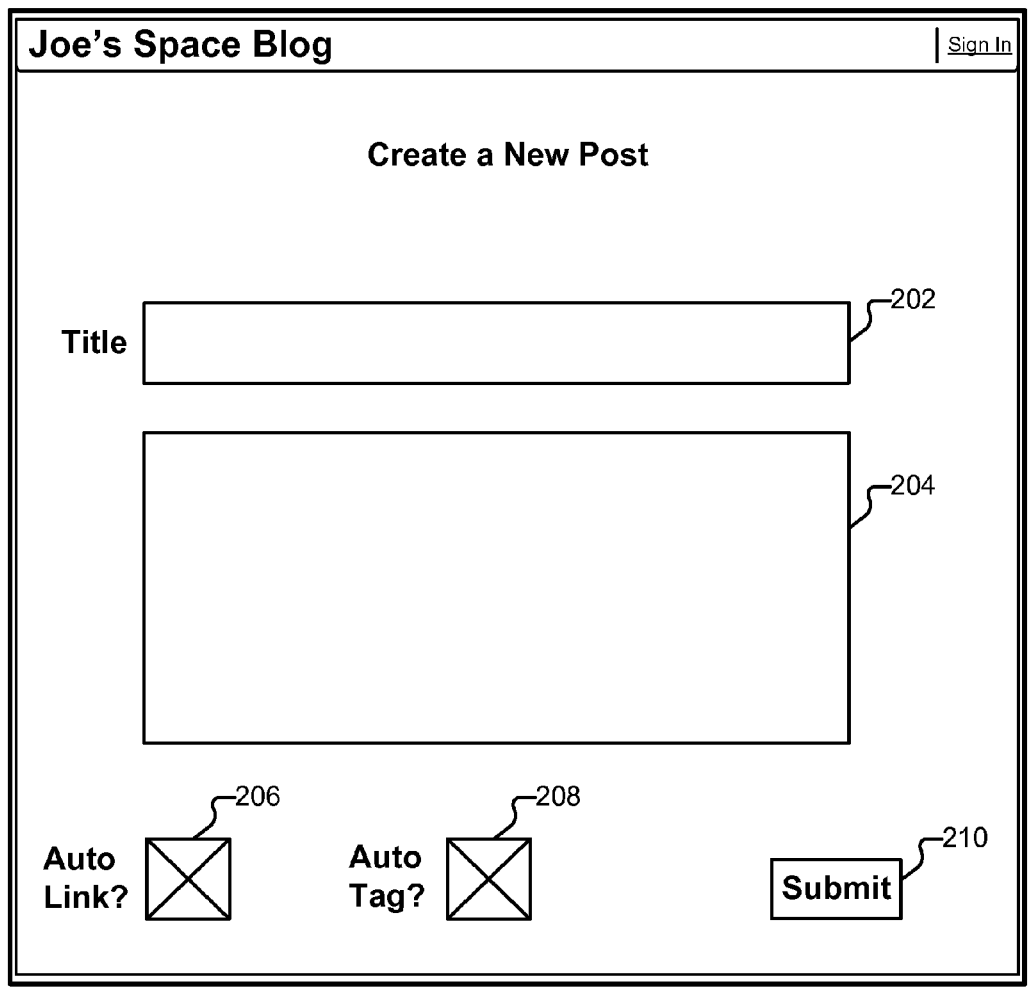
FIG. 2A illustrates an embodiment of a portion of a web page as rendered in a browser.

FIG. 2A illustrates an embodiment of a portion of a web page as rendered in a browser. In the example shown, Joe is preparing to make a new blog post. He is asked to supply a title for the post in region 202 and to provide the body of the post in region 204. By selecting box 206, Joe is indicating that he would like system 104 to automatically select portions of the body of his post and generate hyperlinks for those portions. Joe may choose to select this box because he is too busy to carefully annotate his post. Another reason Joe may choose to select this box is because he is unsure of which terms he should select to link and/or which destination pages would be best to link to for a given term. By selecting box 208, Joe is indicating that he would like system 104 to automatically tag the post with a few key concepts.

FIG. 2B illustrates an embodiment of a portion of a web page as rendered in a browser. The page shown in FIG. 2B was created as a result of Joe supplying a title 252 and a body of text 256 to the interface shown in FIG. 2A. When Joe selected submit button 210, title 252 and body 256 were transmitted by Joe's blog server software to system 104. System 104 processed the received title and body (collectively, a document) and returned to site 118 a set of tags to be included in region 254 and instructions on which phrases in body 256 should have associated hyperlinks, as well as URL information for each such hyperlink.

Using techniques described in more detail below, system 104 was able to determine that Joe's post pertains to the Lunar Reconnaissance Orbiter, as well as to cameras, as indicated in region 254. System 104 also determined that a total of ten hyperlinks should be included and that those ten hyperlinks should be distributed with a higher concentration of links toward the top portion of the body and a more sparse distribution of links toward the bottom.

As mentioned above, system 104 allows Joe to configure, via portal 114, a variety of preferences for how system 104 processes his documents. As one example, Joe can specify constraints on where visitors will be directed by the inserted hyperlinks. In the example shown in FIG. 2B, Joe has made the following customization choices: (1) When businesses or organizations mentioned in his articles are selected by system 104, Joe would like visitors to be directed to the canonical websites of those locations. Thus, if a visitor such as Alice were to click on link 258, she would be directed to www.agu.org, the main site of the American Geophysical Union. In various embodiments, this is made possible by the taxonomy stored in database 108, including information such as an associated website for each concept, or for some subset of concepts. The associated website can be scraped and can also be manually included in the taxonomy by an administrator of system 104 and/or by a representative of the business/organization, such as via portal 114. (2) When a phrase selected (that is not a business or organization) has a corresponding entry in Wikipedia, Joe would like visitors to be directed to the appropriate Wikipedia page. Thus, if a visitor were to click on link 260, he would be directed to http://en.wikipedia.org/wiki/Lunar_Reconnaissance_Orbiter, a Wikipedia entry about the orbiter. (3) Finally, for any phrases selected by system 104 which do not match either of the aforementioned situations, Joe would like visitors to be directed to an automatically generated topic page (described in more detail below). When Joe's visitors are directed to the automatically generated topic page, Joe will receive a portion of any advertising revenue generated by those visitors as they encounter advertisements on the automatically generated topic page.

Joe has selected three different types of destination URLs because he believes that the customizations he has made will result in the most appealing experience for his visitors. Joe can also leave the URL selection up to system 104 entirely, can specify that only phrases with corresponding Wikipedia pages be linked (even if it results in fewer than ten hyperlinks being inserted), can specify that links to those topic pages generating the most revenue be preferred over other links, etc.

Joe can also customize how and which tags (254) are selected. One purpose of tagging a post is to allow visitors who are interested in one of the tagged subjects to quickly find other blog posts on the site that pertain to that subject by clicking on the appropriate tag. Rather than selecting tags 254 from among all of the potentially millions of concepts stored in database 108, Joe has specified that system 104 should select tags only from those tags already in use on his site. If he chooses, Joe can instead specify that tags be selected from a list of 50 subjects he has previously specified as being acceptable, can specify that he be prompted by site 118 to approve any tags selected by system 104 that have not previously be used on site 118, or other any other appropriate configuration.

Figure 3:
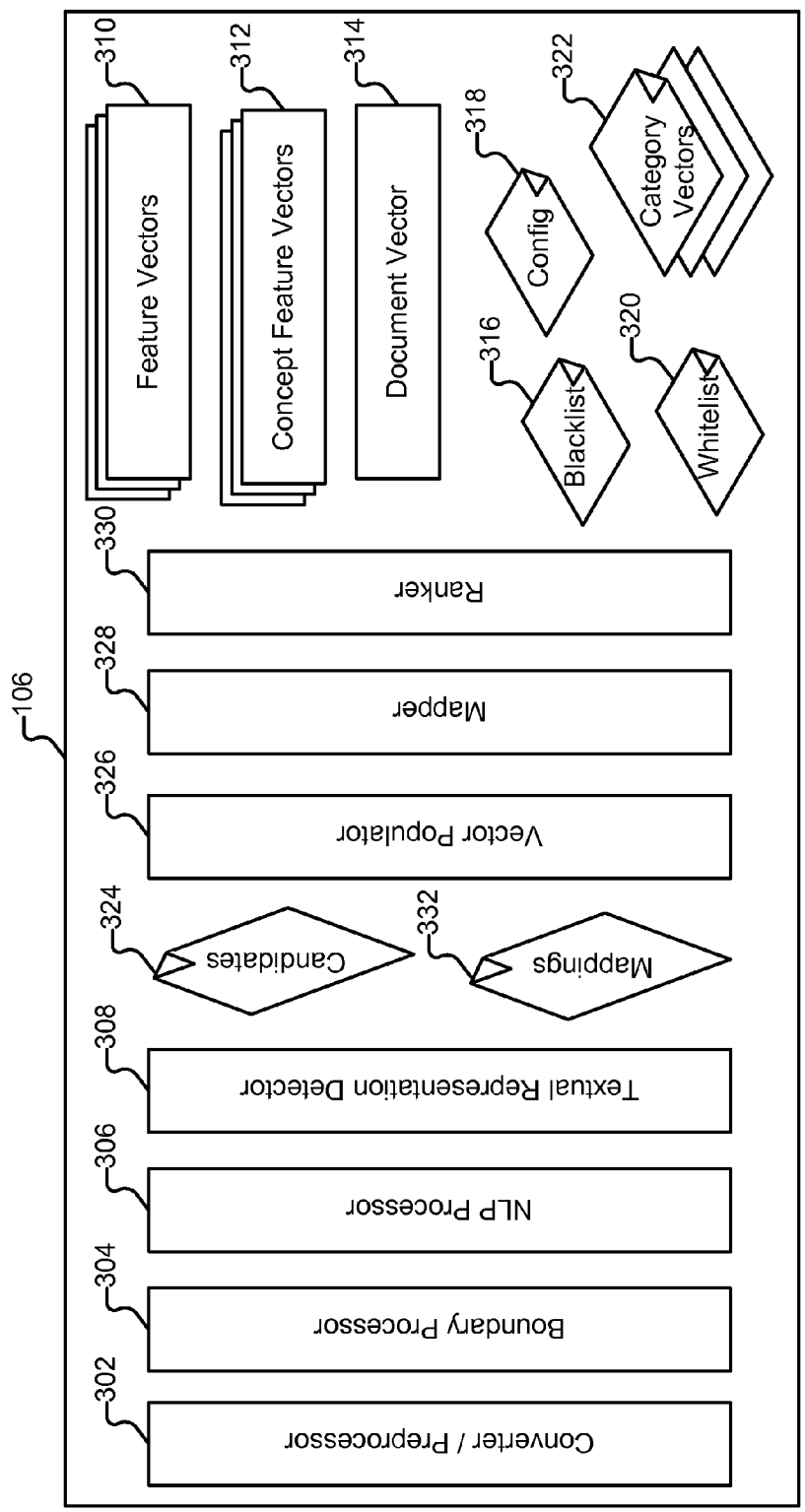
FIG. 3 illustrates an embodiment of a data processing engine.

FIG. 3 illustrates an embodiment of a data processing engine. Data processing engine 106 is of a modular design and employs a blackboard architecture in which various modules (if included) contribute to computation and refinement of various calculations (such as the computation of vectors 310-314) as applicable. Some of the processing performed by the modules of data processing engine 106 is parallelizable, such as natural language processing and textual representation detection. Further, the processing performed by engine 106 is customizable through the use of configuration file 318 (e.g., allowing documents from different publishers to be processed differently). Additional detail on various aspects of data processing engine 106 will now be provided.

Conversion/Preprocessing

When a document, such as document 102, is received, if applicable, preprocessor 302 converts the document (e.g. from a DOC or PDF file) or otherwise extracts (e.g. from HTML or XML) a plaintext representation of the content of the document. Preprocessor 302 is also configured to handle special characters, such as by converting occurrences of the "&" sign into whitespace or into the word "and."

Boundary Processing/Position Information

Boundary processor 304 is configured to recognize certain types of boundaries within a document based on the format of the document (e.g., <head>, <body>, <h1>, and <p> HTML tags) and can also parse configuration information supplied by publishers regarding the formatting of documents on their sites. Documents provided to processor 106 by the interface shown in FIG. 2A include two sections—a title section and a body section. In some embodiments, document boundaries are ignored and the processing of boundary processor 304 is omitted. In various embodiments, boundary processor 304 is also configured to store, for each term in the document, the position of the term. As one example, the first word in the document would have a position 0, the second word in the document would have a position 1, and so on. As will be described in more detail below, terms that appear in one section of a document (such as a title) may be scored or otherwise treated differently than terms that appear in another section (such as in the comments). In addition, publishers can use sections to enforce preferences, such as that all terms appearing in a document be used to categorize the document, but that only terms appearing in the main body (and not the title or comments sections) be able to be associated with hyperlinks. Such preferences can be provided by the publisher via configuration 318.

Natural Language Processing

Natural language processor 306 is configured to determine part-of-speech information for each term in the document. In various embodiments, natural language processor 306 uses part-of-speech tags, such as are provided by the Brown corpus, to tag each term in the document. Using the article shown in FIG. 2B as an example, "NASA's" would be tagged "NP$," meaning that it is a possessive proper noun. As will be described in more detail below, in various embodiments, different parts of speech are assigned different scores and those scores can be used in evaluating textual representations.

Textual Representation Detection

Whitelist 320, extracted from the taxonomy stored in database 108, is a list of all of the concepts that are included in the taxonomy. Textual representation detector 308 is configured to perform a greedy match against the document using whitelist 320. Each match is included in a list of candidate textual representations 324. Using the first line of the article shown in FIG. 2B as an example "NASA," "mission," "orbit," and "moon," would each be included in the list of candidate textual representations 324. Suppose "Lunar" and "Lunar Reconnaissance Orbiter" are both phrases that are included in whitelist 320 but "Lunar Reconnaissance" is not. Because detector 308 is configured to perform a greedy match, "Lunar Reconnaissance Orbiter" will be added to the list of candidate textual representations 324 while the other two terms will not. In various embodiments, detector 308 is configured to perform other types of matches, instead of or in addition to greedy matches. In some embodiments, all matches (e.g. both "Lunar" and "Lunar Reconnaissance Orbiter") are added to list 324.

Leading Prepositions

Suppose "The American" and "American Pie" are both concepts included in whitelist 320, but that "The American Pie" is not. Also suppose that document 102 includes the string "The American Pie movie is showing at the Downtown Theatre tomorrow." When performing its greedy match, detector 308 might add to list 324 two entries, "The American" and "Pie," erroneously omitting "American Pie." To address this problem, in some embodiments, detector 308 employs a prepositional rule in which, when a match that includes at its start a preposition is detected, the preposition is temporarily ignored and the greedy match continues using the next word in the document. If a match is found, the preposition is discarded and the phrase that does not include it is used. In this example, because "The American" includes a leading preposition, "The" would be temporarily ignored, and a match of "American Pie" would be detected. From the three words, "The American Pie," only one entry would be added to list 324—"American Pie."

Without further refinement, the list of candidate textual representations 324 might include virtually every word in document 102. Accordingly, in various embodiments, textual representation detector 308 employs additional logic to refine the list of candidate textual representations. As will be described in more detail below, the candidate list can be refined/pruned both before and after feature vectors for items on the candidate list are populated.

Static and Runtime Blacklists

In various embodiments, textual representation detector 308 is configured to exclude from inclusion in list 324 those textual representations that match a blacklist 316. Stop words (such as "a," "about," "again," and "would") are one example of terms that can be included in a static blacklist. A publisher can also provide custom blacklists (referred to herein as "runtime" blacklists) that should be considered by engine 106 when processing that particular publisher's documents. As one example, a publisher may blacklist the names of competitors. As another example, the publisher may have an agreement with a third-party advertising company that certain words be directed to that advertising company. By employing a blacklist, the publisher can prevent the already-contracted-for words from being considered by engine 106. Publishers can also specify constraints such as requiring that all textual representations belong to one or more verticals (also referred to herein as "top level categories") specified by the publisher, which will be described in more detail below.

Concept-Based Blacklists

Concepts included in a taxonomy can be used to bias/prune candidate textual representations, as will be described in more detail below. As with the examples described in the previous section, concept-based blacklists can be static (e.g., applied to all documents) or runtime (e.g., used according to a configuration supplied by a publisher or other runtime clue). For example, an administrator of engine 106 can configure as blacklisted concepts "chronology" and "days of the week." Child topics such as "Monday" and "1997" would be blacklisted as a result. As another example, message board publisher 120 can indicate a preference for health-themed textual representations by specifying the vertical, "Health," as a whitelisted concept in configuration 318. Publisher 122 can indicate a preference against adult-themed textual representations by specifying the vertical "Adult Entertainment" as a blacklisted concept. Instead of supplying whitelists/blacklists, in some embodiments publishers assign weights to various categories, so that higher weighted categories are given preference over lower weighted categories by engine 106. As one example, publisher 122 could provide the following: "Health(1); Sports(0.5)" indicating a preference for health-related concepts but also indicating that sports concepts should be considered. In yet another embodiment, plugin 132 can be configured to provide a concept "signature" for Alice—a customized list of Alice's topical preferences, such as: "Science(1); Animals(0.5); Entertainment(0.4); Travel (0.4); Sports(−1)."

In various embodiments, concept whitelist/blacklist information is passed in at runtime via the provider of document 102 instead of or in addition to being supplied via configuration 318. Whitelist information can also be collected on behalf of a publisher, without requiring the publisher to manually specify category preferences. One way of accomplishing this is as follows. When a publisher initially decides to use the services provided by system 106, system 106 performs the document categorization techniques described herein across the corpus of documents included in the publisher's site and collects together the dominant concepts into a concept whitelist.

Regular Expression Patterns

In various embodiments, textual representation detector 308 is configured to exclude from inclusion in list 324 those textual representations that match a regular expression. As one example, as a result of converter/preprocessor 302 manipulating document 102, a term such as "AT&T GSM" may be converted to "AT T GSM." Suppose "TGSM" is a concept included in whitelist 320. During the greedy match portion, "TGSM" may be erroneously added to candidate list 324. A regular expression pattern that discards matches that begin with a lone "T" or a lone "S" can be used to prevent the erroneous match from being included.

Proper Noun Sequences

In various embodiments, textual representation detector 308 is configured to evaluate proper nouns included in list 324 and remove from the list those proper nouns that have an adjacent proper noun that was not selected. One purpose of this rule is to prevent one person that has a famous last name (but is not that famous person) from being erroneously recognized as the famous person. Suppose an article discusses a chemist named John Mozart and that "Mozart" is added to list 324 as a result of the greedy match. Since "John Mozart" is not included in whitelist 320, it is not included in list 324. Detector 308 is configured to recognize that Mozart was added, has an adjacent proper noun ("John") and to remove "Mozart" from list 324.

Initial Feature Vector Population

Vector populator 326 is configured to populate a feature vector 310 for each candidate textual representation included in list 324. A feature vector comprises a set of various signals associated with the textual representation. The signals can be used in various ways, as will be described in more detail below. Some of the signal information is obtained from analyzing document 102 and other information is obtained from data included in database 108.

One signal, denoted herein as "TitleTF," indicates the number of times that the term appears in the title section of the document. Using the textual representation, "Lunar Reconnaissance Orbiter," as shown at 260 in FIG. 2 as an example, that term is not present in the title section of the document and thus has a TitleTF=0. "BodyTF" is a signal that indicates the number of times that the term appears in the body section of the document. The term, "Lunar Reconnaissance Orbiter" has a BodyTF=1 because it is present once in the body section of the document. Another textual representation, "LRO," also has a TitleTF=0, but has a BodyTF=3. Other term frequency counts can also be used instead of or in addition to TitleTF and BodyTF, as applicable. For example, the term's frequencies with respect to meta tags, bold/strong tags, H3-H6 tags, H1-H2 tags, and anchor classes can all be included in its feature vector. As another example, a CommentTF signal can be used to indicate the number of times a term appears in the comment section of a blog. Arbitrary section frequency counts can also be used, such as Section0TF, Section1TF, Section2TF, etc., indicating the number of times the term appears, respectively, in the $0^{th}$, $1^{st}$, and $2^{nd}$ sections of the document. One way that section frequency signal information can be used is to allow words occurring in the comments to be considered when categorizing a document, but also to prevent those words from being selected for automated hyperlinking.

As mentioned above, a score (the "NLP score") can be assigned to a textual representation based on its part of speech. As one example, proper nouns are assigned a score of "1," common nouns are assigned a score of "0.75," and verbs are assigned a score of "0." For multi-word textual representations, the NLP score can be computed as the average of each constituent word's score, the sum of each constituent word's score, or in accordance with any other appropriate calculation. The "Case" signal scores the number of capitalized words in the textual representation. In the example of "Lunar Reconnaissance Orbiter," the Case score is 3 because each component of the term is capitalized. In the example of "Apollo landing sites," as shown at 262 in FIG. 2, the Case score is 1.

Both the NLP score and the Case score can be used to resolve whether particular textual representations included in document are proper nouns or common nouns and also to resolve ambiguities, as described in more detail below. As one example, the occurrence of the words "Simply hired" in a document could refer to the author's explanation of how easy it was to be hired at a job and could also refer to the jobs website, www.simplyhired.com. The Case score of "Simply hired" is 1. The Case score of the canonical name of the jobs website, Simply Hired, is 2. As another example, "it's it" in a document could refer to something the author thinks is "it," but could also refer to It's—It brand ice cream sandwiches. The Case score of "it's it" as written is 0. The Case score of the canonical form of the ice cream sandwich product is 2.

The Position signal indicates the relative location of the textual representation in the document. "Lunar Reconnaissance Orbiter" occurs once in document 102, at position 154. In various embodiments, if the textual representation occurs multiple times, the position of each occurrence is included in a list (e.g., Position=100,202,554). In various embodiments, the position of the term can be used to bias various processing. For example, links to terms occurring earlier in the document can be preferred over ones occurring later.

The NumWords signal indicates the number of words included in the textual representation. "Lunar Reconnaissance Orbiter" includes three words, and thus has NumWords=3.

The signals described herein are examples of signals and particular signals can be omitted and/or accompanied by additional signals based on factors such as availability of data/information, preferences, and other implementation choices.

Transforming Candidate Textual Representations into the Taxonomy Space

Mapper 328 is configured to map candidate textual representations to nodes in the taxonomy stored in database 108. As explained above, the whitelist 320 used to identify textual representations is extracted from a taxonomy stored in database 108. Each node in the taxonomy has an associated ID. As one example, the concept "Lunar Reconnaissance Orbiter" has a ConceptID of 2381014. The concept "academic conference" has a ConceptID of 118760. In some cases (such as with "Lunar Reconnaissance Orbiter"), the textual representation unambiguously corresponds to a single node in the taxonomy (i.e., node 2381014). In other cases, the textual representation's meaning may be ambiguous. For example, a textual representation of "jaguar" occurring in a document could correspond to the concept "Jaguar Cars Ltd.," to the concept "*Panthera onca*," to the concept "Mac OS X v10.2," or one of several other concepts. A textual representation of "apple" occurring in a document could correspond to the concept "*Malus domestica*," to the concept "Apple Inc.," or one of several other concepts.

In various embodiments, mapper 328 determines the set of all concepts to which a particular textual representation maps. Each mapping is associated with a mapping vector. Mapping vectors (332) are either of type "unambiguous" or type "ambiguous." A mapping vector is of type "unambiguous" only if a given textual representation maps to a single concept. Otherwise, it is of type ambiguous. A mapping vector also stores additional information, such as a pointer to the textual representation in the document, the conceptID of the mapped concept, the feature vector of the textual representation, and a strength value that indicates a confidence in the mapping. As will be described in more detail below, in some embodiments the mappings 332 initially created by mapper 328 are pruned through a series of refining actions.

Figure 4:
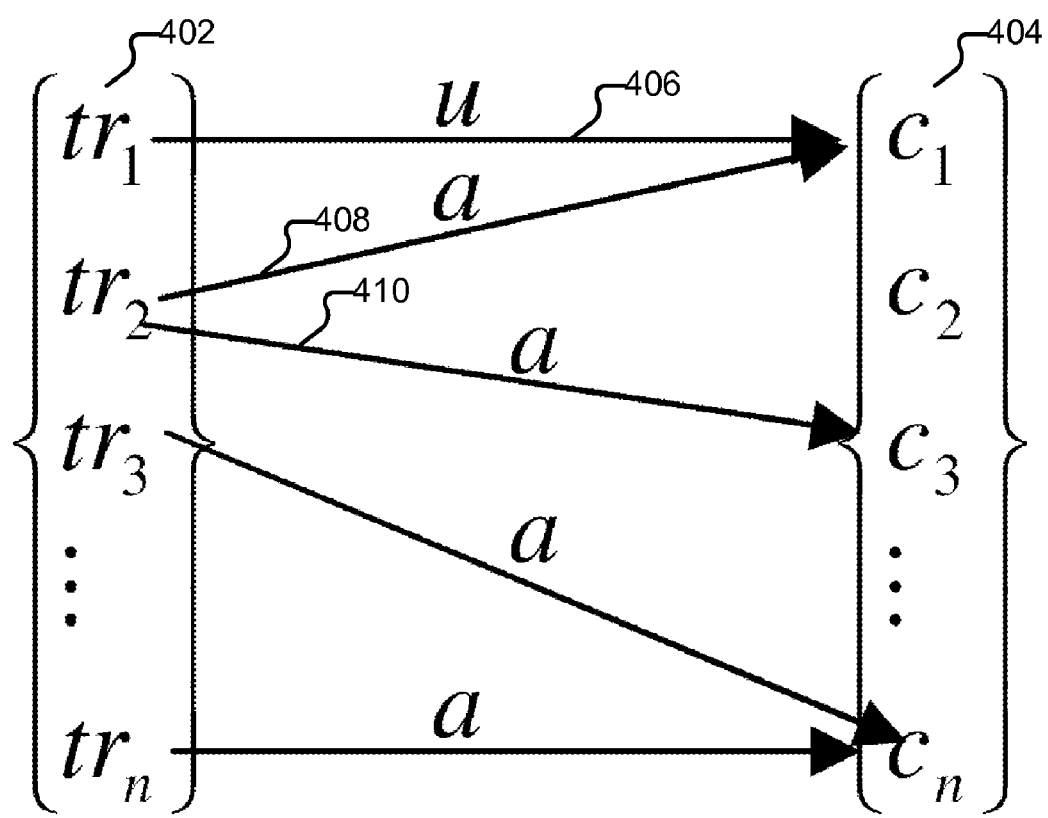
FIG. 4 illustrates a mapping between a set of textual representations and a set of concepts.

FIG. 4 illustrates a mapping between a set of textual representations (402) and a set of concepts (404). In the example shown, the first textual representation ($tr_1$) unambiguously maps to concept $c_1$. The unambiguous mapping between the two is denoted as "u" along line 406. As one example, $tr_1$ is "Lunar Reconnaissance Module" and $c_1$ is the concept "Lunar Reconnaissance Orbiter." Suppose $tr_2$ is the acronym, "LRO." LRO could be short for "Lunar Reconnaissance Orbiter" but could also be short for "large receive offload," ($c_3$) which is a technique in computer networking for increasing inbound throughput. As shown in FIG. 4A, $tr_2$ can thus be mapped both to $c_1$ and $c_3$. The ambiguous nature of the mappings is denoted as "a" along lines 408 and 410.

Mapper 328 sorts a document's textual representations into a set of unambiguous textual representations (e.g., $tr_1$) and a set of ambiguous textual representations (e.g., $tr_2$, $tr_3$, and $tr_n$). For each ambiguous textual representation, the mapper determines whether a concept to which it is mapped is also a concept to which a textual representation that is unambiguous is mapped. If so, the ambiguous textual representation is reclassified as an unambiguous textual representation and is mapped solely to the concept to which the unambiguous concept is mapped.

Figure 5:
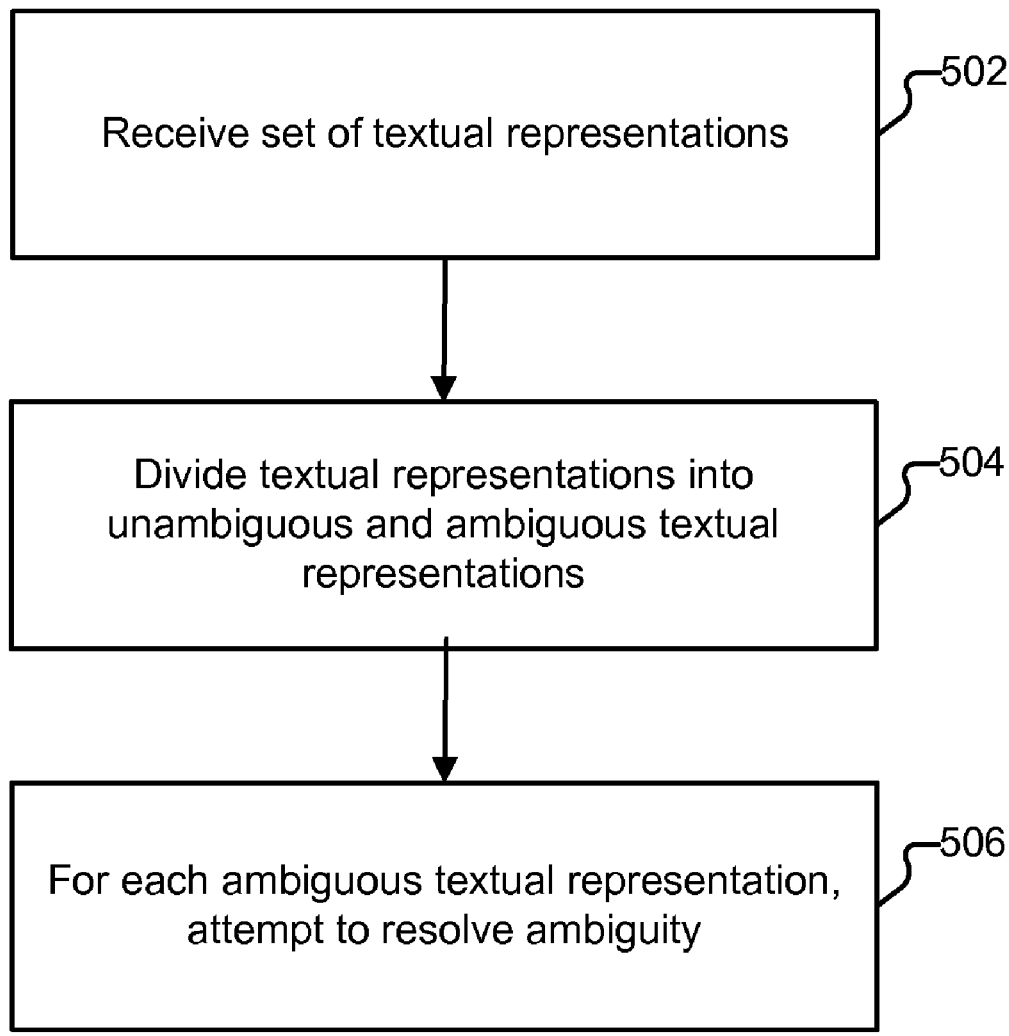
FIG. 5 illustrates a process for resolving an ambiguity.

FIG. 5 illustrates a process for resolving an ambiguity. In various embodiments, the process shown in FIG. 5 is performed by mapper 328. The process begins at 502 when a set of textual representations is received. At 504, the textual representations are divided into sets based on whether they unambiguously or ambiguously map to a concept. Finally, at 506, an attempt to resolve ambiguities is made. One technique for attempting to resolve an ambiguity is presented in the preceding paragraph.

Figure 6:
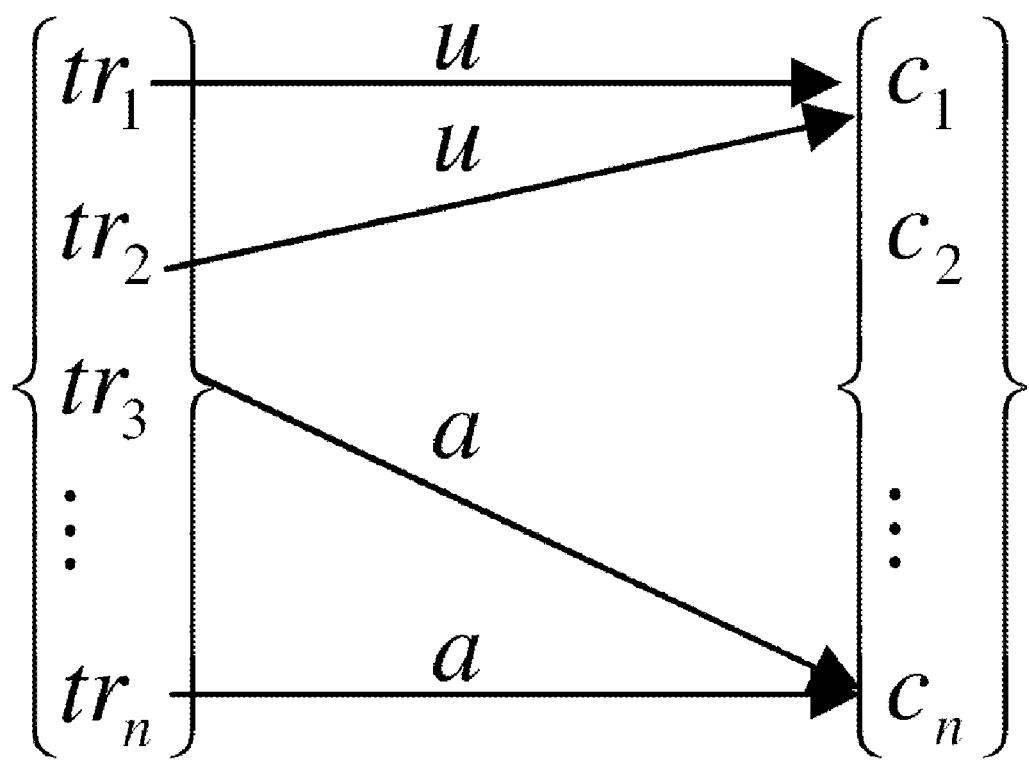
FIG. 6 illustrates an updated mapping between a set of textual representations and a set of concepts.

FIG. 6 illustrates the mapping depicted in FIG. 4 after the processing described in conjunction with FIG. 5 has been performed. As explained above, textual representation $tr_2$ was initially mapped to two concepts—$c_1$ and $c_3$. Since unambiguous textual representation $tr_1$ mapped to concept $c_1$, mapper 328 removed the mapping vector corresponding to 410 and changed the type of the mapping vector corresponding to 408 from ambiguous to unambiguous. Two textual representations that map to the same concept (such as $tr_1$ and $tr_2$ as shown in FIG. 6) are examples of synonyms. Both textual representations ("Lunar Reconnaissance Orbiter" and "LRO") refer to the concept "Lunar Reconnaissance Orbiter." In the example shown in FIG. 6, if another textual representation, "$tr_4$," also mapped to $c_1$, it would also be considered a synonym of $tr_1$ and $tr_2$.

The process of FIG. 5 can also be used to resolve ambiguities for textual representations which are not synonyms of one another but share related concepts. As one example, suppose "Steve Jobs" is a textual representation included in a document and unambiguously resolves to the concept of businessman, Steven Paul Jones. The textual representation "apple" is also present in the document, in the sentence, "I would like to buy an apple." The term, "apple" is not synonymous with "Steve Jobs," however, its potential meaning as a fruit can be disambiguated by the presence of Steve Jobs in the document. One approach for accomplishing this is for mapper 328, when performing portion 506 of the process shown in FIG. 5, to examine the nearest neighbors of concepts in the taxonomy. Another approach is to use the concept blacklist/whitelist signals described in more detail below. Yet another approach is to use a document similarity score described in more detail below.

In some embodiments, for any remaining textual representations in the ambiguous textual representation set (e.g., four meanings of "jaguar"), a mapping between the textual representation and the concept corresponding to each possible meaning is added to the unambiguous set (e.g., four different unambiguous mappings), and the textual representation ("jaguar") is removed from the ambiguous set. Engine 106 is configured to remember that the meaning of the textual representation was not resolved (i.e., that jaguar could mean one of four things). As will be described in more detail below, pruning of three of the four different unambiguous mapping vectors is performed after a document vector is computed and a document similarity score generated.

Creating a Concept Feature Vector

In addition to the processing described above, vector populator 326 is also configured to populate a set of concept feature vectors 312. One way of accomplishing this is as follows. For each concept remaining after the processing of FIG. 5, vector populator 326 merges the feature vector scores of any textual representations mapped to respective concept (e.g., by adding the values together) and includes additional information (described in more detail below).

Using the example of the representations "Lunar Reconnaissance Orbiter" and "LRO," a concept feature vector for "Lunar Reconnaissance Orbiter" is formed by summing the respective feature vectors of the two textual representations and adding additional information. The concept "Lunar Reconnaissance Orbiter" would accordingly have a TitleTF=0+0=0, a BodyTF=1+3=4, and so on.

Inverse Document Frequency Signal

One additional piece of information that is included in the concept feature vector is the inverse document frequency ("IDF") of a canonical textual representation associated with the concept. As one example, "JFK," "John F. Kennedy," and "Jack Kennedy" all refer to the 35$^{th}$ president of the United States. The canonical textual representation is "John F. Kennedy" and the IDF included in a concept feature vector for the president would be determined using "John F. Kennedy." The canonical textual representation is stored in the taxonomy in database 108 and is in some embodiments the title of the concept as it appears in a third party corpus such as Wikipedia. In some embodiments the IDF is computed for all textual representations occurring in the document instead of or in addition to the canonical textual representation.

The IDF is a statistical measure that can be used to evaluate how important a word is to a particular document included in a corpus of documents (e.g., the world wide web, documents on an enterprise server, etc). For a given term "i," one way to compute the IDF of i is as follows:

$$IDF_i = \log \frac{|D|}{|\{d:t_i \in d\}|}$$

with $|D|$ being the number of documents in the corpus, and $|\{d:t_i \in d\}|$ being the number of documents where the term $t_i$ appears.

Number of Homonyms Signal

Another piece of information that can be included in the concept feature vector is the Homonyms signal. This signal indicates the number of homonyms for the concept and can be used to weight against (or toward) the selection of concepts that can easily be confused with other concepts. The number of homonyms associated with a concept is, in some embodiments, included in the taxonomy stored in database 108.

Concept Whitelist/Blacklist Signals

Yet another piece of information that can be included in the concept feature vector is whether or not the concept is present in a concept whitelist (or concept blacklist, as applicable). For example, in configuration 318, publishers can specify concept whitelists (concepts they prefer to bias toward) and concept blacklists (concepts they have a bias against). If the concept is present in the concept whitelist, in some embodiments a Whitelist=1 signal is included in the concept feature vector (and has a "0" value otherwise). If the concept is present in the concept blacklist, in some embodiments a Blacklist=1 signal is included in the concept feature vector (and has a "0" value otherwise). The whitelist/blacklist signals can be used as weights and can also be used to prune concepts.

Linkworthiness, Popularity, and Freshness Signals

"Linkworthiness" is another signal that can be precomputed for a concept in the taxonomy and included in a concept feature vector. One example of a linkworthiness signal is a measure of how frequently the concept is included in a hyperlink in a corpus. As one example, suppose "bottled water" occurs 4,543 times within the corpus of documents that comprise the Wikipedia site. However, the term is linked a single time. Bottled water would accordingly have a linkworthiness score of 1/4,543=0.00022. As another example, suppose "carpe diem" occurs 200 times and is linked to 88 times. Carpe diem would accordingly have a linkworthiness score of 88/200=0.44. A corpus including multiple sites and/or the entire World Wide Web can also be parsed in determining linkworthiness instead of or in addition to Wikipedia. In some embodiments, the documents used to perform the linkworthiness determination are selected based on a pagerank or other measure of their quality. For example, links included in highly rated newspaper sites might be parsed, while links included in domain parked sites would not. The measure of quality can also be factored into the linkworthiness score itself.

For ambiguous concepts, such as "jaguar," in addition to determining the number of times a concept is linked, the meaning to which it is linked is also examined. For example, suppose that within Wikipedia, "jaguar" appears 500 times. Of those 500 instances, 300 have associated hyperlinks. Of the 300 hyperlinks, 60% direct the viewer to a page about Panthera onca, 30% direct the viewer to a page about the car company, and the remaining 10% of links direct viewers to other (even less common) meanings of the word. In this example, a popularity score can be associated with each of the meanings and used as a signal (described in more detail below), such as the cat meaning having a popularity score of 0.6, the car meaning having a popularity score of 0.3, and so on. In the case where the Wikipedia corpus is used, whether or not a particular ambiguous concept is designated as the default can also be used as a measure of popularity.

The "freshness" of a topic can also be used as a signal. Such information can be gleaned by scraping Twitter feeds, news aggregation sites, and other indicators of current topics, stored in the taxonomy and included by vector populator 326 in the concept feature vector. One example of a change in a concept's freshness is the concept "cupola." Prior to the STS-130 shuttle mission, the term rarely appeared in news articles and Twitter messages. The inclusion in the payload of a cupola for the International Space Station however, resulted in considerably more use of the term and thus its freshness score rose.

In various embodiments, the linkworthiness, popularity, and freshness signals are combined together into a single signal. The values may be binary (e.g., fresh=0 or fresh=1) or any other appropriate value, typically normalized between 0 and 1.

Additional Signals

A capitalization signal can be used to indicate how often a concept is capitalized in documents appearing in a corpus such as the World Wide Web. As one example, the n-gram data made available by Google can be used to estimate the percentage of times a concept is capitalized.

In some embodiments, rules are used to weight various signals on a category basis. For example, if a topic such as "Hired" belongs to the category "Film," a category-based rule can be used to give higher weight to the Case signal accordingly.

Pruning Concepts

In various embodiments, once vector populator 326 has completed populating concept feature vectors 312, some of the concepts are pruned. For example, concepts having a non-zero TitleTF score and a BodyTF=0, having NLP scores of 0, or having very low IDF scores (e.g., a term such as "shopping") are dropped. As another example, concepts that are orphans (e.g., nodes in the taxonomy without at least one parent or child) are also dropped.

As explained above, the "Case" score of a textual representation can be used when determining whether the textual representation maps to a particular concept. Suppose "Has Been" is the name of a musical album (a concept) and "has been" appears in a document 102. The Case score of the concept is 2, because the musical album's title is capitalized. The Case score of the textual representation is 0. In some embodiments, the musical album is pruned due to the mismatch in case scores.

As another example, if concept whitelist/blacklist information has been provided to engine 106, the information can be used to resolve ambiguous meanings. For example, suppose medically themed site 120 has specified either the vertical "Health" or a series of lower level concepts such as "nutrition" and "organic foods" in whitelist 320. Also suppose that document 102 includes an ambiguous occurrence of the textual representation "apple" which is mapped by mapper 328 in accordance with the techniques described above to two concepts—a fruit and a computer company. The ambiguity can be resolved (and one of the two concepts pruned) by detecting that the Whitelist signal for the fruit concept has a value of 1 and the Whitelist signal for the computer concept has a value of 0.

In some embodiments, filtering is performed by various components of document processing engine at various stages of processing. For example, in some embodiments orphan concepts are omitted from whitelist 320. As another example, in some embodiments filtering based on scores such as NLP scores and IDF scores occurs prior to the processing described in conjunction with portion 506 of the process shown in FIG. 5.

Category Vectors

Each concept "c" in the taxonomy stored in database 108 has an associated category vector 322. In various embodiments, the category vector is precomputed (i.e., prior to the processing of document 102) and is also stored in database 108. For a particular concept c in the taxonomy, the category vector is a set of categories/concepts that are related to that concept c, along with a weight for each of the included categories/concepts. A variety of techniques can be used to compute the category vector.

One way to populate the category vector is to use the up-lineage of the concept (e.g., parents, grandparents, etc.), and assign a decreasing score based on distance (e.g., parents have a score of 0.9, grandparents have a score of 0.8, etc.). A second way to populate the category vector is to use the down-lineage of the concept (e.g., children). A third way to populate the category vector is to use a predetermined list of concepts designated as being "related" to the concept (e.g., including siblings), or to use the concept lighting techniques described in more detail below.

A fourth way to populate the category vector is to use membership in a subset "K" of a taxonomy "T," where $|K|<<|C|$. For example, K can include only verticals and entity classes. Further, elements within K should not have parent-child relationship, meaning that all members of a given k in K should not automatically be members of another k.

Document Vector

Vector populator 326 is configured to populate a document vector 314 for each document 102. In some embodiments this is accomplished by computing the average of all category vectors implicated by the concepts associated with document 102 remaining after the pruning described above. Document vector 314 can thus be denoted as follows:

$$dv = \frac{\sum_n cv_i}{n}.$$

In some embodiments, the document vector is normalized so that the sum of the components of $cv_t$ is 1. Other techniques can also be used to compute a document vector, as applicable. For example, a weight value on an exponent can be included in the computation such that top level concepts (like "health" and "sports") are favored or disfavored, as indicated by a publisher, over bottom level concepts (like "Sungold Tomato"). As another example, the computation of the document vector can take into account rules such as that concepts that have ambiguous parents be excluded from the document vector, that concepts associated with terms appearing in the title be weighted significantly more than other concepts, etc. Document vector 314 is one example of output that can be provided by engine 106 to various applications described in more detail below.

Document Similarity and Further Disambiguation

In some embodiments, vector populator 326 is configured to use document vector 314 to compute a set of document similarity scores. For a given concept, the document similarity score is computed as: $ds_i = \overline{dv} \circ \overline{cv}_i$. It provides an indication of how similar the concept vector is to the document vector. Once computed, the document similarity score is included in the concept's feature vector 312. In various embodiments, other similarity scores, such as a site similarity score can also be computed (e.g., by computing the similarity of a concept over all the documents from a given site) and included in feature vector 312.

The document similarity score can be used to resolve remaining ambiguities. For example, suppose document 102 includes the statement, "Jaguar prices are climbing." Absent additional information, the textual representation "Jaguar," could plausibly refer to either an animal or an automobile. By examining the document similarity scores of both the Panthera onca and the Jaguar Cars Ltd. concepts, disambiguation can be performed. For example, if the document is an article about the cost of zoo exhibits, concepts such as "zoo" and "wildlife" and "park" will likely be included in the document vector, while concepts such as "luxury cars" and "high performance engine" will likely not (or will have considerably lower scores). Accordingly, the document similarity score of "Panthera onca" will be considerably higher than the score for "Jaguar Cars Ltd." and the ambiguity can be finally resolved by pruning the second concept.

In some embodiments, additional information is employed to resolve remaining ambiguities. For example, the textual representation, "Michael Jackson" most frequently refers to the American musician. However, the taxonomy also includes other individuals of note that are also named "Michael Jackson" (e.g., a civil war soldier, a British television executive, etc.). It is possible that a document could be referring to a Michael Jackson that is not the musician. In various embodiments, the popularity of a particular concept is used as one consideration (e.g., with the musician meaning being more popular than the civil war solider) and concept's document similarity score is used as another. Based on customizable weights, engine 106 can be configured to disambiguate concepts such as "Michael Jackson" by preferring the popular meaning (and pruning the others), except when the document similarity score overwhelmingly indicates (e.g., having a document similarity score exceeding 0.7) that an alternate meaning should be selected. As another example, the freshness of a topic can be considered.

Ranking Results

Even after the scoring and pruning actions described above have been performed, for a given document 102, it is possible that hundreds (or more) of textual representations and associated concepts remain as candidates. Typically, only a handful of the top textual representations and/or concepts are needed.

Ranker 330 is configured to rank the concepts remaining in consideration after the above processing/pruning has been performed. One approach is to use a scoring function s that computes a score given a concept feature vector. In various embodiments, what weights to apply to the various signals included in the concept feature vector are empirically determined and then tunes using linear regression. In various embodiments, only a subset of the signals is used (e.g., a combination of the document similarity score and linkworthiness/popularity/freshness signals). For a given document 102, a threshold/cutoff is applied to limit the final list of concepts to an appropriately manageable size for consumption by an application. Concepts having a score above the threshold (and their corresponding textual representations) are provided as output (i.e., "entities").

Publishers can, through configuration 318, specify customized rules for the combination function used to calculate final concept scores. For example, publisher 120 can specify as a rule that while all medical concepts should be considered by engine 106 when generating the document vector 314, disease symptoms should not be output as entities. As another example, publisher 120 might choose to weight the values of the Whitelist/Blacklist signals more heavily than publisher 118, who might in turn prefer another signal, such as by preferring concepts with the higher freshness scores, or a monetization signal that measures how well a given concept monetizes. One benefit of using category-based monetization is that an extrapolation can be made as to the monetization of a very specific textual representation based on the concept (or higher level category/vertical) with which it is associated. It may be the case that pharmaceuticals monetize well but names of diseases do not. When a new pharmaceutical is introduced to market, the publisher need not take any action to indicate a preference toward textual representations of the new pharmaceutical as a candidate term. As another example, if specific words are empirically determined to monetize well on a given publisher's website (e.g., "golden retriever," "collie,"), the categorization of those words (e.g., "breeds of dog") within the taxonomy can be used by engine 106 to bias the selection of other words belonging the category (e.g., "beagle") even absent historic data for those other words.

In some embodiments the threshold/cutoff is manually selected, such as by a publisher specifying in configuration 318 that a maximum number of 10 entities be returned. In other embodiments, engine 106 applies a dynamically generated threshold based on factors such as the document length. For example, the publisher can specify a link density, such as that up to 5% of the number of words in a document be included in entities. In some embodiments, the number of textual representations remaining in candidate list 324 is used as a proxy for the document length. Other information, such as click-through rate data, can also be used to determine the cutoff number of entities and also as an additional, site-specific signal that can be stored (e.g., in database 108) and used while processing other documents (e.g., as an additional concept feature vector signal).

FIG. 7 illustrates an example of a portion of output generated by a document processing engine. The example shown illustrates the first and twenty-fourth ranked entities determined from the document shown in FIG. 2B. The concept "Lunar Reconnaissance Orbiter" (and corresponding textual representation "Lunar Reconnaissance Orbiter") has the highest score as indicated in region 702. The concept "academic conference" (and corresponding textual representation "scientific meeting") has a considerably lower score as indicated in region 704.

Example Process for Detecting an Entity

Figure 8:
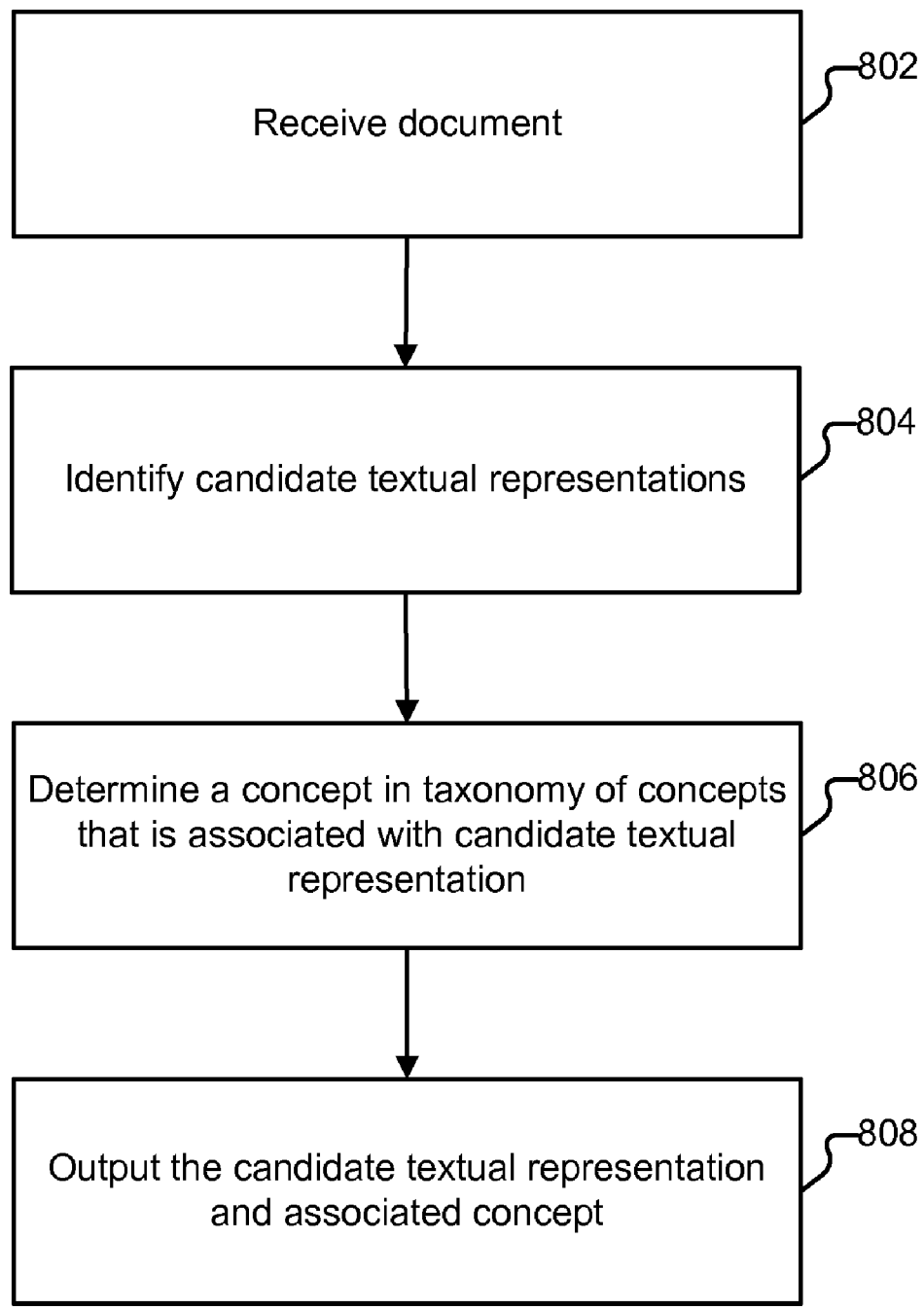
FIG. 8 illustrates an embodiment of a process for determining a mapping between a textual representation in a document and a concept.

FIG. 8 illustrates an embodiment of a process for determining a mapping between a textual representation in a document and a concept. In various embodiments, the process shown in FIG. 8 is performed by document processing engine 106. The process begins at 802 when a document is received. As one example, a document is received at 802 when Joe submits a blog post to site 118 and site 118 provides the post to system 106 via an API. At 804, candidate textual representations are identified, such as by textual representation detector 308. At 806, concepts associated with the candidate textual representations are determined, such as by mapper 328. As explained above, various refinements (e.g., disambiguation) and pruning of the candidate textual representations and associated concepts can be performed.

Finally, at 808 pairs of textual representations and associated concepts are provided as output. As one example, at 808, entities 110 are provided to hyperlink generator 134, which provides to site 118 instructions for generating links such as from "American Geophysical Union" to www.agu.org. In various embodiments, the instructions include properly formed HTML. In others, a list comprising the textual representation and a destination URL (but no HTML) is generated by generator 134 and provided to site 118. As another example, at 808, entities 110 are provided to plugin 132 which determines additional information that should be displayed to Alice in a separate window.

In various embodiments, plugin 132 leverages additional information to which it has access, such as cookies, passwords, and other information stored within a browser, when including additional links in the rendered page. For example, suppose Alice is currently viewing a document that includes mention of a company, Beta Corporation. Engine 106 determines that the textual representation "Beta Corporation" should be linked. Plugin 132 is aware that Alice is "friends," on a social networking site, with a person that works at Beta Corporation (as gleaned from his profile). Accordingly, rather than linking to Beta Corporation's website, plugin 132 instead decides to direct Alice to the social networking site. As another example, instead of inserting a hyperlink into the document, plugin 132 could also provide a popup text or other notification for Alice that her friend works at Beta Corporation.

Figure 9:
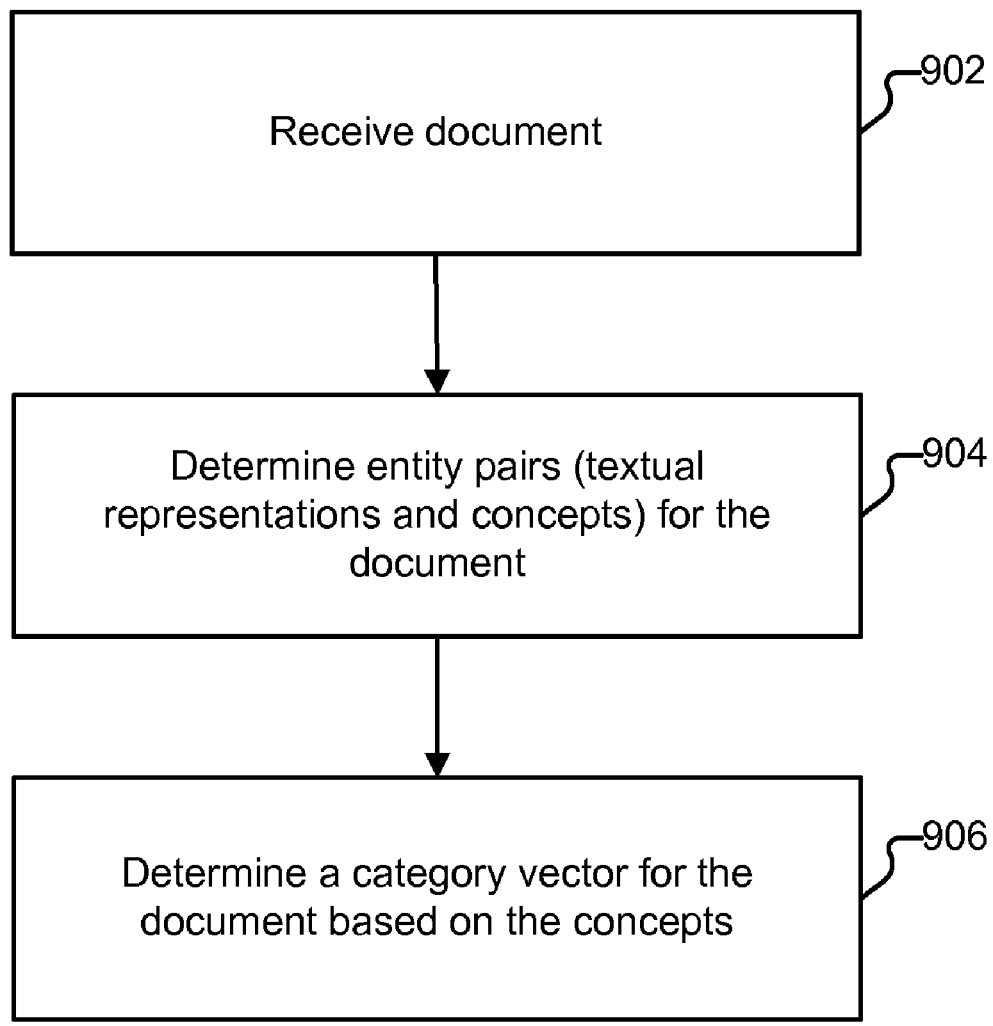
FIG. 9 illustrates an embodiment of a process for categorizing a document.

FIG. 9 illustrates an embodiment of a process for categorizing a document. In various embodiments, the process shown in FIG. 9 is performed by document processing engine 106. The process begins at 902 when a document is received. As one example, a document is received at 902 when Joe submits a blog post to site 118 and site 118 provides the post to system 106 via an API. At 904, entity pairs are determined, such as in accordance with the processing shown at portions 804-808 of the process shown in FIG. 8. Finally, at 906 a categorization of the document is determined. In some embodiments this is document vector 314. The tags shown at 254 in FIG. 2B are an example of output that is generated as a result of the determination made at 906. In various embodiments, the categorization determined at 906 is thresholded prior to output, such as by being limited to the top three categories of the document vector.

Example Embodiment

Including Hyperlinks in a Web Forum

FIG. 10 illustrates an embodiment of a portion of a webpage as rendered in a browser. The example shown is a portion of site 120, which provides a forum in which users discuss various medical conditions and other topics with one another. In the example shown, a user, "Fred22," has recently discovered that he has diabetes and is exchanging messages with other users, such as "JanetQ," about his diagnosis.

An administrator of site 120 has provided to system 104 configuration information pertaining to site 120. Specifically, the administrator has indicated that site 120 is a health site (e.g., by listing "Health" as a vertical to which it pertains). As mentioned above, users of site 120 are unable to insert hyperlinks into their posts for security reasons. However, the administrator of site 120 would like visitors to have as positive an experience as possible and thus would like them to benefit from the techniques described herein by having various hyperlinks automatically included in forum posts. The administrator has specified, in configuration 318, that any textual representations selected by engine 106 that are associated with pharmaceuticals be hyperlinked to entries in an online pharmaceutical encyclopedia. The administrator has further specified that selected textual representations for which site 318 has informational pages (e.g., basic medical concepts) be hyperlinked to those pages. One way of accomplishing this is to, as a periodic process, crawl all or some subset of the pages on site 120 and categorize them (e.g., by determining their respective document vectors). Pages on site 120 with appropriate document vectors can be used for linking Finally, the administrator has specified that any textual representations selected by engine 106 which are not covered by the two previous specifications be hyperlinked to topic pages automatically generated for those concepts (e.g., based on techniques described below).

In the example shown, engine 106 has determined that the textual representation, "Type 2 Diabetes" be hyperlinked to a page about diabetes that is also hosted by site 118 (1002). Using the techniques herein, engine 106 is able to disambiguate "T1" to mean the concept "type 1 diabetes" and has also hyperlinked it to the page about diabetes (1004). Engine 106 determined that the textual representation "glucose meter" should be hyperlinked to an automatically generated topic page. Glucose meter is a concept that monetizes well, and so, during the scoring performed by engine 106, textual representation 1006 was selected over other candidate representations. Engine 106 has determined that the textual representation, "Metformin," should be hyperlinked to an entry for that pharmaceutical in an online pharmaceutical encyclopedia.

Link Distribution

In the example shown in FIG. 10, the hyperlinks generated by system 104 are concentrated within the first post, at the top of the page. Publishers can specify which regions of the page should be considered for hyperlinking and which should not. Publishers can also indicate their preferences for how the links should be distributed, such as evenly throughout the page, or concentrated in various areas. In some embodiments, information such as click-through information is used by system 104 to automatically determine whether the users of a given site tend to concentrate their clicking activity in particular regions or whether their clicking activities are evenly spread throughout a given page. One way of accomplishing this is for system 104 to record, for each click event, the position of the text being clicked. The positions are discretized (e.g., into the first tenth of the document, the next tenth of the document, and so on) and a determination is made as to what, if any, impact the position of a link has on a visitor's odds of activating the link. The position of the textual representation can be compared against the historical click-through information and used as yet another signal that can be used by engine 106 when selecting entities. For example, if visitors tend to click on links appearing at the beginning of an article, textual representations toward the end of the article may not be selected by ranker 330. However, if a textual representation appearing toward the end of an article has sufficiently high scores for other signals, it may nonetheless be selected over earlier appearing textual representations.

Figure 11:
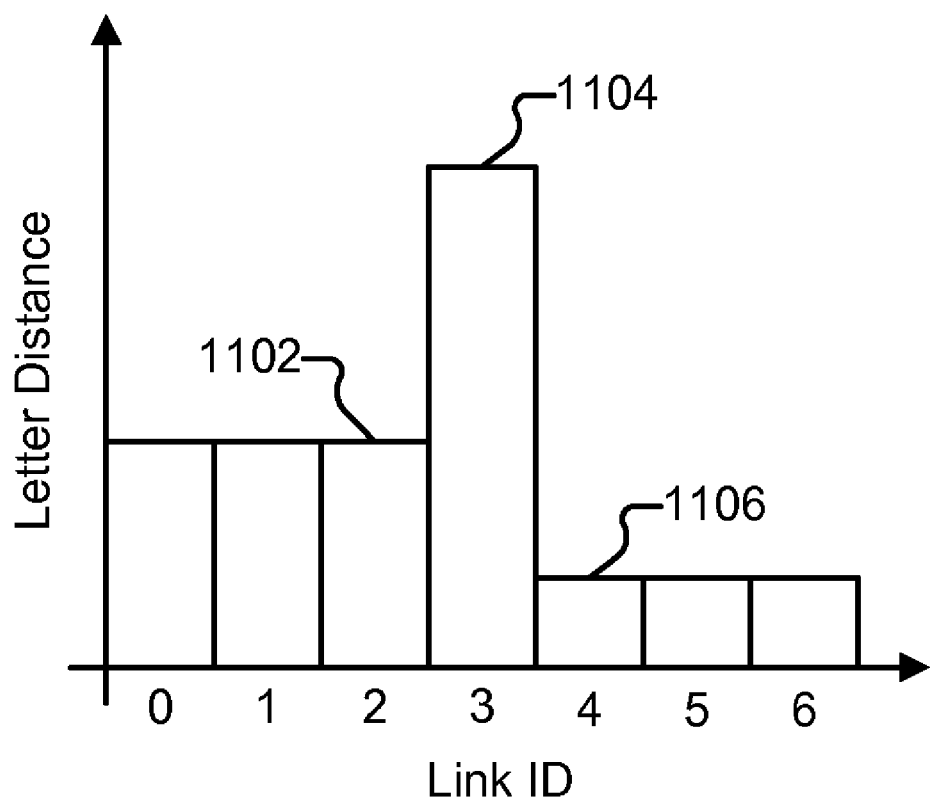
FIG. 11 is a chart illustrating the distance between textual representations.

FIG. 11 is a chart illustrating the distance between textual representations. In the example shown, textual representations are arranged in one axis and sorted according to position. The first selected textual representation appearing in a document is shown in FIG. 11 as item 0, the second selected textual representation appearing in the document is shown as item 1, and so on. On the y axis is the letter distance between a given link and the next link appearing after it. Link 1104 is relatively far in letter distance from link 1102. Link 1106 is very close to link 1104. In some embodiments, engine 106 is configured to minimize the low values (e.g., link 1106) in the graph and to maximize the high values (e.g., link 1104). The letter distance between candidate links can be used as yet another signal by ranker 330 when selecting entities for output. In some cases, such as with lists of items (e.g., the names of the Seven Dwarves), engine 106 may select all seven textual representations despite all seven names being adjacent to one another. Such lists of items can be determined based on the document similarity score and can also be based on information stored in the taxonomy.

Intents

As explained above, a variety of destination URLs can be selected as the destination of hyperlinks of textual representations based on various configuration preferences and the available inventory of destination pages for a given topic. In some embodiments, additional information such as an intent of a visitor (e.g., "shopping") or the context of the original page (e.g., "health") can be used to influence the destination to which the visitor will be directed when activating a link.

Examples of intents include "shopping" and "symptoms." To fully understand the intent, a companion subject is required, such as "shopping for shoes" or "symptoms of the measles." Without a companion subject, an intent is unlikely to be a worthwhile entity. However, the combination of an intent with its companion subject is potentially of significant interest. Accordingly, in various embodiments, engine 106 is configured with a list of intents and, as applicable, concepts that are appropriate companions for the respective intents. Textual representations associated with an intent will have an Intent=1 signal set.

One way of determining a companion subject of an intent is as follows. For a given textual representation, compute a score by multiplying the TitleTF, BodyTF, NLP score, IDF score, and a Proximity score by a series of respective weights. The Proximity score is a measure of the distance from the position of the textual representation to the position of the intent, normalized by the length of the document. The weight values are configured such that textual representations appearing very in close proximity to an intent will receive a high Proximity score and little or no value will be given to textual representations that are less close. Suppose "diabetes" is selected as a textual representation in a document that includes the phrase "Are cold toes a symptom of diabetes?" The phrase, "symptom of diabetes," is not included in whitelist 320. However, "symptom" has been indicated as an intent in database 108. The term, "diabetes" is the intent of "symptom" and is detectable by engine 106 because of their close proximity. While a "cold" can also have symptoms, in this case, NLP processor 306 is able to determine that cold is used as an adjective and not as a noun, thus disambiguating the term. When choosing a destination for the textual representation of "diabetes," when activated, engine 106 can select a more precise destination for the user, such as by directing the user to the "symptoms" portion of a Wikipedia page article (en.wikipedia.org/wiki/Diabetes_mellitus#Signs_and_symptoms) instead of the main diabetes page. In various embodiments, when an intent such as shopping is detected, the hyperlink generated by hyperlink generator 134 is formed as a query to a search engine and includes the textual representation (or concept) and the intent as arguments.

Context

When selecting an applicable destination to link a textual representation with, in some embodiments, engine 106 takes into account a context. One example of a context is the main subject (or highest rated concept in the document vector). In the page shown in FIG. 10, the main subject is likely to be determined to be "diabetes." Another example of a context is the vertical to which the origin site (e.g., site 120) belongs, according to configuration 318. Without context, when a user activates link 1010, he might be directed to a Wikipedia article generally about testosterone. However, if the context ("diabetes") is included in the determination of where to link the "testosterone" textual representation, the user can instead be directed to a customized topic page (created, e.g., using the techniques described below) for the combined topic of "diabetes+testosterone" or to a typical search engine with "diabetes AND testosterone" passed in as arguments. In various embodiments, rather than a single concept being used as a context, the document vector of the document (including multiple concepts and their respective weights) is used. The customized topic page will emphasize the intersection of the concept associated with the textual representation and various concepts in the document vector and deemphasize more general information about the concept associated with the textual representation. In various embodiments, the concepts passed in as arguments to the topic page generator are also displayed to the user.

Example Process

Figure 12:
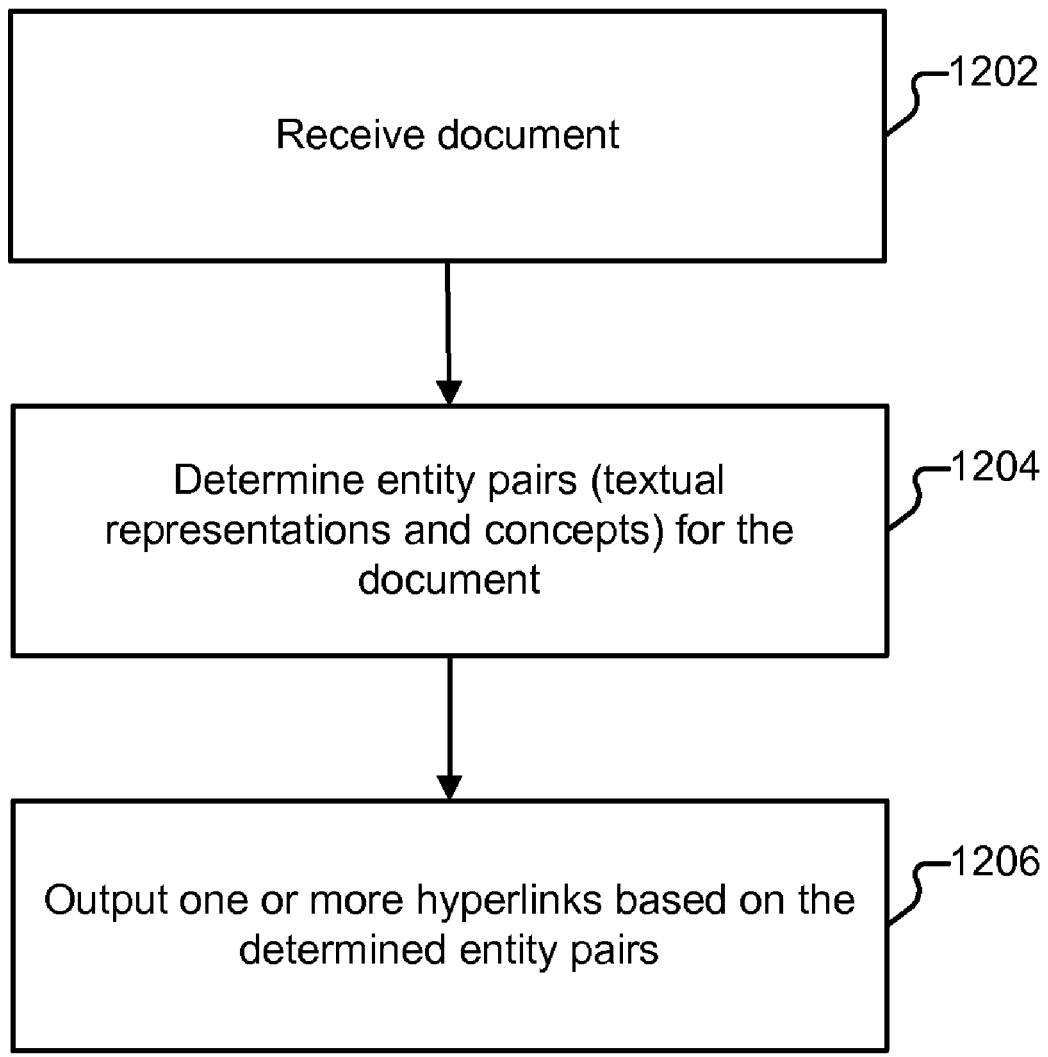
FIG. 12 illustrates an embodiment of a process for including a hyperlink in a document.

FIG. 12 illustrates an embodiment of a process for including a hyperlink in a document. In various embodiments, the process shown in FIG. 12 is performed by document processing engine 106. The process begins at 1202 when a document is received. As one example, a document is received at 1202 when a visitor to website 120 accesses the page shown in FIG. 10 (without the depicted hyperlinks) and a client-side script included in the page causes information to be sent to system 104. At 1204, entity pairs are determined, such as in accordance with the processing shown at portions 804-808 of the process shown in FIG. 8. In other embodiments, other techniques for determining entity pairs are used, such as by consulting a table provided by a third party that lists terms and associated concepts. Finally, at 1206, one or more hyperlinks are output based on the entity pairs determined at 1204. For example, at 1206, hyperlink generator 134 determines that textual representation 1008 should be hyperlinked to an online pharmaceutical encyclopedia entry for the pharmaceutical "Metformin."

Example Embodiment

Topic Expansion

FIG. 13 illustrates an embodiment of a portion of a webpage as rendered in a browser. In the example shown in FIG. 10, a total of three posts were made in a thread in the diabetes portion of the medical forum. In FIG. 13, a user, Billy00, has made post 1302 and no additional posts have yet been made. In various embodiments, instead of or in addition to inserting hyperlinks such as hyperlink 1002 into his posts, additional elements are included in the page (e.g., via JavaScript) to enhance the experience of a visitor. One way to include additional content on a page such as is shown in FIG. 13 is to obtain key concepts of the post (such as "dog" and "rash") using the techniques described above and to pass them as arguments to a mashup engine described in more detail below. The mashup engine selects one or more modules for dynamic inclusion in page 1300. In the example shown in FIG. 13, the concepts "dog" and "rash" led to the categorization of post 1302 as being about dog skin disorders. The concept, dog skin disorders, has an associated module (a list of types of skin disorders), which was selected for inclusion in page 1300.

The dynamic inclusion of modules such as module 1306 need not be limited to pages with sparse content such as page 1300. Suppose a document is many pages in length. In various embodiments, a summarization module can be dynamically included (e.g., as a floating element) that extracts various concepts from the document based on the techniques described herein and lists them as an at-a-glance summary. Further, modules can be dynamically provided by a plugin such as plugin 132, without the cooperation of the publisher of the page being augmented with modules.

Example Embodiment

Selectively Delivering an Article

FIG. 14 illustrates an embodiment of a portion of a webpage as rendered in a browser. The example shown is a portion of site 122, which provides customized news feeds to users based on preferences they specify through the interface shown in FIG. 14. Interface 1400 allows users to select from popular, preselected concepts and also to provide arbitrary concepts through form fields. In the example shown, Alice has indicated an interest in the concepts of "Internet Industry" and "Stock Market," the company "Acme Corp.," and the price of gold. "Internet Industry" and "Stock Market" are topics included in the taxonomy stored in database 108 and have various children. For example, in some embodiments the "Internet Industry" concept includes as children various Internet companies, famous scientists responsible for improving Internet technology, and various Internet-related products and websites. The "Stock Market" concept includes as children individual stocks, as well as various indices such as the Dow Jones Industrial Average and the Nikkei 225. Acme Corp. is also present as a node in the taxonomy. The price of gold is not a taxonomy node. However, using the categorization techniques described herein, "price of gold" is determined to correspond to the concept of "precious metals" when found in conjunction with a business intent. By selecting various other verticals, such as by selecting tab 1402, Alice can specify additional preferences for concepts, such as a preference for news articles about "diet drinks."

In a traditional news aggregation site, articles are made available to users through keyword searches. In contrast, engine 106 is configured, for each news article it receives, to categorize the news article using the techniques described above. When articles matching the interests of users are detected, they can be sent to the users and/or otherwise made available to the appropriate users through a customized news page, RSS feed, etc.

Suppose a new diet drink is brought to market. A purely keyword-based analysis of articles about the drink may fail to detect announcements made related to the launch of the product because such articles may not explicitly use the term, "diet drink." Further, Alice may be unaware of the name of the new drink (e.g., "WonderDrink") and thus is unable to specify it in a keyword search. In contrast, system 104 will be able to detect articles about the new drink as being of interest to Alice and provide them to her, either because of the inclusion of the drink in the taxonomy or because the document vector for the article will implicate the concept, "diet drinks." As another example, suppose Alice is interested in the television show "Lost." In a purely keyword-based analysis of articles, Alice would likely be overwhelmed with articles about lost pets, missing persons, sports teams that have lost games, etc. In contrast, using the classification techniques described herein, only those articles pertaining to "Lost" when it refers to the television show will be provided to Alice.

Example Process

Figure 15:
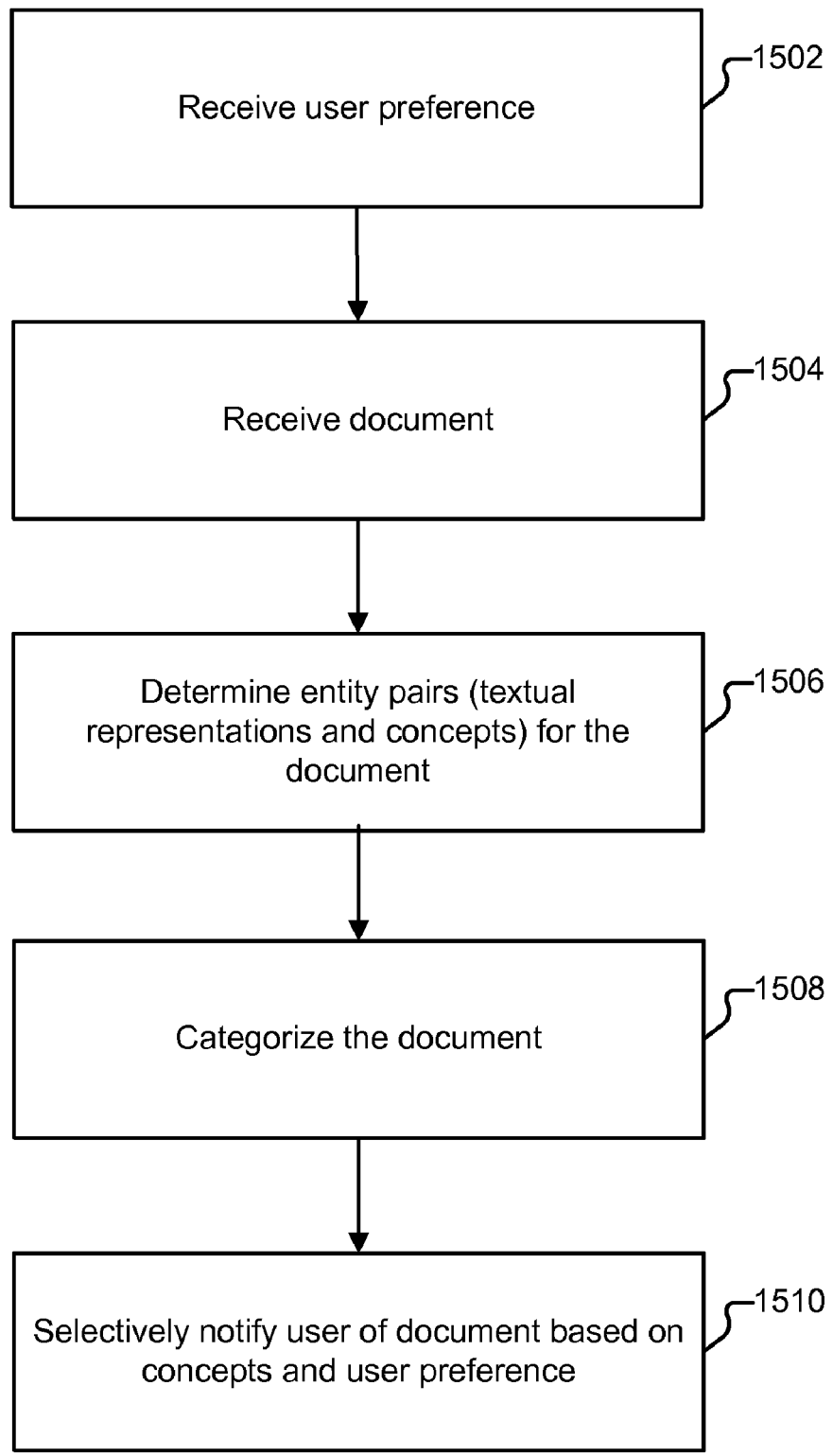
FIG. 15 illustrates an embodiment of a process for delivering an article.

FIG. 15 illustrates an embodiment of a process for delivering an article. In various embodiments, the process shown in FIG. 15 is performed by document processing engine 106. The process begins at 1502 when a user preference is received. As one example, suppose Alice selects region 1404 of interface 1400. Her preferences (e.g., for news articles pertaining to the Internet industry) are received by system 104 at 1502. As necessary, additional processing can be performed on the received preferences, such as determining appropriate concepts associated with the entries made in fill-in forms 1406-1410. One approach is to apply the query categorization techniques described in more detail below. In various embodiments, the preferences received at 1502 are stored in database 108.

At 1504, a document is received. As one example, a document is received at 1504 when a news article is provided by an online news site to system 104 via an RSS feed or other notification provided by the publisher of the news article. Other techniques can also be used to receive a document at 1502. For example, as posts are made via status update sites, such as twitter.com or facebook.com, they can be provided to system 104, such as through an API, and are other examples of "articles" that can be selectively delivered to users in accordance with the techniques described herein.

At 1506, entity pairs are determined for the document, such as in accordance with the processing shown at portions 804-808 of the process shown in FIG. 8. At 1508, the document is categorized, such by having engine 106 determine a document vector for the document. Finally, if the categorization of the received document corresponds to preferences specified by the user, the document is provided to the user and/or a notification is made available to the user alerting them to the existence of the document. As one example, Alice receives, via email, a daily "newspaper" of selected articles determined to be relevant to her preferences. As another example, plugin 132 can be configured to provide a real time news ticker of articles corresponding to Alice's preferences. In various embodiments, rules such as the number of articles to be provided to a user per day and the number of articles pertaining to a particular concept or particular vertical that should be provided to the user in a given amount of time are configurable.

Profiling

As mentioned above, one example of a document that can be classified according to the techniques described herein is a status update message, such as a post made via www.twitter.com. In various embodiments, multiple posts submitted by a particular individual user can be analyzed and their respective document vectors aggregated to profile the user.

Clustering

In various embodiments, system 104 is configured to cluster the news articles it receives (e.g., at portion 1504 of the process shown in FIG. 15). In a traditional news aggregation site, articles are clustered (e.g. on a front page) based on their sharing common key words. Accordingly, two articles about the same event may erroneously not be included in the same cluster if they use different words (e.g., feline vs. cat) to describe the same event. In contrast, engine 106 is configured to cluster documents based on their concepts.

Example Embodiment

Generating a Summarization

As explained above, in various embodiments, system 104 is configured to generate a summarization of a document. One way to generate a summarization is to use scores associated with textual representations to score the sentences in which they appear. Information such as position information can also be used, so that textual representations appearing in commonly introductory/conclusory positions are weighted more heavily than those appearing in the center of the document. The top three (or other appropriate number) sentences having the highest scores are selected as being the summarization.

The summarization process can also be biased toward certain concepts. As one example, suppose site 124 includes a lengthy biographical article discussing an athlete's life both on and off the field. Topics such as the athlete's upbringing, college career, and professional career are all discussed. A general summarization could include three sentences, one for each of the three aspects of the athlete's life.

Suppose the athlete's professional career ended early due to an injury. If the scores of the textual representations are biased based on their relevance to a vertical (e.g., health), the sentences selected for summarization will reflect this bias. In the case of the athlete, sentences appearing in the section about the athlete's injury (which include more textual representations associated with health) will have higher scores than sentences that appear elsewhere.

Creating a Hierarchy of Concepts from a Corpus of Documents

Figure 16:
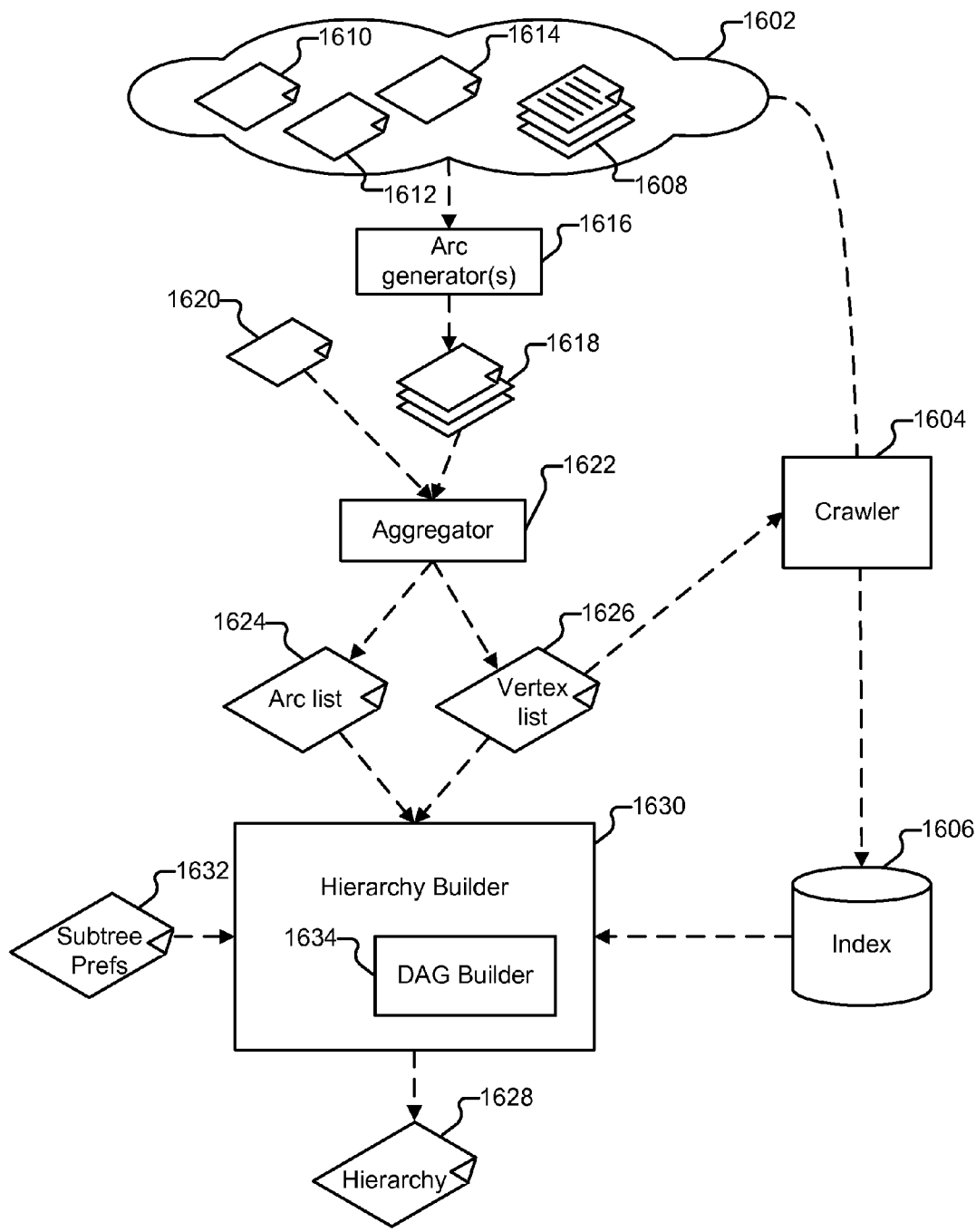
FIG. 16 illustrates an embodiment of a system for creating a hierarchy of concepts from a corpus of documents.

FIG. 16 illustrates an embodiment of a system for creating a hierarchy of concepts from a corpus of documents. In the example shown, collection 1602 includes a group of World Wide Web pages 1608, that are crawled, processed, and indexed by a crawler 1604 and stored, along with assorted scores and other information, in index 1606.

As described in more detail below, crawler 1604 performs tasks such as tagging the documents stored in index 1606 with subject type concepts and with information type concepts (also referred to herein as "infotypes"). Crawler 1604 also performs and stores the results of frequency and cooccurrence counts. Crawler 1604 may be a single device, or its functionality may be provided by multiple devices. For example, elements typically used in conjunction with a crawler to create an index, such as an indexer, are described herein as being provided by crawler 1604, but may also be performed by separate devices or components and the techniques described herein adapted accordingly. For example, in some embodiments cooccurrence counts are performed by concept lighting engine 2804.

Documents in collection 1602 can include, but are not limited to text files, multimedia files, and other content. In some embodiments, collection 1602 includes documents found on an intranet. Also included in collection 1602 are a variety of concept data sources 1610-1614. In the example shown, source 1610 is the set of web pages known collectively as Wikipedia (and available, e.g., at http://en.wikipedia.org). Source 1612 is a directory of automobile makes and models, and source 1614 is a taxonomy of pharmaceuticals. In some cases, such as with Wikipedia, the pages are used both as concept data sources, and are also included in group 1608 and are crawled accordingly. In other cases, such as with the directory of automobile makes and models, the information may be restricted or otherwise not available to crawler 1604, and the concept data source will serve only as a concept data source and not be included in group 1608.

Concept data sources 1610-1614 each provide information that conveys some kind of relation between concepts and can be used as a source of concepts and also as a source of hierarchical relations between at least some of those concepts. For example, suppose a sample entry in automobile directory 1612 is: "2008 Honda Civic Sedan XL." Using the techniques described herein it is possible to extract hierarchical information from the entry, for example that the "2008 Sedan XL" is a type of "Honda Civic," and that a "Honda Civic" is manufactured by "Honda." Pages within Wikipedia typically refer to their conceptual parents by link. For example, the Wikipedia page on the topic of "Astronomy" has a link to its parent (typically by labeling the parent as its "category"), the more general subject of "Science." The Wikipedia page on the topic of "India" includes a link to "South Asian Countries," which includes a link to "Asian Countries" which includes a link to "Countries by Continent." The entries in the pharmaceutical taxonomy are likewise related to one another in a manner that can be harvested using the techniques described herein.

For each of the concept data sources 1610-1614, one or more arc generators 1616 are used to parse the respective concept data source, extract concepts and relations between concepts, and store the information in a common format (1618) that can be consumed by aggregator 1622. For example, a Wikipedia arc generator is configured to obtain and parse Wikipedia data made available as a single XML file. From the XML file, pairs of concepts—an article and a category to which it belongs—are extracted. Another arc generator is configured to parse the automobile directory (e.g., provided as a spreadsheet) and generate arcs accordingly, such as by knowing that for each line of the spreadsheet, the first column (year) should be combined with the last column to form "2008 Sedan XL," which has as its parent the second and third column ("Honda Civic"), which has as its parent just the second column ("Honda"). As used herein, an arc is a directional edge between two concepts. A concept is a word n-gram with meaning. One relation between concepts as used herein is an "is a" ("containing") relation. For example, "Physics:Science" is an arc that means "physics is a science" ("science contains physics"). As described in more detail below, additional relations may also be employed, such as by homonym and synonym arcs. Other directed relations between arcs that convey meaning may also be employed, and the techniques described herein adapted as applicable. For example, case variants and tokenization can be handled through the use of flags.

The respective content of concept data sources 1610-1614 may change at various times, and arc generators 1616 are configured to obtain and process fresh versions of data from their corresponding concept data sources as applicable so that files 1618 reflect the most currently known concepts and relations from those sources. For example, Wikipedia (1610) changes frequently, while the content of the pharmaceutical taxonomy 1614 may change very infrequently. As such, in various embodiments, arc generators 1616 periodically process their respective sources according to a schedule appropriate to the source (e.g., with the Wikipedia arc generator running weekly, and the pharmaceutical arc generator running monthly). Editorial list 1620 is a manually maintained list of arcs and relations used, for example, to designate a fixed set of top level concepts (also referred to herein as "verticals") and to ensure that those top level concepts are not moved underneath one another or omitted.

Aggregator 1622 aggregates the source-specific arc files 1618 extracted by their respective arc generators 1616 and the editorial list of arcs 1620 and creates as output arc list 1624 and vertex list 1626. As described in more detail below, arc list 1624 is a list of edges and properties that will be used to construct a concept hierarchy 1628. Each time aggregator 1622 runs, the newly constructed arc list 1624 replaces any previously constructed arc list. Vertex list 1626 is a persistent list of globally unique concepts that monotonically increases—maintaining a set of stable concept identifiers over the iterations of aggregator 1622's processing, and growing only when a concept not previously seen is encountered by aggregator 1622, which is then appended to the list.

As described in more detail below, hierarchy builder 1630 constructs hierarchy 1628 using arc list 1624 and additional information such as a list of subtree preferences 1632 and information obtained from index 1606. The subtree preferences list 1632 includes rules to be considered by hierarchy builder 1630 when evaluating arc list 1624. In various embodiments hierarchy 1628 is stored as a list of pairs of concepts, a weight, and optionally other arc attributes such as homonym and synonym indicators. The weight is a rank indicating whether the arc is the primary arc between a concept and a parent ("1") or whether the arc is an additional arc (e.g., "2" or "3") that was inserted into the hierarchy after the primary arc was selected.

In some embodiments hierarchy builder 1630 constructs hierarchy 1628 by building a directed graph based on the information it receives, and then extracting a directed minimum spanning tree ("DMST") from that graph (in which every concept (also referred to herein as a "node") present in the tree except the root has exactly one parent, and no cycles or orphans are present). A variety of techniques for finding a minimum spanning tree have been developed. One example is the Chu/Liu-Edmonds algorithm.

Hierarchy builder 1630 optionally employs a DAG builder 1634, which inserts additional nodes into the DMST to form a directed acyclic graph ("DAG") of concepts. An optional interface allows an administrator to view why nodes are placed in the hierarchy where they are and to audit the effects of making changes to the rules used in constructing the hierarchy. For example, if certain nodes are not consistently being placed under appropriate parents, an administrator can make additions to the subtree preferences list 1632 or add entries to editorial arc list 1620 as applicable. For example, an administrator may use the interface to specify that when B has C as a parent and A has a choice of parent B or C, A should select B as its parent so that a deeper hierarchy is created. This property of A, B, and C is sometimes referred to as transitive reduction.

FIG. 17A is a portion of an arc list according to one embodiment. In the example shown—a portion of aggregated arc list 1624—lines 1702 and 1704 were provided by the Wikipedia arc list 1618, lines 1706-1710 were provided by the automobile directory arc list 1618, and line 1712 was provided by editorial arc list 1620. As described in more detail below, one task performed by hierarchy builder 1630 is a determination of a "best parent" for a concept from among its candidate parents. In the example shown, "Car Manufacturers" has two candidate parents. The first is "Transportation" as suggested by Wikipedia (1702) and the second is "Kosmix Autos" as suggested by the editorial arc list (1712).

One factor that can be considered in the determination of which candidate parent is the best, is what score is assigned (e.g., by an administrator) to each of the candidate parents' concept source (referred to herein as an "arc rank" score). Typically, the arcs provided by specialized concept sources (such as the automobile directory) are preferred over more general concept sources (such as Wikipedia). In the example shown in FIG. 17A, a lower arc rank score indicates a better (preferred) source. In some embodiments, arc rank generators 1616 are configured with what arc rank score should be assigned their respective arcs, and those scores are included in the source specific arc rank files 1618. In other embodiments, aggregator 1622 is configured by an administrator with a list of sources and their respective scores.

Wikipedia as a source has a score of 20, as indicated in region 1714. The automobile directory is considered a "better" source of information than Wikipedia for its specialized information on automobiles, and therefore, each of the arcs that are contributed to arc list 1624 by its arc list 1618 receive a score of 10, as indicated in region 1716. The editorial arc list is intended to override entries in arc list 1624 provided by source specific arc lists 1618 and has an even better (lower preference order) score as indicated in region 1718. As described in more detail below, a graph constructed from the data shown in FIG. 17A would include a leaf "Honda Civic RX" which is a "Honda Civic" which is made by "Honda" which is a "Car Manufacturer(s)" which is contained by "Kosmix Autos."

FIG. 17B is a portion of a vertex list according to one embodiment. The vertex list 1626 represents a list of all known concepts and is used by crawler 1604 to perform document frequency counts as described in more detail below. In the example shown, the vertex list is maintained in the form of human readable concept (column 1) and unique identifier (column 2). For example, "Kosmix Root," which serves as the root of the DMST produced by hierarchy builder 1630 has a unique ID of "000000," while the concept "rabbit" has a unique ID of "103817."

FIG. 17C is a portion of an arc list according to one embodiment. Some word n-grams, such as "jaguar," have ambiguous meanings absent additional context. For example, "jaguar" could refer to the automobile, the mammal, an operating system, etc. Wikipedia attempts to mitigate such ambiguity by presenting a "disambiguation page" in scenarios such as where a user types in the ambiguous term into a search box. A related problem is that of synonyms. For example, "puma," "mountain lion," "panther," and "cougar" are all terms used to refer to the animal Felidae Puma *P. concolor*. Wikipedia attempts to mitigate the proliferation of entries by designating one of the terms as a "main" entry, and redirecting to the main entry any attempts to access information by using the synonymous term. For example, "J_K_Rowling" (a pen name) is the main entry for the author whose legal name is "Joanne Murray." If a user of Wikipedia attempts to access an article on "Joanne Murray," they are redirected to the entry titled "J_K_Rowling." The homonym and synonym annotations are made available in hierarchy 1628 and can be used by a lighting system as described in more detail below.

In the example shown in FIG. 17C—a portion of aggregated arc list 1624—each of the lines was provided by the Wikipedia arc list 1618. The Wikipedia arc generator 1616 is configured to recognize disambiguation pages when parsing the Wikipedia source XML file and record as arcs the ambiguous term and each of the disambiguated options in the arc list 1618 as a pair, along with a "hom" (for homonym) flag. Each disambiguated word is given a separate entry in the vertex file, such as the "Jaguar_animal" line shown in FIG. 17B. The Wikipedia arc generator 1616 is also configured to recognize redirection pages when parsing the Wikipedia source XML file and records as arcs each of the synonyms and the main entry ("cougar") in the arc list 1618 as a pair, along with a "syn" (for synonym) flag. In some embodiments different weights are given to homonyms and/or synonyms over normal arcs instead of or in addition to the use of flags.

In some embodiments aggregator 1622 is configured to remove homonym arcs in which the ambiguous term and disambiguated term do not begin with the same word, so that the over generation of homonym arcs is reduced. For example, since "Mac OS Jaguar" does not begin with "Jag-uar," it is removed (or omitted, as applicable) from arc list 1624. As another example, Wikipedia offers "Fiona Apple" as a disambiguation of "Apple." Such an arc would likewise be deleted or omitted from arc list 1624.

FIG. 17D is a portion of a subtree preferences list according to one embodiment. In the example shown, the first column is the name of a concept, the second column is a score, and the third column is a depth. When hierarchy builder 1630 determines a best parent for a concept from among its candidate parents, one factor that can be considered is whether there is relevant information in the subtree preferences list. A subtree preferences list can be used to reduce the likelihood that a bad parent (e.g., that does not maintain the "is a"/containing relationship) will be selected over a better parent (e.g., that does preserve the relation). For example, many famous people will have as a candidate parent the concept "living people." There are over 300,000 such entries in Wikipedia. Entry 1782 in the subtree preferences list states that any arc in which a concept has as a candidate parent "living people" is to be disfavored. Concepts such as "living people" and "things in 1900" exist in Wikipedia but their inclusion in hierarchy 1628 is generally disfavored. While Stephen Hawking and Sting are both "living people" and contained by that Wikipedia category, a more meaningful hierarchy can be constructed if their respective parents are "Scientists" and "Musicians." Virtually all people present in the living people category of Wikipedia have something to recommend about themselves beyond the fact that they are alive. Such arcs are disfavored rather than discarded in some embodiments to avoid creating orphan nodes.

In contrast, entry 1780 states that any chain of arcs (with up to 3 levels distance) that includes a parent of "countries by continent" is to be preferred. In some embodiments entries in the subtree preferences list are applicable at all depths and the depth column is omitted. What entries should be included in the subtree preferences list (and what scores/depths should be assigned) is generally subjective, and can be refined over time, such as by evaluating logs. The subtree preferences provide a mechanism for an administrator to remove or favor a potentially large number of arcs without having to manually enter rules for each arc. For example, by preferring "countries by continent," all countries listed in Wikipedia will tend to be grouped under countries by continent (possibly at varying depth levels), and an administrator need not specify a rule for each country.

Figure 18:
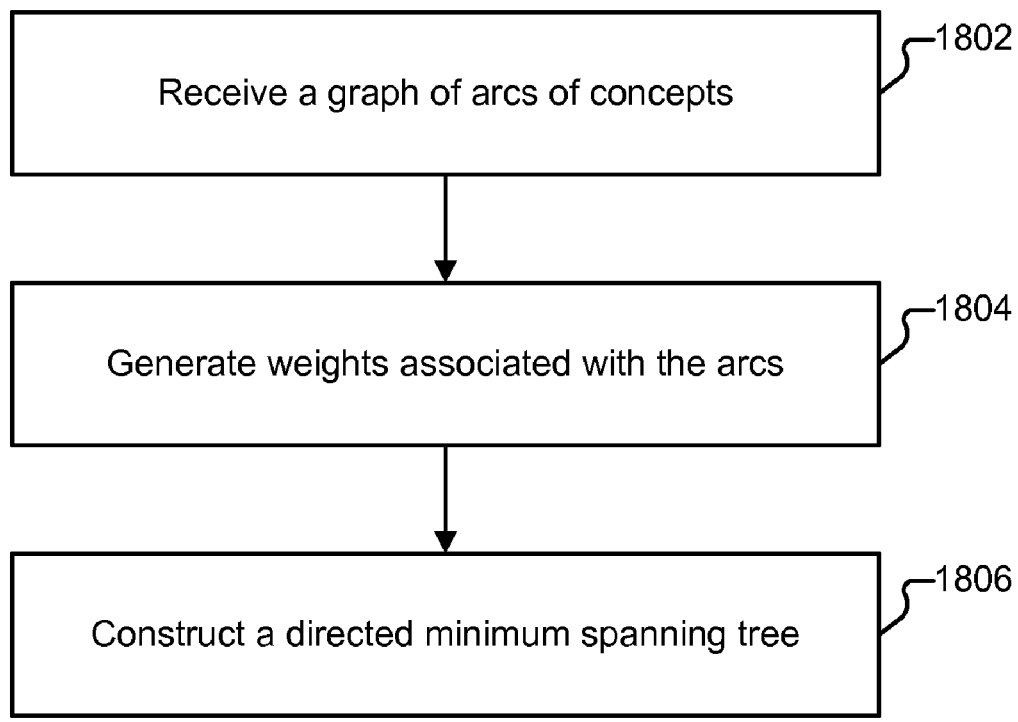
FIG. 18 is a flow chart illustrating an embodiment of a process for creating a hierarchy of concepts from a corpus of documents.

FIG. 18 is a flow chart illustrating an embodiment of a process for creating a hierarchy of concepts from a corpus of documents. In some embodiments the process shown in FIG. 18 is performed by hierarchy builder 1630.

The process begins at 1802 when a graph of arcs of concepts is received. In some embodiments the graph includes the XML representation of Wikipedia. In some embodiments the graph comprises an arc list such as arc list 1624. Other sources of arcs of concepts, at least some of which can be connected to form a graph (irrespective of whether that graph contains some orphans or cycles) may also be used, as applicable. For example, in some embodiments a graph or portions thereof is received from a third party at 1802.

At 1804, weights associated with the arcs in the graph are generated. As described in more detail below, a variety of techniques can be used, individually and in combination, to generate weights at 1804. For example, arc rank scores, Boolean values, cooccurrence scores, mutual information, etc., can be used to form a single weight or a vector of weights at 1804.

At 1806, a directed minimum spanning tree is extracted from the graph received at 1802. In some embodiments preprocessing is performed, such as to remove orphan nodes which cannot be reached from the root, and the directed minimum spanning tree is extracted from the preprocessed graph rather than the graph as received at 1802. One way of constructing a DMST is as follows. For each node in the graph, a single parent is selected, such as by using the vector of weights generated at 1804 to evaluate candidate parents. By biasing the selection of parents toward the best parent (e.g., the one with the lowest source score), an attempt is made to preserve the consistency of the "is a"/containing relationship up the DMST, such as that calculus is a form of mathematics. Next, any cycles in the graph are detected by hierarchy builder 1630. An example of a cycle is an arc from "ships" to "boats" and another from "boats" to "ships" both being present in the graph. Sometimes cycles are created in Wikipedia data because two nodes are imputed to have a hierarchical relationship when they are in fact peers. For example a node "Bert" may have as a parent "Ernie" and vice versa. Hierarchy builder 1630 runs a process to reduce the number of cycles. The selection of a best parent, the detection of cycles, and the reduction of cycles continues iteratively until an acyclic tree is formed. As described in more detail below, optional post processing can be performed on the acyclic tree.

FIG. 19 illustrates an example of a vector of weights according to one embodiment. Suppose that two arcs for the concept "Ronald Reagan" (1902) are present in arc list 1624. As mentioned previously, one portion of the process for constructing a DMST from a graph of directed arcs is to select one parent from among the candidate parents of a node. Generally if only one arc for a concept exists, that arc is used. If the candidate parent must be selected from multiple candidates, in some embodiments a pairwise lexicographical comparison is performed between the vectors of weights of those candidates. In the example shown in FIG. 19, the two candidate parents of "Ronald Reagan" are "U.S. President" and "Actor" (1904). Indeed, Ronald Reagan was both a U.S. President and an actor, so the selection of either candidate would result in the preservation of the "is a" meaning between the node in column 1902 and the node in column 1904.

In various embodiments, some values included in the vector of weights are read in from files, and others are provided by additional processes (e.g., plugins) which calculate and provide scores. The first portion of the vector of weights to compare between the two candidates is the "variance" score, indicated in column 1906. The variance score indicates the number of internal links which point to the candidate parent. Both candidate parents have a score of three, meaning that the vectors are tied, so the next portion of the vector is evaluated.

The next portion of the vector of weights to compare between the two candidates is the "vertical correction" score, indicated in column 1908. In some embodiments the construction of a DMST is performed twice. The first time it is run, the vertical correction score is zero. The second time it is run, a vertical correction score is determined by a process that attempts to keep nodes that are peers grouped together under the same parent. For example, suppose that 95% of house plants are placed under "botany," but 5% select as best parents "health" on the first run. The vertical correction process is configured to detect the discrepancy and will indicate that a "botany" parent should be selected by returning a nonzero score in column 1908 (such as a Boolean value) during the second run. In various embodiments, normalization and/or a threshold is applied so that in cases such as a 60/40 split, the vertical correction process does not attempt to group peers under the same parent. In the example shown, both candidates have a score of zero. The vectors are tied, so the next portion of the vector is evaluated.

The next portion of the vector of weights to compare between the two candidates is the "templates" score, indicated in column 1910. The value for the templates score is provided by a process that evaluates nodes against groups or lists of concepts and attempts to keep those groups together. If concepts are present in multiple groups, the process attempts to keep the most number of groups, or the most important groups together, etc., as applicable. The lists/groups may be provided by a third party and/or configured by an administrator or otherwise obtained. For example, Wikipedia provides set information for certain entries which can be scraped by crawler 1604. Examples of groups include a list of the planets in the solar system, a list of human diseases, a list of the seven dwarves, British Commonwealth countries, etc. In the example shown, Ronald Reagan appears in a list of United States presidents. As such, a score of one is present in column 1910 for "U.S. President" but not for "Actor." Since there is no longer a tie between the two vectors, "U.S. President" would be selected as the best parent for the concept "Ronald Reagan." If both values in column 1910 were equal, however, the next portion of the vector would be evaluated, and so on, until the tie was broken. In the example shown, the remaining columns are as follows. Column 1912 reports whether a process evaluating the loaded subtree preferences list 1632 has determined that a positive or negative preference exists for the arc. If no such preference is found, column 1912 reports a zero. If a preference is found, it is indicated in some embodiments as a positive or negative value. Column 1914 is the arc rank score described previously.

Columns 1916, 1918, and 1920 report various statistics about the presence of the concept and its candidate parent within the documents stored in index 1606.

The "occ" column (1916) includes a score that represents a frequency count for the concept. A frequency count indicates the frequency of the occurrence of the concept within the pages in index 1606. The frequency count is determined in some embodiments by crawler 1604 using vertex list 1626 to scan through each of the documents in index 1606 and increment the "occ" for the concept for each page in the index that includes at least one occurrence of the concept. The "pocc" column similarly represents a frequency count for the candidate parent.

The "cooc" column includes a score that represents the cooccurrence of the concept and candidate parent in the pages in index 1606. Cooccurrence scores are determined in some embodiments by crawler 1604 evaluating the cooccurrence of concepts which are connected by an arc (e.g., are present in arc list 1624). Techniques such as using a running window of words can also be employed to avoid quadratic blowup.

Figure 20:
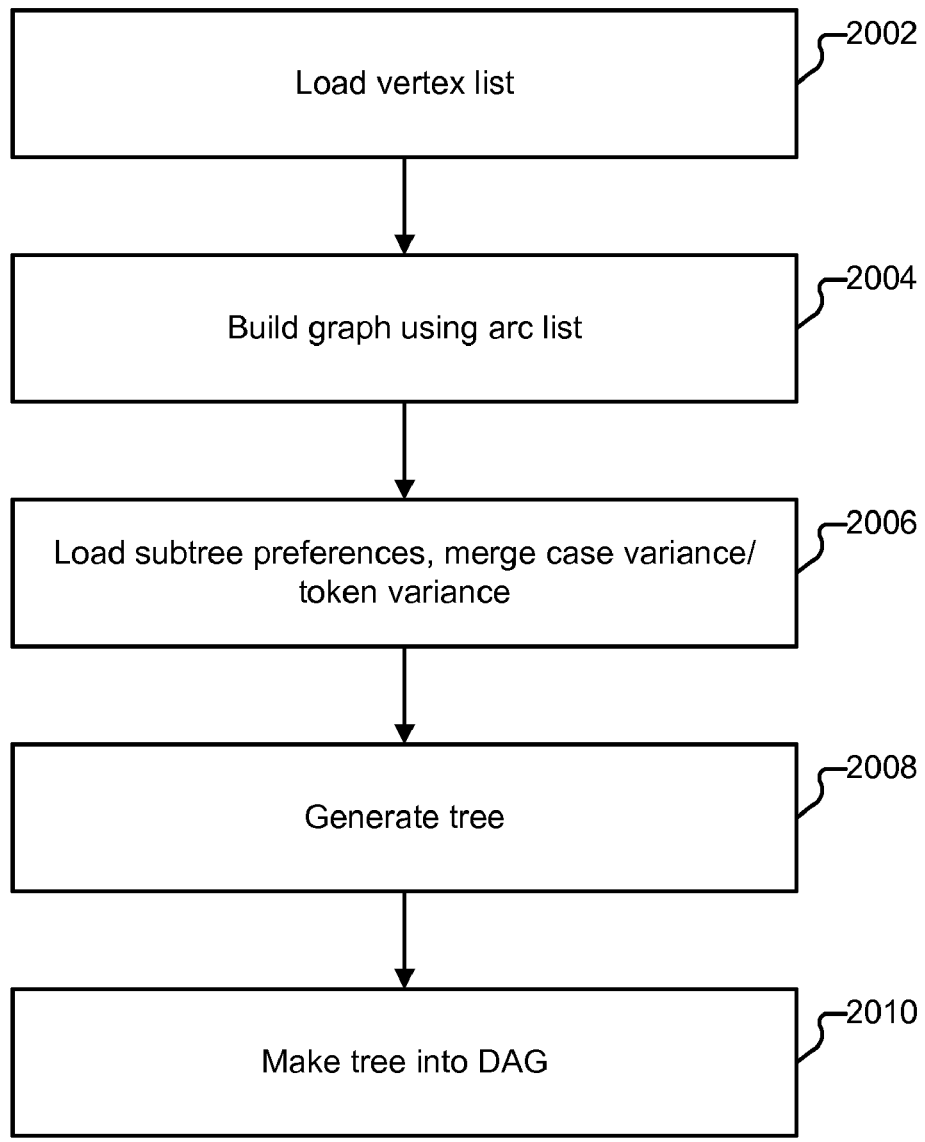
FIG. 20 is a flow chart illustrating an embodiment of a process for creating a hierarchy of concepts from a corpus of documents.

FIG. 20 is a flow chart illustrating an embodiment of a process for creating a hierarchy of concepts from a corpus of documents. In some embodiments the process shown in FIG. 20 is performed by hierarchy builder 1630.

The process begins at 2002 when vertex list 1626 is loaded, allowing hierarchy builder 1630 to map concept names (e.g. human readable concept names) to concept IDs. At 2004, a graph is built using arc list 1624—for example by connecting pairs of concepts together and storing any associated properties. If duplicate arcs are encountered, the properties of the duplicate arcs are merged. For example, if one line in arc list 1624 reads Physics:Science:20 and another line in arc list 1624 reads Physics:Science:10, the arcs are "merged" with the best weight being preserved (e.g., Physics:Science:10). If one source indicates that an arc is a homonym arc, and another source indicates that the arc is a synonym arc, the arcs are merged and both flags are set for the merged arc. At 2006 subtree preferences list 1632 is loaded, as are any applicable case variance or tokenization variance information.

At 2008, a DMST is constructed. First a best parent is selected for each node by performing a local decision comparing vectors of weights. Next, cycles are detected. One way of detecting cycles is to traverse the graph, marking each node as "seen" as it is visited. If a node is reached again during the traversal, a cycle has been located. For each cycle, an evaluation is made between the cost of removing an arc and the cost of adding an incident arc, and selecting the appropriate arcs whose addition/removal have the lowest associated cost. In some embodiments the comparison is a difference of vectors, and is computed by replacing the values in the vectors with minwise elements. As stated previously, the selection of a single parent, the detection of cycles, and the reduction of cycles continues until each node (except the root) has exactly one parent. In some embodiments post processing is performed, such as vertical correction.

At 2010 the DMST is extended to a DAG using additional arcs. For example, at 2010 synonym arcs are inserted into the DMST, as are homonym arcs, so long as acyclicity is preserved. In some cases, additional concept arcs are included in the DAG where doing so would not result in the formation of a cycle. For example, including "Actor" as a second parent of "Ronald Reagan" will not result in a cycle and will preserve the "is a" relationship up the hierarchy. However, the insertion of other arcs (not previously shown) such as between "Ronald Reagan" and "Hollywood Walk of Frame" might be inappropriate, e.g. because the "is a"/containing relation would be skewed away (e.g. if the parent of "Hollywood Walk of Frame" is "Landmarks"—Ronald Reagan is not a Landmark). One way of inserting additional arcs into the DMST is to first globally rank the omitted arcs. Rules can be used such as that additional arcs will be inserted into the DAG, in the globally ranked order, so long as the arc to be inserted is of a smaller depth than the existing single parent for the node, or that arcs can be inserted within the same vertical but only one additional arc may be added into a different vertical from the existing single parent, or that additional arcs must have a threshold cooccurrence score before they are placed into the DAG.

In some embodiments at least some orphan nodes are placed back into the DMST at 2010. One way of placing orphans is to perform a search using the orphan as an input to the query categorization techniques described in more detail below. If the results are sufficiently dense, the orphan can be placed in the appropriate place in the DAG. Similarly, the hierarchy of concepts can be expanded by crawling the documents 1608 for word n-grams and also attempting to place them into the DAG by using the word n-grams as an input to the query categorization techniques described in more detail below.

Figure 21:
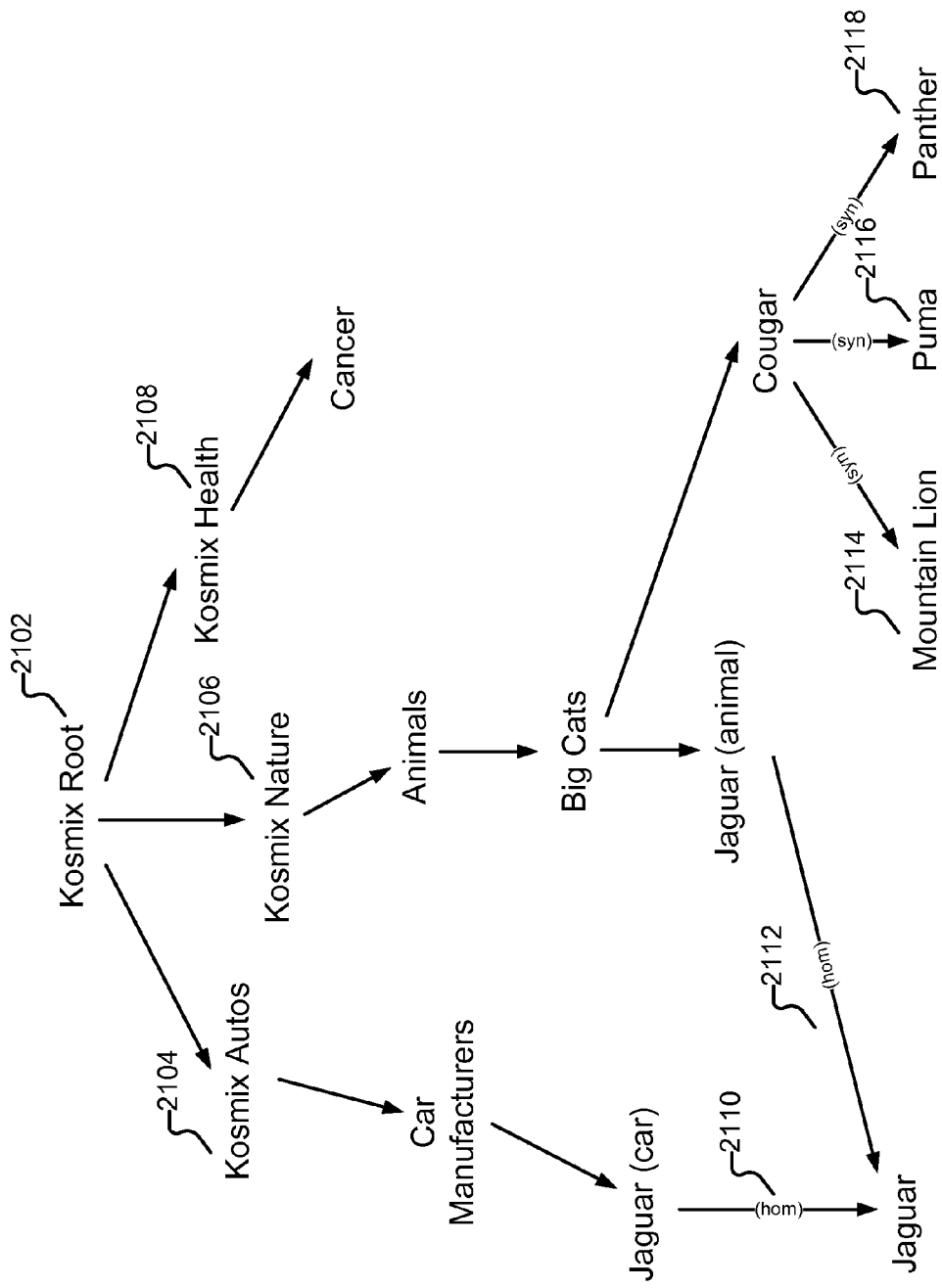
FIG. 21 illustrates an example of a portion of a concept hierarchy.

FIG. 21 illustrates an example of a portion of a concept hierarchy. The example shown is an example of a portion of a DAG created using the process shown in FIG. 20. At the root of the hierarchy is a root node 2102. Assorted verticals 2104-2108 have a containing relation to their respective children. For example, Kosmix Autos contains Car Manufacturers which contains the Jaguar automobile manufacturer. Homonym arcs 2110 and 2112 exist between the ambiguous term, Jaguar, to two of the disambiguated meanings of the concept. Synonym arcs 2114-2118 exist between the main instance of the concept "Cougar" and assorted synonyms for the concept.

Tagging Documents with Concepts

Figure 22:
FIG. 22 illustrates an example of a hierarchy of information types according to some embodiments.

FIG. 22 illustrates an example of a hierarchy of information types according to some embodiments. Both the hierarchy of subject type concepts 1628 constructed by hierarchy builder 1630 (or received, for example from a third party such as by using the Open Directory) and a hierarchy of infotypes such as is shown in FIG. 22 can be used to tag the documents stored in index 1606 using a variety of techniques.

One way of tagging a document in index 1606 with subject type concepts is as follows. For each concept in vertex list 1626, use the concept as a search query against the documents in index 1606. Evaluate the results using standard text match and link scoring techniques (e.g., by examining the number of occurrences of the query on the page, the page title, the link text, metadata, whether the concept appears in bold, etc). Such techniques, which measure how well the text of a query matches a document are collectively referred to herein as "text match scoring" techniques producing "text match scores" although more than just the text of the document may be evaluated by such techniques.

For any particular page, the concept (query) which results in the highest text match score for the page is that page's top concept. The concept which results in the second highest text match score for the page is that page's second concept, etc. Any given document may include thousands of concepts from vertex list 1626. Thus in some embodiments a threshold is applied and the document is tagged with its resulting top n concepts, such as the top 30 concepts.

Websites typically have common elements across the various pages that are included in that site. For example, a news website may include a left or right navigational section that includes the terms, "Health," "Finance," "World News," etc. The site may also include a prominent logo on every page. In some embodiments such common elements are identified and ignored or stripped during indexing so that text match scores are not skewed by the prolific presence of those common elements. Identifying and ignoring or stripping common elements allows text match scores and infotype rules to be applied specifically to the distinct content of each document.

One way of tagging a document in index 1606 with an infotype is to determine whether any rules associated with those infotypes is satisfied by the document. For example, documents hosted by a known image hosting service (e.g., stock-photo library), or having an image with a certain minimum pixel size may be indicative of an image type document (e.g., a document having one or more informative images), and be tagged as having an infotype "images." Conversely, documents with discouraging ALT text (e.g., "advertisement"), a standard advertisement size or location, and generic filenames suggestive of being merely decorative or formatting elements (e.g., "pixel.gif", "footer.jpg") indicate that while including an image, the document is unlikely to be of interest to a user seeking images and are not tagged with the "images" infotype.

Documents hosted by a known news site (e.g., www.wsj.com), having a title indicative of a news source (e.g., "Breaking News"), or including a copyright notice from a known news agency/newswire (e.g., "Associated Press") are tagged as being of infotype news. Documents with a title that includes words such as "event," "calendar," "upcoming," etc., are tagged with the "events" infotype. Documents that include terms specific to categories of local venues (e.g., amusement parks, toy stores, police stations, That restaurants, dentists) or including links to map services are tagged with the "local" infotype. Documents that include terms (e.g., appearing on a wordlist) such as "add to cart," "coupon," and "checkout" are tagged with a "shopping" infotype, etc.

If multiple rules for different infotypes are satisfied by a document, the document is tagged with multiple infotypes as applicable. For example, a photojournalist's blog about current events might be tagged with both the "images" and the "news" infotypes.

The top concepts for a document are stored in index 1606 and are used in a variety of ways, as described in more detail below.

Lighting Concepts

Figure 23:
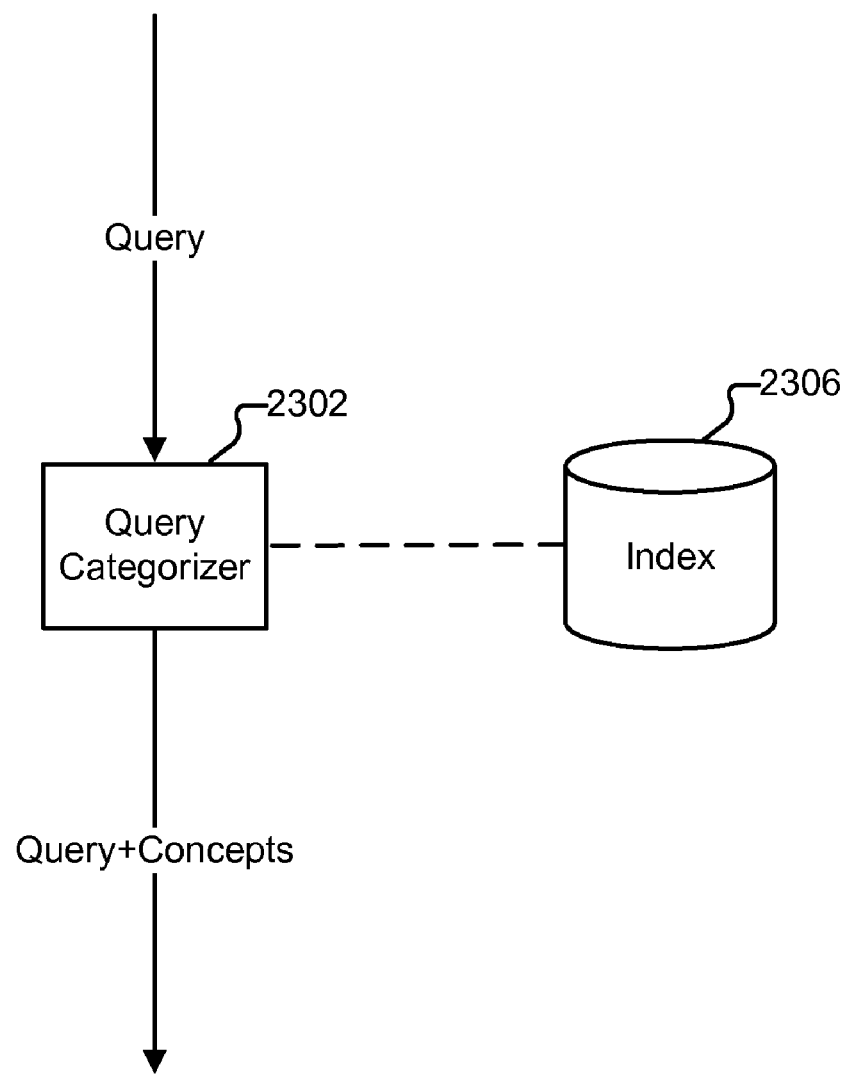
FIG. 23 illustrates an example of a system for categorizing a query.

FIG. 23 illustrates an example of a system for categorizing a query. In some embodiments index 2306 is index 1606. Query categorizer 2302 receives queries as input. While only one query categorizer is shown in FIG. 23, in some embodiments multiple query categorizers may be included in the system (and operate on slices of the index) so that many queries can be received and processed simultaneously, such as when query categorizer 2302 is used in conjunction with a user-facing search engine, or when processing orphans received from hierarchy builder 1630. As described in more detail below, query categorizer 2302 consults information stored in index 2306 to determine a list of one or more concepts associated with the received query. The output of query categorizer 2302 is used in some embodiments as an input to additional processing, also as described in more detail below.

Figure 24:
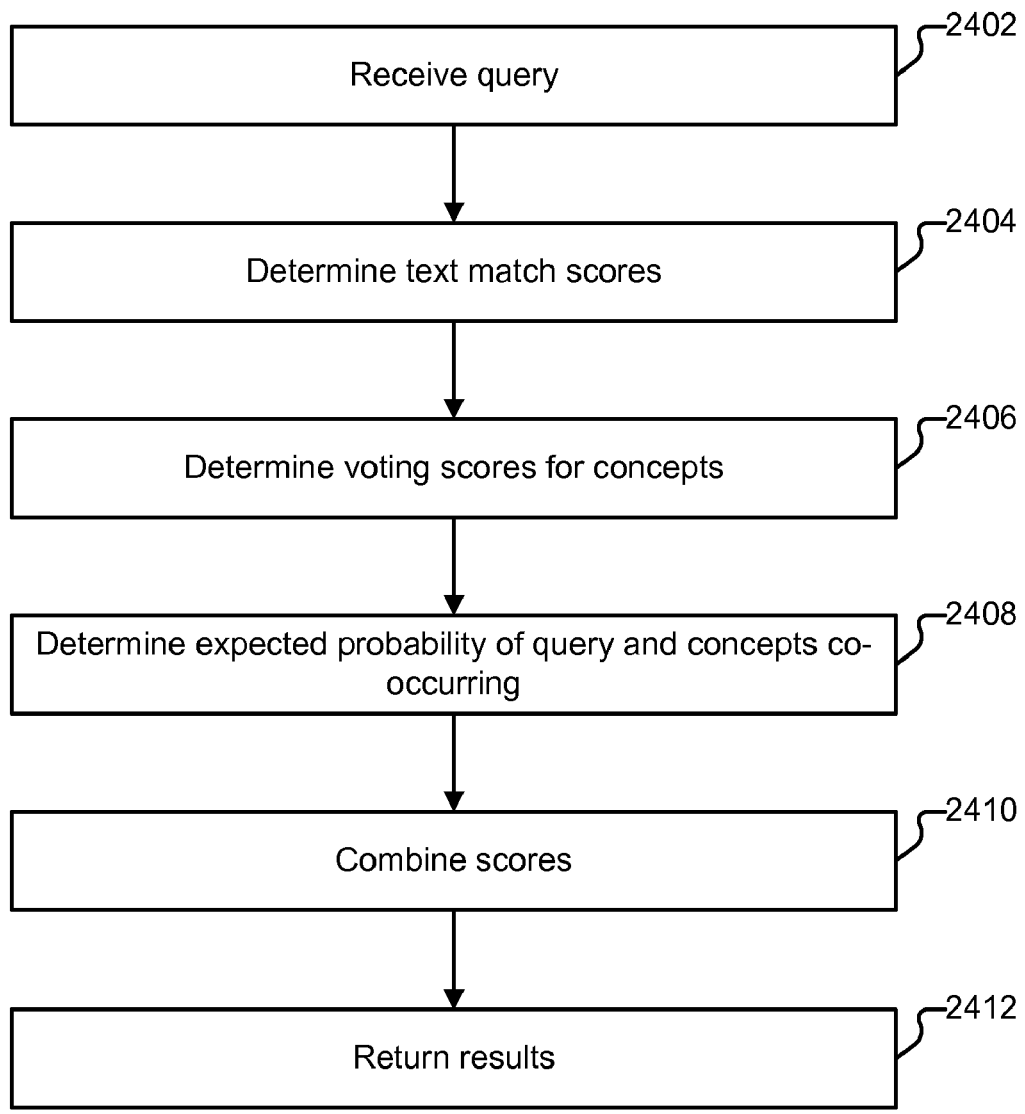
FIG. 24 illustrates an example of a process for categorizing a query.

FIG. 24 illustrates an example of a process for categorizing a query. In some embodiments the process shown in FIG. 24 is performed by query categorizer 2302. The process begins at 2402 when a query is received. At 2404, a search of an index, such as index 2306 is performed, using the received query and text match scores that are received for the results. In some embodiments a PageRank score is computed as part of the text match score determination. Other scoring techniques may also be used.

Suppose there are 20,000 documents stored in index 2306 and that the query received at 2402 is "What kind of metal is the Eiffel Tower made out of?" Of the 20,000 documents, suppose 350 results are found. The first result is the best match (e.g., one describing the history of the construction of the Eiffel Tower and containing many instances of the query) and the $350^{th}$ result is the worst result (e.g., containing all of the words of the query, but with those words appearing in disjoint areas of the document instead of next to one another). Each of the 350 results corresponds with a document stored in index 2306. If the documents stored in index 2306 have been tagged with concepts, such as by using the techniques described herein, then each of the 350 results also has an associated set of concepts.

At 2406, the query results and the concept information stored about the results in index 2306 are combined to determine a set of scores for concepts (a process referred to herein as "voting"). One technique for determining voting scores is as follows. First, examine each result and obtain a list of all of the top concepts reflected in the results. (E.g., take a union of all of the concepts tagged to all of the results.) Next, for each concept in the union (also referred to herein as the "candidate concepts" list), assign that concept a score equal to the sum of the text match scores of each of the documents in the results which includes the concept in its list of top concepts. In some embodiments the text match scores are normalized. Suppose, for example, that only the top 100 results are used (and the remaining 250 results are discarded). The best result is assigned a score of 1. Each of that result's top concepts (e.g., topics T1, T5, and T20) receives a score of 1 from the result. Suppose that the next best result is assigned a score of 0.99. Each of that result's top concepts (e.g., topics T1, T2, and T3) receives a score of 0.99 from that result, and so on. After evaluating the first two results, topic T1 has a score of 1.99, topics T2 and T3 have a score of 0.99, and topics T5 and T20 have a score of 1. In some embodiments the voting scores are not weighted, but instead each concept receives one count for every result that listed that concept as one of its top concepts. Other voting techniques can also be used as applicable.

At 2408, for each concept (e.g., the candidate concepts) the expected number of documents that the query and the concept would occur in at random is determined. This is referred to as an "expected cooccurrence" and is computed as follows in some embodiments. The probability of the cooccurrence of the query and the concept is equal to the probability of the query occurring multiplied by the probability of the concept occurring. This can be expressed as:

$$P(\text{query and concept}) = \frac{QueryDF}{IndexSize} \times \frac{ConceptDF}{IndexSize}.$$

The "QueryDF" is the number of documents in the index in which the query appears, and the "ConceptDF" is the number of documents in the index which are tagged with the concept. The expected cooccurrence is IndexSize×P(query and concept). The expected cooccurrence is then compared to the observed cooccurrence. If the observed cooccurrence exceeds the expected cooccurrence by a threshold amount, the concept is referred to as having been "lit"—the query is potentially related to the lit concept.

At 2410, the various scores are combined into a combination score. In some embodiments at 2410, logistic regression is used to determine how to combine, for a given concept, the text match scores, voting scores, expected cooccurrence scores, and the actual number of documents that the query was matched with and the concept occurred in (the "observed cooccurrence"). Other techniques may also be used to determine the best coefficients and/or to combine the scores. For example, coefficients can be added, some multiplied and others added, and powers can also be used.

At 2412, results, such as an ordered list of all of the candidate concepts is returned. In some embodiments additional processing is performed. For example, a threshold may be applied such that only the most highly scored n concepts are returned, or only the highest concept is returned. A confidence score may also be computed. For example, of all of the candidate concepts, their respective combination scores may be normalized, and the concepts may be assigned into buckets such as "high confidence," "medium confidence," and "low confidence" based on their normalized scores.

The process shown in FIG. 24 can be adapted to determine a list of infotype concepts in addition to or instead of a list of subject type concepts associated with the query. For example, at 2406, in addition to voting for the subject type concepts, a document can also vote for the infotypes with which it is associated and the highest scoring infotypes can also be returned at 2412 as applicable.

Figure 25:
FIG. 25 illustrates an example of scores determined as part of a process for associating a query with a concept.

FIG. 25 illustrates an example of scores determined as part of a process for associating a query with a concept. In some embodiments the scores shown in FIG. 25 are computed as part of the process shown in FIG. 24. Suppose index 2306 includes 400 million documents, that a user has provided as a query the word "jaguar," and that 34898 results are obtained (i.e., the QueryDF is 34898). Column 2502 lists assorted concepts with which documents in the index that are results of a "jaguar" query are tagged. The concepts are sorted according to their "final score" (2504). In the example shown, the final score is a combined score such as the one computed at 2410 in the process shown in FIG. 24. The combination function used in this example is:

$$c_1 \times \log(TextScore) + c_2 \times \log(ExpectedCoOccurrence) +$$
$$c_3 \times \log(ObservedCoOccurrence) + c_4 \times \log\left(\frac{TextScore}{MaxTextScore}\right),$$

where the TextScore is an average of the text match scores given to the top 100 documents that matched the query, and where the MaxTextScore is the highest text score that any concept received for the query. The constraints $c_1$, $c_2$, $c_3$, and $c_4$ were selected by running logistic regression on a set of 100 queries and their matched concepts. The values used in the example shown are $c_1$=2.0151, $c_2$=−1.2769, $c_3$=1.1504, and $c_4$=0.51. The constraints can be manually adjusted as applicable.

Column 2506 lists the TextScores of the respective concepts. Column 2508 lists the observed cooccurrence of the concept and the query, column 2510 lists the Concept DF, and column 2512 lists the expected cooccurrence of the concept and the query. Column 2514 is a confidence score, computed by using a hard threshold on the final score. In the example shown, a final score above 2300 is assigned a confidence of 10, a final score above 2200 is assigned a confidence of 9, a final score above 2100 is assigned a confidence of 8, etc. Concepts with final scores equivalent to a confidence of 0 (less than 1500) are automatically removed.

In the example shown, the three top concepts for the query "jaguar" are the automobile (2520), the mammal (2522), and the sports team (2524). They each have a high confidence score. Other concepts, such as a specific model of automobile (2526), and a player on the sports team (2528) also have high confidence scores. As the confidence scores diminish, the corresponding concepts appear to be less directly relevant to a query of "jaguar" but remain clumped within one of the three main meanings. For example, concepts 2530, 2538, 2540, 2546, and 2562 are each related to the notion of "jaguar" being the sports team. Concepts 2532, 2534, 2536, 2542, 2544, 2548, 2550, 2556, 2558, 2560, and 2564 are each related to the notion of "jaguar" being the automobile. In some embodiments the related concepts are clumped within different meanings as follows. First a list of contexts is obtained, such as by using concepts which have high confidence and have homonym parents. Homonym parents are the different meanings of that concept. A list of the homonyms is a list of all possible meanings of the query. Each concept is then said to be in the context of the homonym nearest to it in the DAG.

Figure 26:
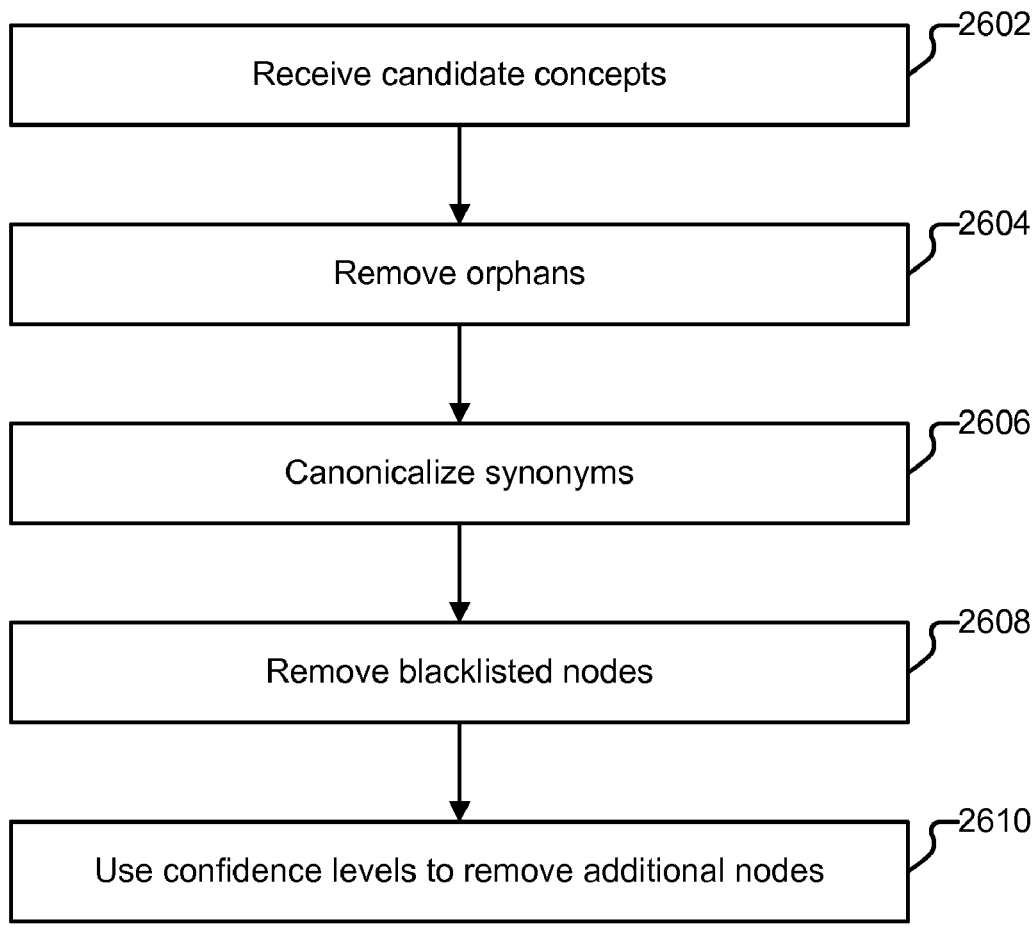
FIG. 26 illustrates an example of a process for cleaning concepts.

FIG. 26 illustrates an example of a process for cleaning concepts. In some embodiments the process shown in FIG. 26 is performed by query categorizer 2302. The process begins at 2602 when a list of concepts and associated scores is received. In various embodiments the processing shown in FIG. 26 is performed in conjunction with the processing shown in FIG. 24. For example, the processing of FIG. 24 can be completed (resulting in a list of candidate concepts and their respective scores) and the output of that process used as input at 2602. The processing shown in FIGS. 24 and 26 can also be interleaved and redundant or unnecessary steps are omitted as applicable. For example, orphan removal may occur prior to the determination of a final score.

At 2604, any candidate concepts that are not also present in concept hierarchy 1628 are removed. This is known as orphan removal. At 2606, synonyms are resolved to their canonical concepts. In the hierarchy shown in FIG. 21, "cougar" is the canonical concept for synonyms "mountain lion," "puma," and "panther." The synonyms are replaced by their canonical concept and the canonical concept receives the highest score of any of its synonyms. For example, in FIG. 25, liter (2542) and liter (2560) are synonyms. During synonym resolution, these two concepts would be combined, taking on the final score of "liter" which is the highest. At 2608, blacklist concepts are removed. Examples of blacklist concepts include spam, pornography, or other portions of the hierarchy that a person has manually blacklisted. At 2610, additional concepts are removed based on their confidence levels and location in hierarchy 1628. Concepts without a sufficient number of supporting concepts in the same area of the graph are removed. One way of removing these outlier concepts is as follows. Concepts with a confidence level of 10 are not removed. For concepts with a confidence level of 9, examine whether the ancestors of that concept (up to 9 levels away) have any children that are also candidate concepts. If not, the concept is removed. For concepts with a confidence level of 8, examine whether the ancestors (up to 8 levels away) have any children that are also candidate concepts. If not the concept is removed, and so on. In some embodiments additional processing is performed, such as by automatically resolving certain kinds of ambiguities and identifying ambiguous queries that cannot be automatically resolved, and by automatically grouping candidate concepts under their parents.

Figure 27:
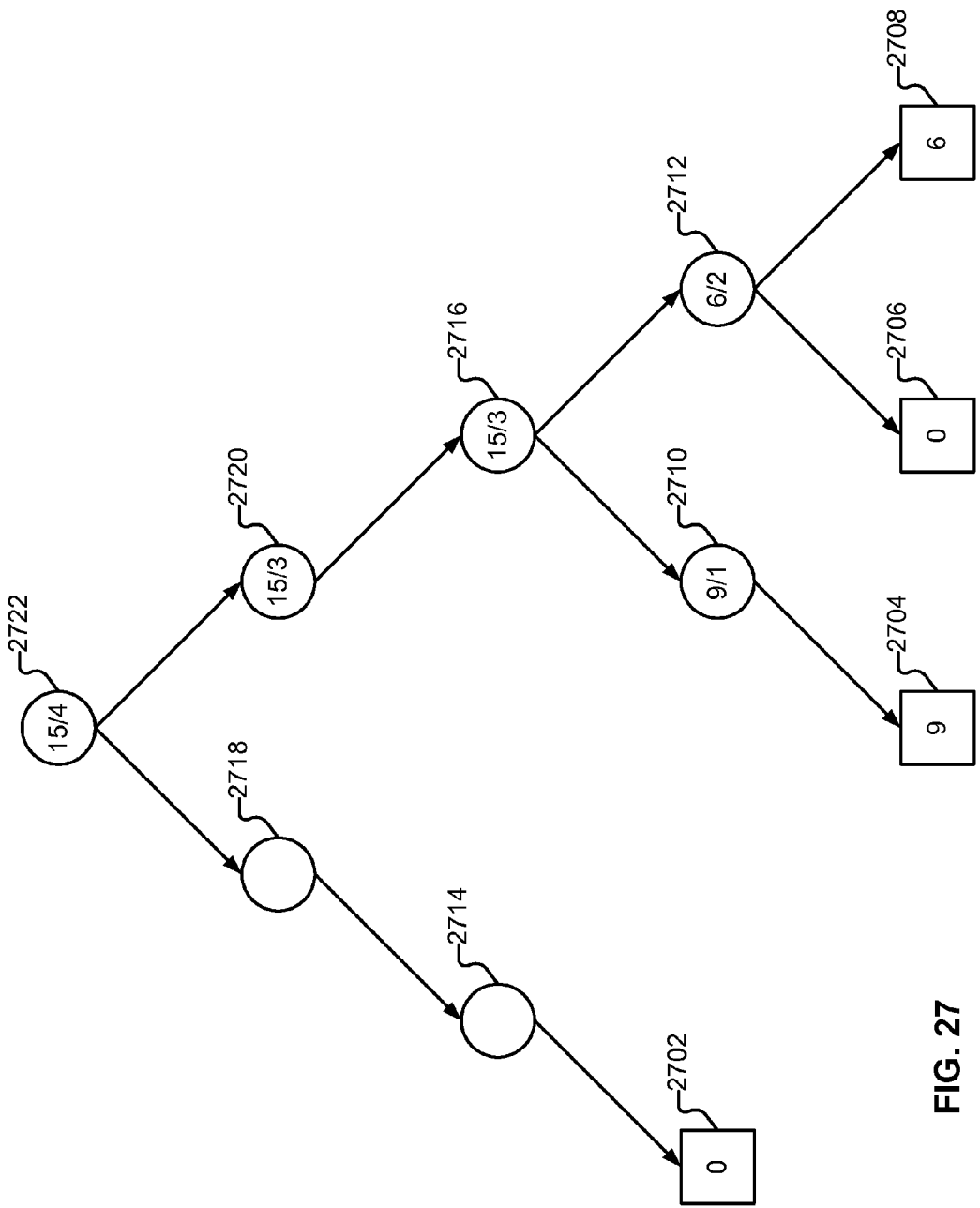
FIG. 27 illustrates an example of a concept hierarchy and scores associated with a query.

FIG. 27 illustrates an example of a concept hierarchy and scores associated with a query. In the example shown, the concept hierarchy includes 11 concepts. Nodes 2702, 2704, 2706, and 2708 are leaf nodes—they do not have any children and are represented by squares. In the example shown, the numbers inside each of the leaf node boxes is an "affinity score"—a measure of how closely the concept matched the query. In some embodiments the affinity score is the normalized combination score as determined using the techniques described above. In the example shown, concepts 2702 and 2706 did not match the query (i.e., no documents tagged with concept 2702 or 2706 matched the query, or the matches were of very poor quality) and thus have no score. Concept 2704 received a score of 9 and concept 2708 received a score of 6.

As described in more detail below, scores can be assigned to concepts which did not match the query in a variety of ways. For example, a relation can be determined between a summation of the affinity scores of the children under a parent, and the number of paths that can be taken from the parent to its children and used as a measure of how well the query matched that parent concept. A score determined in such a manner is referred to herein as a "density score." A density function is any function that relates node scores and some kind of volume, such as the number of children (or leaf level concepts), under a parent. Affinity scores need not be combination scores. For example, in some embodiments the density function uses as a node score a "1" for any leaf node that was determined to have matched the query and a zero for all other leaf nodes.

In the example shown, the density score of node 2712 is 3. Node 2708 contributes 6 points, while node 2706 does not contribute any. There are a total of two paths which can be taken from node 2712 to the leaf level. The density score of node 2710 is 9, like its child node 2704. The density score of node 2716 is 5. The density score of node 2720 is also 5, because while it is one level higher in the hierarchy, it has only one child (and thus has the same number of paths available as that child). The scores of nodes 2714 and 2718 are undefined because the score of node 2702 is 0. The score of node 2722 is 3.75.

Figure 28:
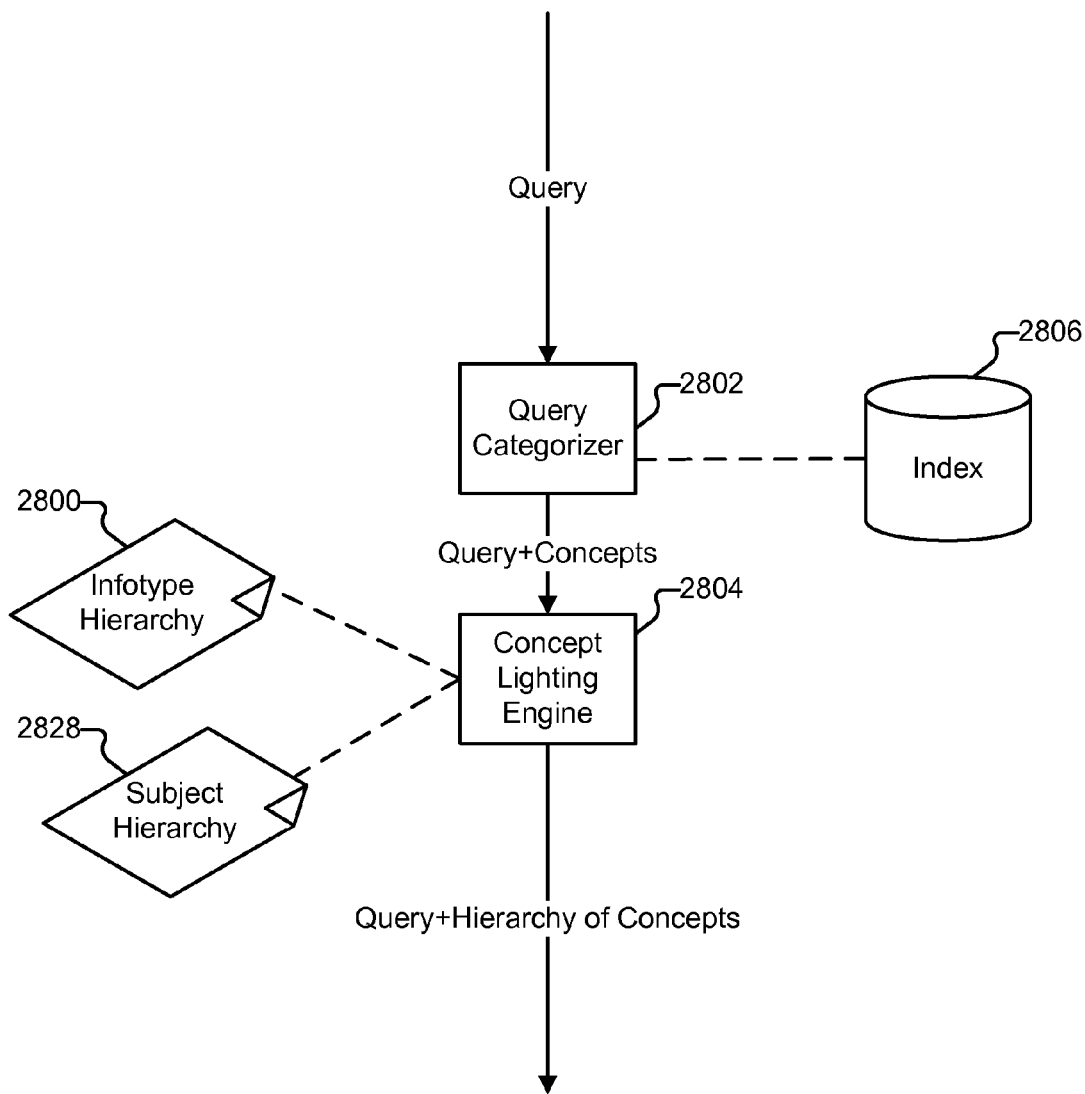
FIG. 28 illustrates an example of a system for categorizing a query.

FIG. 28 illustrates an example of a system for categorizing a query. In some embodiments index 2806 is index 1606, subject hierarchy 2828 is hierarchy 1628, infotype hierarchy 2800 is infotype hierarchy 2200, and query categorizer 2802 is query categorizer 2302. In the example shown, query categorizer 2802 receives a query and determines a set of candidate concepts. Query categorizer 2802 provides the query and the candidate concepts to concept lighting engine 2804. Concept lighting engine 2804 is configured to use a density function to evaluate the received candidate concepts and return as output the received query and a set of concepts that are associated with the query. In some embodiments the concepts output by concept lighting engine 2804 are returned in a hierarchy form—a subportion of infotype hierarchy 2800 or subject hierarchy 2828 that includes only the candidate concepts selected by concept lighting engine 2804.

Figure 29:
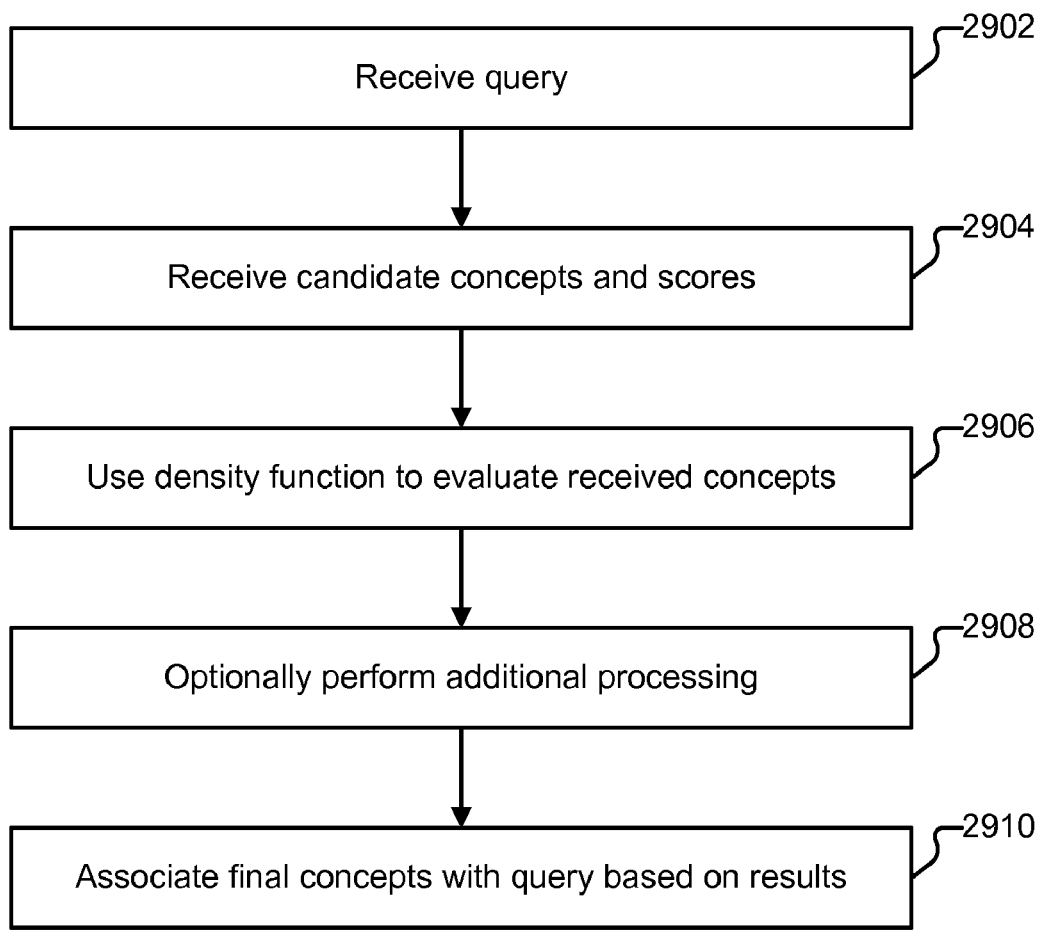
FIG. 29 illustrates an example of a process for categorizing a query.

FIG. 29 illustrates an example of a process for categorizing a query. In some embodiments the process shown in FIG. 29 is performed by concept lighting engine 2804. The process begins at 2902 when a query is received. For example, at 2902 a query is received from query categorizer 2802. At 2904 candidate concepts and scores are received. In some embodiments the query, candidate concepts, and scores, are received simultaneously at 2902 and portion 2904 of the process is omitted. At 2906 a density function is used to evaluate the received candidate concepts. At 2908, additional processing is optionally performed, as described in more detail below. At 2910 one or more final concepts are associated with the query. Using the information shown in FIG. 25, "concept1= jaguar_car, concept2=jaguar_animal, concept_3=jacksonville_jaguars" is an example of what might be returned at 2910. In some embodiments the query and final concepts are provided to a system which automatically selects an appropriate page layout and page elements based on a query, which is described in more detail below.

Figure 30:
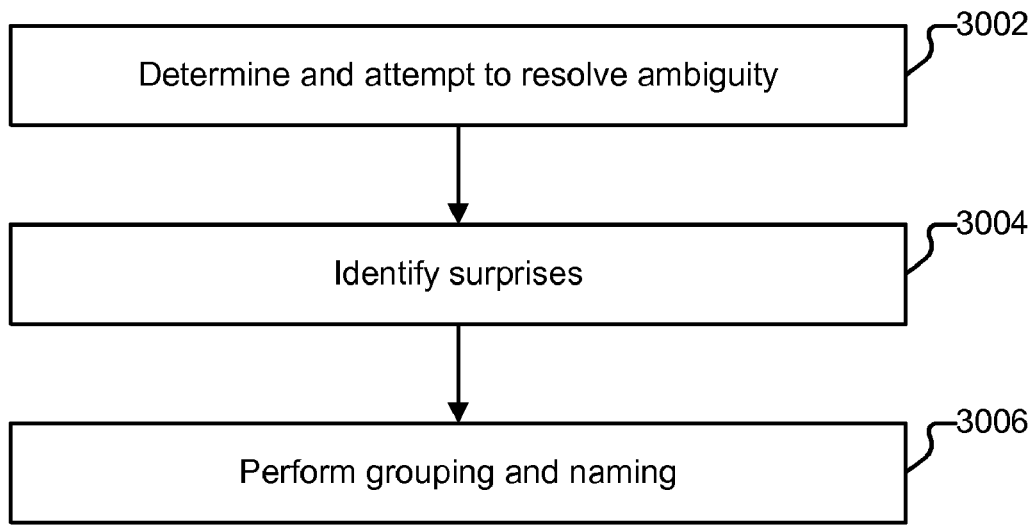
FIG. 30 illustrates an example of a portion of a process for categorizing a query.

FIG. 30 illustrates an example of a portion of a process for categorizing a query. Portions 3002-3006 are examples of optional processing that can be performed to further refine the categories associated with the received query. For example, at 3002 ambiguity is evaluated and an attempt is made to auto-disambiguate any detected ambiguities. One form of ambiguity is vertical ambiguity. A vertical is a top level concept, such as "Health" or "Travel" that has as a direct parent the root concept. One way of determining vertical ambiguity is to determine the density scores concentrated under each vertical. If one vertical has a density score that is considerably higher than the other verticals, the query is not ambiguous at a vertical level. For example, a query of "buy plane tickets" is likely to have a high density score within the "Travel" vertical but have low density scores in the other verticals. If multiple verticals light, but one is considerably denser (i.e., the density scores of its nodes is higher) than the other verticals, in some embodiments the concepts in the less dense verticals are removed and only the most dense result is returned. This process is referred to herein as autodisambiguation.

If multiple verticals have similar density scores, then the query is likely to be ambiguous at the vertical level and cannot be resolved without further input, such as from the user. For example, the query "jaguar" is likely to have comparable density scores under the "Sports," "Nature," and "Transportation" verticals. If the user provides a query such as "lease a jaguar," the "Transportation" vertical is most likely the user's intent. In some embodiments the final concepts returned at 2910 include an indication of whether an ambiguity was detected and if so, what are each of the disambiguated meanings of the query.

Lower ambiguity (within a vertical) can also be determined. One way of determining lower ambiguity is, for any node in the tree, to determine the density of its children. For example, suppose a node has ten children. The density scores of each of the ten children are compared. If the density scores of some children are considerably different from the density scores of other children, then the query can be said to be ambiguous at the level of the node being evaluated. In some embodiments if a threshold number of children (e.g., 90% as opposed to 50%) have similar scores, then the query is not considered to be ambiguous at the level of the node being evaluated.

Another technique for determining ambiguity is as follows. A list of contexts is determined by taking all homonyms of all high confidence concepts. All nodes in the DAG are marked with their nearest context. For each context, a parent node is determined. In some embodiments this is done by taking the highest node that has, as descendents, only nodes from within this context. Only one such node will exist because the homonym which provides the context follows only one path upwards (the tree path). The density of these representative parent nodes are compared and if the densities are similar in more than one context the query is ambiguous in those contexts, else its non ambiguous and belongs in the context with the highest density.

Typically, ambiguity that occurs across verticals or contexts indicates that the query has at least two different fundamental meanings, such as jaguar as a mammal and jaguar as an automobile. When ambiguity occurs within a vertical (e.g., a parent node has two dense children and several sparse children), one possible cause is that the query is not ambiguous, but only implicates certain children. For example, suppose a query lights "India" and "France" under a "Countries" parent, but does not light other countries under the "Countries" parent. One reason for this is that India and France are both valid "answers," or matches to the query, while the other countries are not.

In some cases, a concentration of lights (i.e., dense areas) of a hierarchy does not imply an ambiguity but instead implies a surprise. Suppose a famous baseball player, "Johnny Stocks" was recently involved in a scandal involving the use of steroids. If a query of "Johnny Stocks" is performed, concepts such as "baseball," "Johnny Stocks," and the team to which Johnny Stocks belongs might light, each under the "Sports" vertical. Another concept that might also light is a "steroids" concept, which is located under a parent of "Pharmaceuticals" which is in turn located under the "Health" vertical. In this example, the lighting of the "steroids" concept is referred to as a "surprise." The steroids concept is consistent with the meaning of the other results (e.g., the concept of baseball) even though it is in a different vertical. One way of identifying surprises (e.g., at 3004) is as follows. If a node has a low affinity score, it is likely to be a mistake and is removed from the list of candidate concepts. A surprise, in contrast, has a high affinity score. Any identified surprises are returned in some embodiments at 2910 along with any selected final concepts.

At 3006, concepts are grouped and named. One way of grouping and naming concepts is to determine how broad a parent node is. If the parent has mostly dense children, the parent is used to name a group that includes all of its children. For example, if 80% of the children under the node "Actors" light, in some embodiments the "Actors" node is selected as a concept to be associated with the query, e.g. at 2910 in the process shown in FIG. 29. If, in contrast, only a few children light, the parent will not be used to group the child nodes, and each is associated with the query.

In some embodiments grouping is performed as follows. Starting with the level below root in the subtree that was lit up, the average entropy of the level is calculated as $$E = \sum \frac{(d_i * \log(d_i))}{N},$$

where $d_i$ is the density of the $i^{th}$ node and N is the number of levels. A high entropy (e.g., above a threshold) implies that most nodes at this level have been equally lit up. For example, if most children of "Actors" light up equally, entropy will be high. This means these levels should be grouped together under the parent node. A low entropy (e.g., below a threshold) implies that only a few nodes have been lit up at this level and most others have not been lit. This indicates that those few nodes should be considered as candidates for grouping under. The average entropy of the children of these candidates is then computed. The candidates for which this entropy is high are used for grouping. If the entropy is low, the children in which the density was concentrated are added to the list of candidates.

Mashup of Dynamically Selected Components

Figure 31:
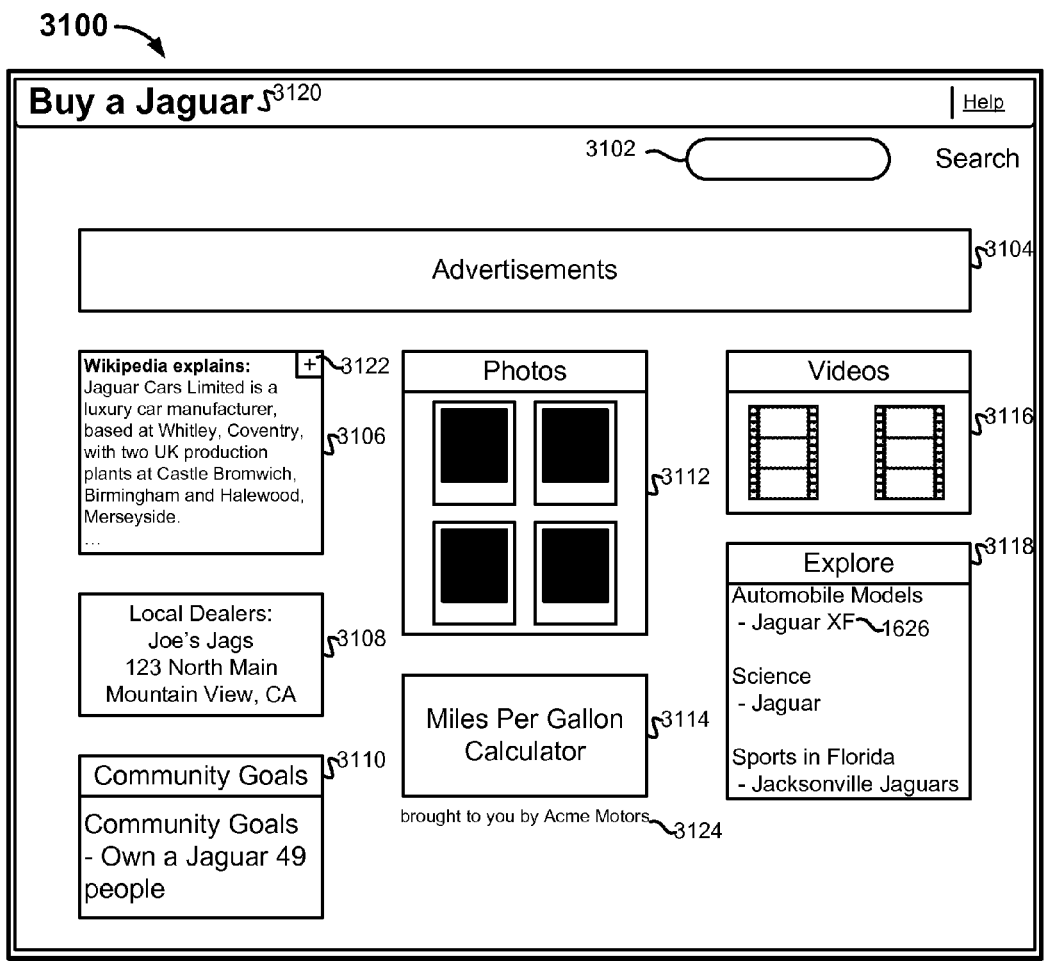
FIG. 31 illustrates an example of a page that includes dynamically selected components, as rendered in a browser.

FIG. 31 illustrates an example of a page that includes dynamically selected components, as rendered in a browser. In the example shown, a user has entered the phrase, "buy a jaguar," into a search area (3102) of an interface to a search engine. As described in more detail below, the user's query is categorized, such as by the system shown in FIG. 28 and components to be displayed to the user are selected based on the user's query and additional information (such as the concepts associated with the query). The components (also referred to herein as "modules" and "widgets") to be displayed are selected from among a pool of components and are selected and laid out on the page in accordance with a template specified by an administrator. A module is an atomic unit of content and can be provided by a third party.

The page template can be configured with query-agnostic formatting instructions, such as the number of columns to display, the relative width of those columns, and the percentage of the rendered page that is to be used for advertisements or other monetization-related modules. As described in more detail below, different templates can also be used based on factors such as the concepts with which the query is associated and whether a sponsor has requested that users be presented with a page that includes some kind of branding information. An administrator can use a template to govern whether any specific modules must be included in the rendered page (such as a section dedicated to traditional web results as provided by a particular search company), whether modules should be selected automatically from among a specific group of modules (e.g., that at least one calculator module be shown, but not more than two), whether modules should be selected automatically from the entire pool of available modules, and any additional constraints, such as that a logo must appear in a specific page location. A template can be used as a top-down filter that is used to control what is ultimately displayed on the page. Some additional examples of how modules can be selected and displayed include only showing a module if it has a quality greater than a particular threshold, showing a module in a specific location, etc. The page template can thus control the location, rank, whether to show or not to show a module, and can also customize the look of the module, such as its background color or title.

In the example shown in FIG. 31, an administrator has created a single template that is to be used for all queries, irrespective of the concepts associated with those queries. The template requires that the layout be in three columns, and that the title of the page (shown in region 3120) be taken from the query. Region 3104 of the page is a page block that is used to display advertisements. A page block is a portion of a page that includes rules governing the modules that can be placed within that block. A page block on a page can also specify a concept filter. A concept filter for a concept A indicates that only modules which have the concept A in their path to the root should be shown. Similar Boolean expressions can be used such as A and B or (C and D) where A, B, C, and D are concepts. Another example is the prohibition on more than two calculators could be implemented across the entire page, or the prohibition could only apply to a single page block. In the example shown, the administrator has specified that up to four advertisements may be displayed simultaneously in page block 3104.

The template specifies that a minimum of six modules and a maximum of ten modules be included in the page, but allows all of the modules to be chosen automatically using the techniques described herein and does not supply any additional constraints on the selection of those modules.

Modules 3106-3118 were automatically selected based on the "buy a jaguar query" provided by the user. Module 3106 provides a snippet of the main Wikipedia entry for "Jaguar Cars" and allows a user to access more of the article by selecting expand tab 3122. Module 3108 displays a list of local Jaguar dealers. If the user hovers a mouse over module 3108 a map is displayed of the location. If the user clicks on the address, the user is taken to the dealer's web page. In the example shown, "Mountain View, Calif." was determined to be the location of the user based on the user's IP address. In various embodiments, the user supplies demographic information, such as by configuring a profile or storing cookies that provide interface 3100 with geolocation and other information.

Module 3110 reports how many people have as a goal doing a particular task. In the example shown, the goal is "own a Jaguar," something which 49 individuals would like to do. The information shown in module 3110 is provided by an external source (e.g., a third party website) that makes available an API. Module 3112 displays photographs and module 3116 displays videos. Some modules, such as module 3110, receive as a parameter the query provided by the user in search box 3102. Other modules, such as a calculator widget that allows the user to perform assorted computations related to fuel economy (3114) is not passed any information. Static elements may also be included. As described in more detail below, some modules, such as photo module 3112 and video module 3116 are passed a modified version of the query (e.g., "jaguar car" instead of "buy a jaguar") so that the most relevant results can be presented to the user. Wikipedia module 3106 is passed a URL and a whole number. The URL specifies the Wikipedia page that the snippet is to be drawn from (e.g., "en.wikipedia.org/wiki/Jaguar_(car)") and the whole number specifies how long the snippet should be (e.g., 7 lines).

While the user's query, "buy a jaguar," could be considered an ambiguous one, the most likely intent of the user is not to purchase a mammal (or sports team). In the example shown, the user's query has been automatically disambiguated using the techniques described herein (e.g., by noting that the inclusion of the word "buy" in the query makes the query considerably more likely to be associated with the car concept than any other meaning of "jaguar"). Module 3118 provides the user with the ability to explore other concepts which it has determined to be of possible interest to the user. For example, by selecting link 3126, the user will be taken to an automatically generated page about the Jaguar XF. Thus, in addition to being generated in response to explicit user queries, a page such as is shown in FIG. 31 can be generated as the result of navigating to a particular concept in a concept hierarchy (and in such cases, the concept can be used as a "query" for purposes of the processes described herein).

Links to the homonyms of jaguar are also provided by module 3118 (e.g., in case the automatic disambiguation was incorrect). In some embodiments, whenever an ambiguous query is received, prior to being presented with any other modules, the user is first presented with module 3118 and asked to indicate which meaning of the ambiguous term is intended by the user. In other embodiments, a special disambiguation template is used in which each potential meaning of the query is dedicated a portion of the real estate on the page and the user may further refine his intent by, for example, selecting "show more results like this" or "hide this" links. In some embodiments the submission of ambiguous queries results in multiple pages, with a different page for each homonym opening in the user's browser.

In some embodiments module 3118 also provides a way for a user to refine his query by "and"ing additional concepts shown in box 3118 with the original query. For example, suppose a user entered a query of "insurance" in region 3102. One of the concepts shown in module 3118 might be "travel." By selecting an "and" button displayed next to the word travel, a new query may be provided to system 3200. Page 3100 would be updated so that the new page is configured to display modules relevant to "travel insurance." In some embodiments this technique is performed using vertical scoping—scoping which limits results to concepts below a certain parent.

Region 3124 is an example of a caption, as described in more detail below.

Figure 32:
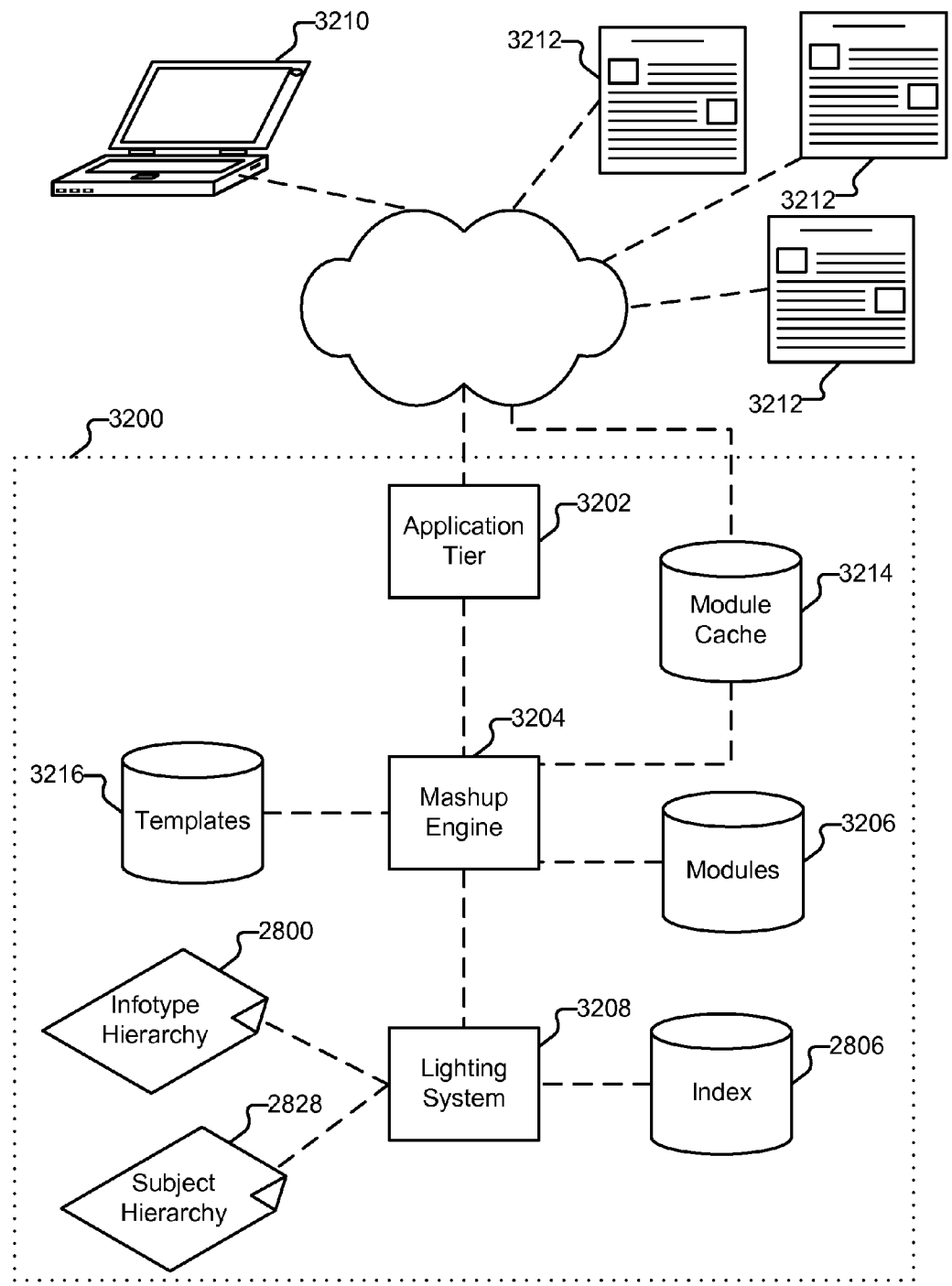
FIG. 32 illustrates an example of a system for delivering a page that includes a plurality of modules.

FIG. 32 illustrates an example of a system for delivering a page that includes a plurality of modules. In the example shown, client 3210 provides a query to system 3200, such as by using the interface shown in FIG. 31. Application tier 3202 provides the interface to client 3210 and forwards the query to mashup engine 3204. Mashup engine 3204 receives the query, annotates the query, and provides it to lighting system 3208. In the example shown, lighting system 3208 includes query categorizer 2802 and lighting engine 2804. Lighting system 3208 receives the annotated query and provides back to mashup engine 3204 a list of concepts with which the query is associated, and a set of weights, using the classification techniques described herein. Mashup engine 3204 selects an appropriate page template from template database 3216, consults module database 3206 for information about candidate modules, fetches information from module cache 3214 and external sources 3212 as applicable to a set of candidate modules, and makes a selection of which modules are to be presented to the user and how they are to be arranged. Mashup engine 3204 provides an XML page specification to application tier 3202 that describes how the page is to be rendered for the user.

Template database 3216 stores a variety of page templates. In some embodiments another technique, such as the use of a single XML document, is used to store page templates. Any node in subject hierarchy 2828 can have associated with it one or more page templates. In some embodiments templates are managed by product managers who create templates that are appropriate for the verticals they oversee. For example, a template tagged to the health node might favor the inclusion of modules that provide "definitions" (e.g., a Wikipedia module, a physicians' desk reference module, etc.), while a template tagged to the travel vertical might favor the inclusion of more map modules. The root node of subject hierarchy 2828 has a default template that is used if no other template is selected. In various embodiments, page templates are contributed by community members, such as users who are interested in a particular topic. Other community editors can edit the page templates or provide their own page templates for concepts.

In addition to the selection and layout of modules, page templates allow for the customization of such page features as background color, the use of cascading style sheets, etc. The templates stored in template database 3216 are tagged with one or more categories with which they are intended to be used. Instructions can also be included in a template with respect to the customization of specific modules. For example, the Wikipedia snippet module (3106) can be used by a variety of different page templates. Suppose the manager of a Health vertical wishes Wikipedia to return 10 lines of text, while the manager of a Transportation vertical only wishes Wikipedia to return 5 lines of text. A single implementation of the module can be used in both circumstances by having the respective page templates for those verticals provide different parameters to the Wikipedia snippet module (e.g., show 10 lines vs. show 5 lines; make the text blue vs. white; make the widget 100 pixels wide vs. 200 pixels wide; etc.).

At runtime, mashup engine 3204 creates a reverse index that loads into memory a mapping between the page templates and the concepts to which they are mapped. A similar mapping is made between module specifications stored in module database 3206 and the concepts to which the modules are mapped. Many thousands of modules, or more, may be described by module specifications stored in module database 3206. The modules are created by third parties and submitted for use with system 3200 by their creators or selected for inclusion by a curator of database 3206. Modules can provide virtually any user experience about virtually any concept. RSS feeds, calculators, images, videos, sounds, interactive maps, and games are examples of types of modules.

Each module specification includes a variety of information about the module, such as the name of the module; a description of the module; whether the module can accept any predefined parameters (such as query, zipcode, parsed concept, etc.); the maximum time that content for the module should be cached; a minimum and maximum width for the module if it is to be displayed on a page in overview mode; a minimum and maximum width for the module if it is to be displayed on a page in detail mode; the concepts to which the module is tagged (typically configured by an administrator when the module specification is first created); the module's preferred location within a column if selected; etc. In various embodiments, the concept is tagged with subject type concepts, infotypes, or both.

The module specification can also include a group of user-defined tags that allow the modules to be arbitrarily grouped. For example, one administrator might tag certain modules as being "yellow," "horizontal," or provided by the "Acme Corporation."

A module specification can also specify a set of conditions that must be present for a module to be selected, such as that a location-specific module should only be shown if the location of the user is known, that a module only be shown at certain times of the day (e.g., during the operating hours of a business who maintains the module), or just before certain holidays or events, such as annual sporting events. Another example of a condition that a module may require is that the query appear in the name of the module. For example, suppose one of the widgets defined in module database 3206 provides a list of Irish Setters currently available for adoption from an Irish Setter dog rescue group. The module specification may require that a user's query include the term "Irish Setter" in order for the module to be shown, irrespective of the categories with which the query is associated.

If the module requires information from an external source, the module specification also stores a description of how the information is to be fetched—such as which protocols are to be used and how any strings are to be formatted. The module specification also stores whether results for the module should be cached (and if so for how long) or if they should be fetched anew each time the module is considered for inclusion on a page such as page 3100. For example, a blog or news widget might have an expiry term of ten minutes. Generally, an attempt is made to cache external services to control the amount of traffic that is sent to those services—both reducing the impact on the resources of the external source and also to improve efficiency. Additionally, if an external site is responding slowly to requests for information or if it becomes unavailable, it may nonetheless be possible to present modules that make use of the external site if sufficient information from the external site is available in the cache. Some modules are JavaScript code and are not rendered until runtime on client 3210. In some embodiments the JavaScript code is cached in module cache 3214.

In some embodiments system 3200 is configured to communicate with an advertisement server (not shown). Page templates may specify page blocks that can include advertising modules, that 20-30% of the page's space should be dedicated to monetization, the specific advertisements/monetization widgets that should be selected by mashup engine 3204, etc. Historical information such as the number of advertising clicks received when a particular module was displayed last time can be used to determine which monetization modules, if any, should be shown on page 3100. In some embodiments if a shopping intent is detected (e.g., "buy new shoes,"), more space may be allocated to monetization units.

Figure 33:
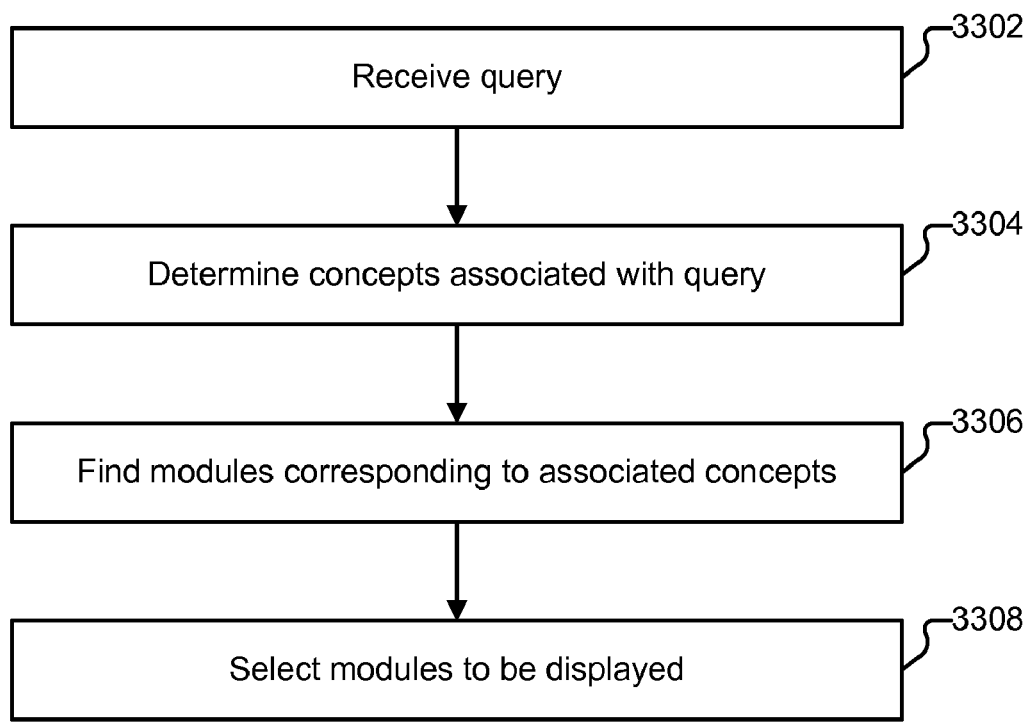
FIG. 33 is a flow chart illustrating an embodiment of a process for delivering a page that includes a plurality of modules.

FIG. 33 is a flow chart illustrating an embodiment of a process for delivering a page that includes a plurality of modules. In some embodiments the process shown in FIG. 33 is performed by system 3200. In some embodiments, whenever system 3200 performs a task, either a single component or a subset of components or all components of system 3200 may cooperate to perform the task. Similarly, in some embodiments portions of system 3200 are provided by one or more third parties.

The process begins at 3302 when a query is received. For example, at 3302 "What color is an Irish setter" is received by application tier 3202 from client 3210. At 3304, categories associated with the query are determined. For example, at 3304, mashup engine 3204 provides the query to lighting system 3208 which determines that the main concept associated with the query is "dog." Lighting system 3208 provides a portion of hierarchy 1628 that includes the node "dog" to mashup engine 3204, along with a set of weights that describe how closely the query matched the portions of the hierarchy provided.

At 3306, candidate modules to be provided to the user are located. Suppose only one page template is present in template database 3216 and that it specifies, for any query, that somewhere between 6 and 10 modules be presented on the page and does not specify any additional constraints on the modules. At 3306, the concept, "dog" as received from lighting system 3208 is used to locate modules in modules database 3206. Suppose twenty modules have "dog" as a tag and several additional modules have as tags the parent concept "pets." At 3308, system 3200 determines which modules of those identified should be displayed to the user.

Figure 34:
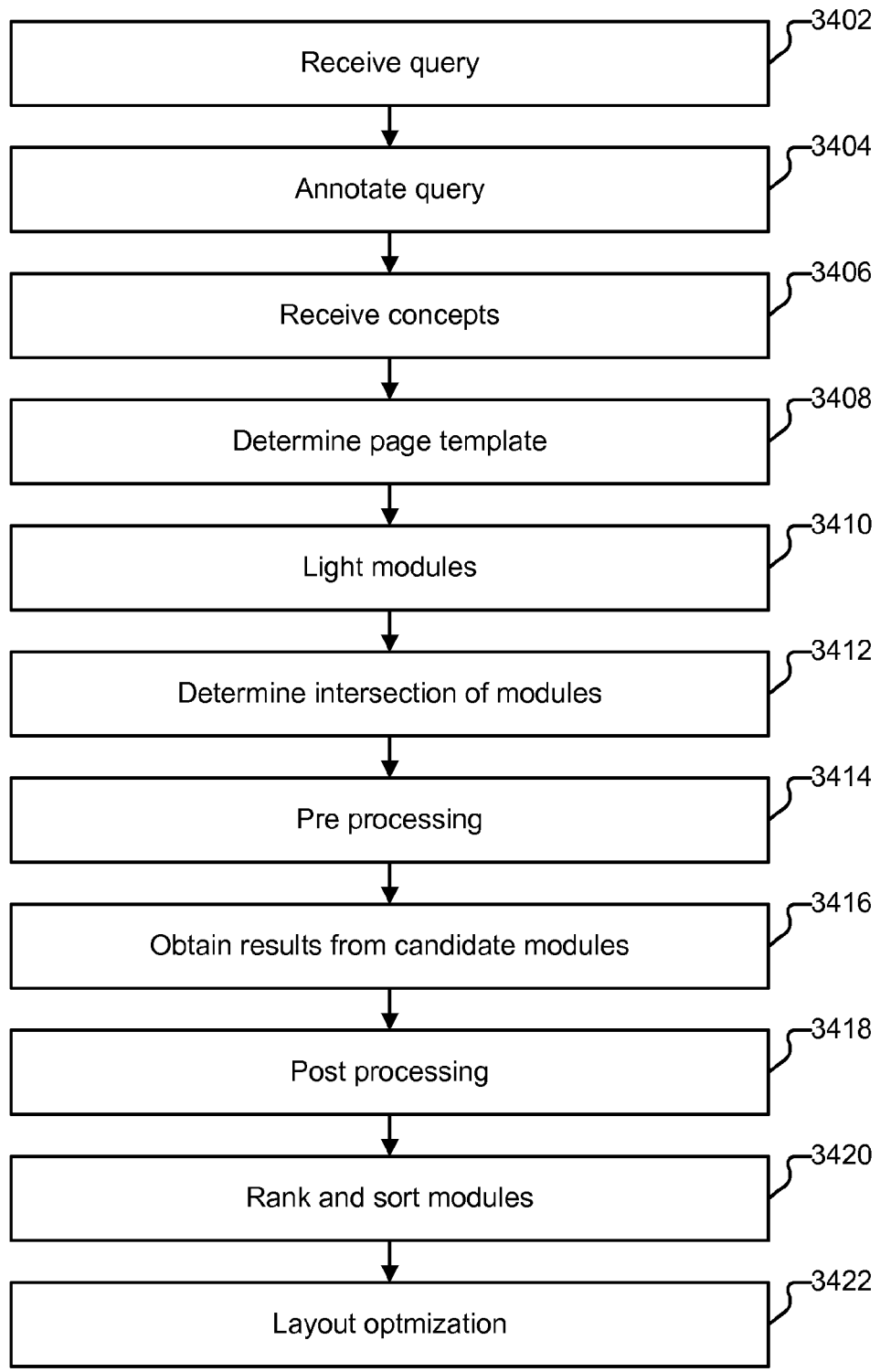
FIG. 34 is a flow chart illustrating an embodiment of a process for delivering a page that includes a plurality of modules.

FIG. 34 is a flow chart illustrating an embodiment of a process for delivering a page that includes a plurality of modules. In some embodiments the process shown in FIG. 34 is performed by system 3200.

The process begins at 3402 when a query is received. At 3404 the received query is optionally annotated. In some embodiments the query annotation is performed by mashup engine 3204 and is performed using word lists. Query annotation is typically used in the identification of a context of a query. For example, in the query "I want pictures of a black dog," the phrase "pictures of" indicates an intent of the user (to find pictures) and "black dog" is the concept for which pictures are sought. Similarly, in the query "where can I buy a new pair of shoes," the user's intent is found in the phrase "where can I buy" and the object of that intent is "shoes." A query of "what is a platypus" reveals a definition intent ("what is a") with a subject of "platypus." Once any intents are identified, the annotated query (e.g., in which "pictures of a spider bite" becomes "spider bite"+images) is provided to lighting system 3208.

At 3406, one or more concepts are received. For example, at 3406 lighting system 3208 provides mashup engine 3204 with any concepts and surprises associated with the query as determined using the techniques described herein, along with the scores associated with those concepts.

At 3408 a page template is selected. One way of selecting a page template is to perform a bottom up search as follows. Locate the first received concept of the query (i.e., the main concept) in subject hierarchy 2828. If there is a page template tagged to the concept, use that template. If not, locate the second received concept of the query (e.g., the first concept's parent) and determine whether that concept has a template. If so, the parent template is used. If not, the hierarchy is traversed higher and higher until a node with a template tagged to it is reached. Every query will have at least one available template because the root node has a page template whose requirements all relate to layout and do not relate to conditions for being selected. If a node has multiple templates available, the first template is evaluated to determine whether any conditions it may have are satisfied. If so, the template is selected. If not, the next template at that level is evaluated. If none of the templates at a level have their conditions satisfied, the templates at the node's parent are evaluated and so on.

One reason that a concept may have multiple templates is that one template is a default and a second template is part of an advertising or other branding campaign. For example, suppose a news corporation has a partnership with the operator of system 3200. Visitors who arrive on a landing page provided by system 3200 (e.g., a page generated for the concept of "health") by selecting a link from a page on the news corporation's site are to be shown a page, such as is shown in FIG. 31, but with the logo of the news corporation in one corner, along with a link back to the news corporation's website. Such users are identified in some embodiments by a string such as "partnerID=XYZ" being provided by the referring site, where XYZ is the identity of the partner.

Users of system 3200 who do not arrive from news corporation site will not have a partnerID string equal to XYZ and will be presented with a page constructed from the default health template instead. Other factors which can also be used to determine which template will be used for a user are the user's location (such as can be approximated from the user's IP address) and a probability, such as that 90% of users receive a first template and 10% of users receive a second template during A/B testing. In some embodiments, a page defined in template database 3216 has multiple modes—such as an overview version and a detail version. Different templates may also be selected at the same node based on the user's platform. A mobile user who submits a query may receive a page with fewer modules or with mobile-phone friendly modules than a PC-based user who submits the same query.

Other techniques for selecting a page template can also be used at 3408 and can be used in combination with the technique described above. For example, a query white list can be constructed so that when a query containing a certain term is received, a custom template is used. One example of this is a sponsored product page. Suppose a query of "ibuprofen" is received. If "ibuprofen" is present on a whitelist, instead of using a "Drugs" template or a "Health" template, a template that describes a page branded with the logo of a particular manufacturer of ibuprofen may be selected instead.

If both overview and detail versions of a page template exist, in some embodiments one of the determinations made at 3408 is whether the intent of the query implicates one or the other of the versions. For example, a query of "spider bite pictures" indicates that a user is likely to want to view many pictures and the detailed version of page may be automatically selected over the overview page.

At 3410, mashup engine 3204 determines an initial list of candidate modules to be considered for inclusion in page 3100. This process is also referred to herein as "module lighting." In some embodiments the candidate list of modules is selected by determining a location in subject hierarchy 2828 associated with the query and examining whether any modules are tagged at the same level of the hierarchy. If so, they are added to the candidate list of modules. Additional modules can be added to the candidate list of modules by traversing up or down levels in the hierarchy. Typically, the lower in the tree a module is tagged, the more narrow or specific that module will be. For example, a "dog breed selector" widget that shows various images of dogs and provides information about their temperaments and size is an example of a widget that is likely to be tagged to the concept dog. If the query received at 3402 relates to a specific kind of dog, the dog breed selector widget is likely to be of more relevance to the user than a much more general "animal viewer" widget that is tagged at the animal level.

Some modules may be generic to the category structure. For example, a web results module or news module is a generic module that is applicable to virtually any topic. (E.g., health news, news about airplanes, news about Ronald Reagan, etc.) Assorted techniques can be used to light such modules, such as by performing an offline precomputation of the recall of the module with respect to all concepts and using the results to determine whether to show the generic module or not.

Modules can also be tagged with recall information and that information can be used to determine whether the query received from client 3210 should be passed to the module or whether the query should be transformed first. For example, an image module is likely to have very poor recall for certain kinds of queries, such as tail queries, which contain several infrequently used words. Based on the recall information, assorted query transformations can be used, as explained in more detail below. Other examples of categories of queries for which recall information may be stored by a module include navigational queries (e.g., as determined by a white list), broad queries, and ambiguous queries (e.g., as identified by lighting system 3208).

Infotypes can also be used when determining whether to light generic modules. For example, if the query is about a celebrity, the query may be determined to be "image worthy." If a query lights the image infotype, then modules tagged with the image infotype may be lit, or have their lighting scores increased as a result. The concept "honesty," however, is not an image-worthy quote and as such a general image module would not be considered.

As mentioned previously, modules may have associated constraints that are taken into consideration at 3410. For example, a stock ticker module may require that a user provide a query that includes the word, "stock" for it to be shown. Modules can also have an "and" requirement that requires two different concepts to both be implicated in the query. For example, a travel insurance calculator may require that both "travel" and "insurance" be returned at 3406 in order for it to be shown. A module may also have as a constraint that it only be selected if another specific module is selected or that if another specific module is selected, it not be selected. A module can have multiple sizes associated with it or can take a size in which it must be rendered. Modules can be dropped or moved if they don't fit the layout for the page. Hence an additional constraint is that the module should fit the layout of the page.

In some embodiments a threshold is applied during module lighting to remove modules that light up due to low scoring concepts. For example, there may exist concepts that are lit but which have very low affinity with the query. In such cases these modules attached to such low scoring concepts would not be relevant to the query and are dropped from the list of candidate modules. As an example, suppose the received query is "Seinfeld." Many concepts are lit, of which "American media" is an example of a low scoring concept, having a query to text affinity score of 0.4 and density score of 0. In this case the "American media" concept will get dropped because the threshold is set to 1.

Module to concept affinity is a weight specified when the module is first added to the module database. The weight is used to rank the module against the other modules tagged to the same concept. One example of how the score can be computed is: module worthiness score=module to concept affinity*(query to concept affinity+density score). Suppose there exist two modules, called bmicalc1 and bmicalc2, respectively, which are both tagged to the same concept. The module to concept affinity score will help select one over the other. And, if the module worthiness score is very low (e.g., less than 0.61), the module is removed from the candidate list. A variant to the score function is score=module to concept affinity*(w1*query to concept affinity+w2*density score) to indicate a weighted average and where w1 and w2 are the weights. Another variant to the score function takes into consideration past information such as module performance (turn-around-time), user feedback (e.g. click through rate). Score=module to concept affinity*(w1*query to concept affinity+w2*density score+w3*performance_score+w4*click_through_rate).

The above variants are scoring functions that are used for un-cached modules and/or for modules where data is not yet available, and is also referred to as a pre-scoring function. For a cached module this scoring function is not run because the score is retrieved from the cache. The pre-scoring function assists in selecting modules for which external calls are made to get data. Modules' scores are adjusted after data is made available for them. As described in more detail below, a post-scoring function is used at 3420 to combine the quality score (if any) with the pre-score, and any other scores. This score is then used to finally rank modules before returning them back for rendering.

At 3412, an intersection is determined between the candidate modules selected at 3410 and any requirements on modules specified by the page template. Typically, if a module requested by a page template is not also selected as a candidate module at 3410, that module will not be included in the page. However, an administrator may specify, e.g., using a "force" option, that a particular module must be included in the page, irrespective of any scores it receives during module lighting.

At 3414, optional preprocessing is performed as described in more detail below. One example of preprocessing that can be performed at 3414 is a determination of the best inputs to send to a candidate module that accepts input. For example, instead of sending a query of "my twelve year old child has diabetes," a query of "juvenile diabetes," or just "diabetes" may be sent to some modules. Another example of preprocessing that can be performed at 3414 is the offline computation of the recall of the module with respect to all concepts.

At 3416, the query is forwarded to each of the candidate modules that is configured to receive as input a query. In some cases, module results may be present in a cache. If so, the module cache is queried. If results for the module are not present in the cache, in some embodiments an external call is made and the results may be cached for later use, as applicable.

At 3418, postprocessing is performed. Two different types of post processing can be performed at 3418. One form of post processing is an evaluation of the results obtained from modules (either via the module cache or via the external query) at 3416. This form of post processing is also referred to herein as evaluating the quality of the results provided by the module and is described in more detail below.

The other form of postprocessing that can be performed at 3418 is content transformation. Suppose a module chooses to render itself with a white background. At 3418, one of the post processing actions that can be taken is to search for the existence of "bg=white" or "bg=0xFFF," and then replace the detected string with "bg=red" or "bg=0xF00" as applicable, switching the background of the module from white to red. Caption text can be similarly modified, such as by substituting one company name with another, by removing captions, or by adding captions, such as the caption shown at 3124 in FIG. 31.

Content reduction can also be performed at 3418. For example, a module may provide more information than a product manager chooses to have rendered on a page. At 3418 instructions in the page template can be used to remove unwanted portions of the module as applicable.

At 3420, the remaining candidate modules are ranked and sorted. A variety of techniques can be used to score/rank the modules. In addition to density, text affinity, module to concept affinity and other pre-scores, one factor that can be considered is the response time of the module. A module that provides results quickly may be ranked higher than one that provides results slowly, even if the slower module is otherwise a better match with the query. In some embodiments, each time a module is queried, a response time is stored in a log. The log can be evaluated periodically to determine an average response time, or a running average response time, etc. Another factor that can be considered is feedback. One measure of how useful a module is to a user is whether the user interacts with the module, and if so, for how long. Such information can be collected and stored in a log for use at 3420. For example, implicit feedback (e.g., clickthrough rates) can be collected. Explicit feedback can be collected by allowing the user to select "don't show this again" or "this is helpful" buttons under each module, by performing polls, A/B testing, etc. Another factor that can be considered is the timeliness of the module. For example, an April 15 countdown timer widget may be of little interest to a user in September, even if the query indicates a strong interest in tax information. In March, however, the widget may receive a considerably higher score. Another factor that can be considered is whether the module is maintained by an individual (e.g., a hobbyist or amateur developer) or whether the module is supplied by a professional organization.

In some embodiments system 3200 maintains information about specific users, such as through the use of cookies. In that case, one of the factors that can be considered at 3420 is whether the user has previously seen a module, whether the user previously indicated that the module was useful or not, etc. Other usage information can also be considered, such as past queries. For example, suppose a user consistently queries for natural remedies-type health information and then performs a query of "headache"—the results page may be skewed toward natural remedies for a headache, while another user (or a new user for whom no historical data is known) may be shown a page that is more weighted to over-the-counter remedies for headaches. In some embodiments a plugin is used to capture information about the user and to provide the information to system 3200.

Monetization considerations can also be made at 3420. Some page templates reserve a portion of the page's real estate for things that generate money, such as advertisements. Within that space, different kinds of monetization modules compete for space. Examples of monetization modules include CPC modules (e.g. Google/Yahoo ads), TPM modules (visual ads), CPA modules (e.g. flight booking widgets/ where a company performs an action on the backend). Based on the query and what lights up, different monetization modules compete for the monetization real estate in the same way that content modules compete for content real estate. In some embodiments monetization modules are confined to a particular region of the page (e.g., banner area, right side), in some embodiments monetization modules may appear anywhere on the page but may not take up more than a fixed number of slots (e.g., 3) or total amount of space (e.g., 30%), etc.

Techniques such as A/B testing can be used to keep track of which layout and module selections generate more revenue, such as whether a banner region and no skyscraper should be shown, or whether both should be shown, and whether an advertisement should be shown at the bottom of the screen. Each combination can be tried and compared against other combinations. As another example, suppose that lighting system 3208 is aware that a query is related to the concept "herbs." An advertising analysis engine (not shown) can be configured to keep track of different concepts and which modules monetize best for those queries. For example, it may be the case that for an "herbs" query, advertisements provided by one advertising entity do not monetize as well as advertisements provided by another.

In some embodiments the percentage of the page dedicated to monetization may also change and can be dynamically returned based on the query. If the query has commercial intent ("buy cheap tickets") then there will be more monetization as the user is indicating they are looking for advertisements—they want to buy tickets.

At 3422, layout optimization is performed so that the page ultimately provided to the user is free of excessive gaps of space. For example, suppose a total of ten modules are ultimately selected to be returned to a user on page 3100. At 3422, the arrangement of those ten modules is determined.

Figure 35A:
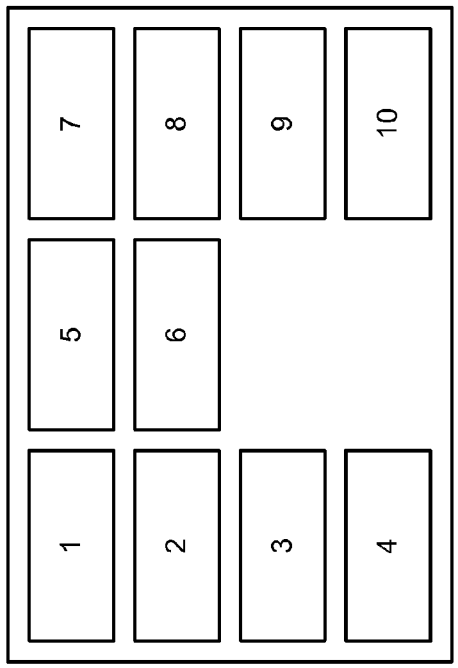
FIG. 35A illustrates an example of a page layout.

FIG. 35A illustrates an example of a page layout. In the example shown, the columns are uneven—there are four modules in the first and third columns, but only two modules in the second column. One reason that the columns might be uneven is that a product manager may have incorrectly configured the page template. Since modules are picked dynamically, it can be difficult to predict at the time the page template is created what an attractive layout will be. In some embodiments mashup system 3200 is configured to override a template if it would result in a gap such as the one shown in FIG. 35A.

One technique for improving the layout of the page shown in FIG. 35A is to perform the following process. First, determine the total number of modules to be presented on the page and divide by the number of columns. This gives an indication of an equal distribution. Next, determine how much the proposed layout deviates from the equal distribution. This deviation is referred to herein as a layout quality score. If the layout quality score exceeds a threshold (i.e., the layout is not considered optimal) a fixing process is performed. One example of a fixing function is to identify the column with the highest number of modules and move the bottom module from that column to the column with the lowest number of modules. The layout quality is reevaluated and if necessary the fixing function is applied again, iteratively, until any additional movements are not possible—either due to page template constraints (e.g., against moving certain modules, such as advertisements) or due to any additional movements having no improvement effect.

Figure 35B:
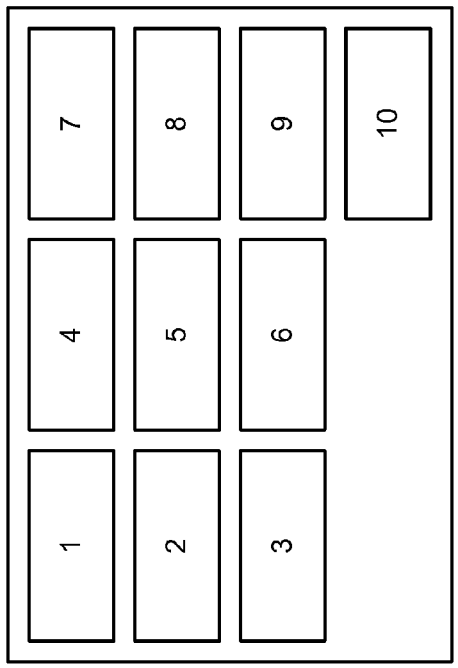
FIG. 35B illustrates an example of a page layout.

FIG. 35B illustrates an example of a page layout. In the example shown, the bottom module in the first column has been moved to the top of column two. No additional movements can be made to further optimize the layout shown in FIG. 35B. The final page layout is passed, e.g., as XML, to application tier 3202 so that a fully rendered version can be provided to client 3210.

Figure 35C:
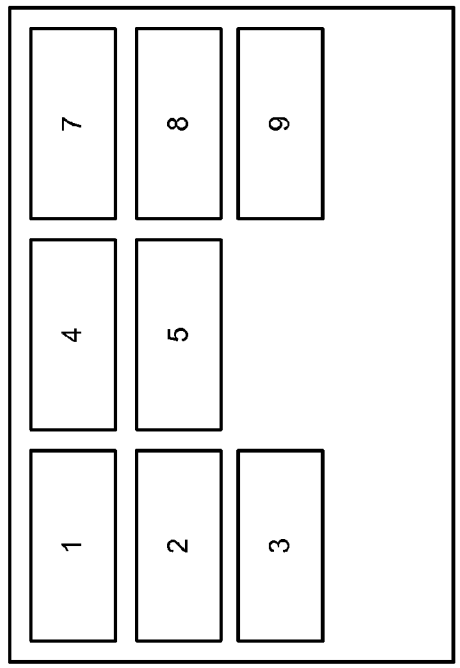
FIG. 35C illustrates an example of a page layout.

FIG. 35C illustrates an example of a page layout. In the example shown, a gap is present in column two that cannot be fixed by using the process described in conjunction with FIG. 35A. In some embodiments one way of improving the layout in such a situation is to expand module 3 so that it spans the first two columns. Another way of improving the layout is to extend the length of module 5 so that it occupies more of the empty space below it. Some modules may have included in their respective module specifications that they should not be expanded. Other modules may support expansion. Such information can be taken into account when selecting/ranking modules as well.

Figure 35D:
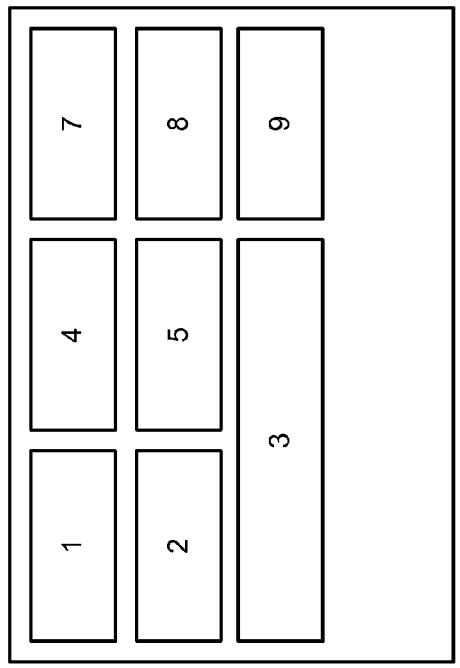
FIG. 35D illustrates an example of a page layout.

FIG. 35D illustrates an example of a page layout. In the example shown, the gap present in the layout shown in FIG. 35C has been removed by expanding module 3 across the first two columns.

Providing Information to Modules

Figure 36:
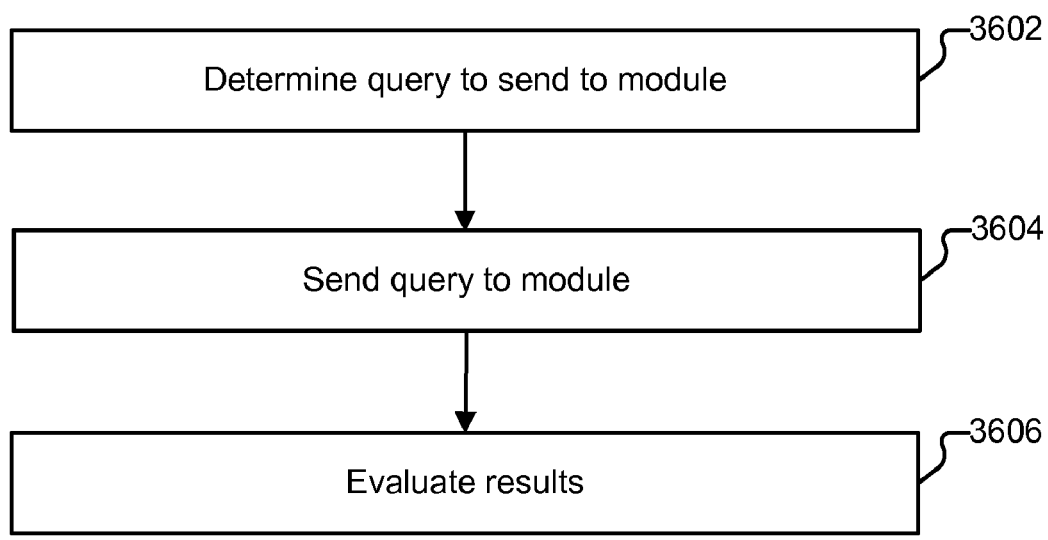
FIG. 36 illustrates an embodiment of a process for providing information to a module.

FIG. 36 illustrates an embodiment of a process for providing information to a module. In some embodiments portion 3602 of the process shown in FIG. 36 is performed at 3414 in the process shown in FIG. 34, and portion 3606 is performed at 3418 in the process shown in FIG. 34. In various embodiments the process shown in FIG. 36 is performed by a standalone device that is not part of system 3200.

The process begins at 3602 when a determination is made of what query to send to a module. For many modules, such as modules that provide traditional text based web results, the originally-supplied query (e.g., as received from client 3210) is provided to the module. As mentioned previously, many modules do not accept queries or other input parameters and the processing at 3600 is not performed. However, some queries, when sent to some modules, will not result in the best user experience.

One example of a query that can result in poor results from a module is where a "tail query" (e.g. one that is very specific and has many non-stop words) is sent to a photo or video hosting site through a module that provides a frontend to the site. A query of "my son Fred is six and he has diabetes" is very unlikely to match any videos hosted by the site. In such circumstances, a query transformation can be performed so that more relevant (or in some cases, any reasonable) results are returned.

A query can be transformed in a variety of ways. One way of transforming a query is to send a shorter portion of the query. In the Fred example, one example transformation is to send just the word "diabetes." The word "diabetes" is selected by picking the word n-gram in the query that contributed the most to the selection of the query's main concept. Another way of transforming a query is to send the top concept associated with the query instead of the query itself. Again using the Fred example, a top concept for the query might be "juvenile diabetes." Yet another way of transforming a query is to send one or more synonyms for terms in the query. For example, if the query received from client 3210 is "feline," in some embodiments a synonym (e.g., "cat") is selected from a list of synonyms and sent as a query instead. As another example, suppose a user submits a query of "rooster comb injection." Rooster comb, given as an injection, is a treatment that some individuals use for arthritis. The tissue of a rooster comb includes hyaluronic acid—a synonym. Thus in some embodiments a query of "buy some rooster comb for an injection" might be transformed into "buy some hyaluronic acid" at 3600.

Another example of a query that can result in poor results from a module is as follows. One meaning of the string, "JSON," is "JavaScript Object Notation." JSON is also a frequent misspelling of the name "Jason." Suppose a user is interested in finding information having to do with JavaScript and provides as a query "JSON." If the query is passed, as is, to a video module, it is likely that many of the videos returned will be about people named Jason and not about JavaScript. One way of addressing this problem is through the use of query augmentation. The video site with which the video module communicates has its own hierarchy into which videos can be classified and accepts as command line "hints," a category that should be searched. By sending the appropriate category along with the query, more appropriate results can be obtained. In some embodiments a mapping is maintained between at least some of the concepts in subject hierarchy 2828 and the concepts in the external video site. For example, while JSON may have as its main concept "JavaScript" in hierarchy 2828, a hierarchy maintained by a video site is likely to be much smaller. A mapping between JavaScript (in hierarchy 2828) and Technology (in the video taxonomy) may be used so that the query provided to the video module is "JSON:Technology."

In some embodiments a ConceptDF is precomputed for every concept with respect to a module. The information can be used to determine a query transformation. For example, suppose a user is seeking "funny quotes by Kosmo Kramer." A module is described in module database 3206 that takes as input the name of a television show or movie and provides as output quotes from the show/movie. Sending the module the query, or even a shortened version of the query (i.e., the concept, "Kosmo Kramer") will not provide any results because Kosmo Kramer is not the name of a show/movie. By examining the ConceptDF for the concept's parent, however, it is determined that the concept "Seinfeld" when passed to the module does provide results. Thus in some embodiments the ConceptDF is considered when transforming a query (and/or when determining what parameters to send to a module). Similarly, suppose another module in module database 3206 provides current information on assorted financial indices. Sending the module a query of "Johnny Stocks" (the baseball player) is likely to result in a fairly high recall. However, since the top concepts for Johnny Stocks are "baseball" and "athlete" the query will not be sent because those concepts have no recall or extremely low recall for the module.

At 3604, the query determined at 3602 is sent to the module.

At 3606, results returned by the module are evaluated, for example, to determine whether the query provided at 3602 yielded better results than the one originally received; to determine whether the received results are of sufficiently high quality to merit including the module in page 3100; etc. In various embodiments, the processing performed at 3606 is performed for all queries, irrespective of whether the originally received query is transformed or not.

A variety of techniques can be used to evaluate the results at 3606. One example is to use a recall ratio. A recall ratio is a ratio between the number of results for a module (for example, images) and the number of web results in our index. If the recall ratio of a module is small, then the module does not likely produce good results. If the recall ratio is high, then the module likely produces good results.

Another example is to use text scoring on the results. For any module, the number of times the given query has occurred in the results is determined. If that number is small, then the module likely does not produce good results. If the number is large, then the module likely produces good results.

A combination function can also be employed so that results with extremely high recall ratios are not penalized for having low text scores and vice versa.

Yet another example is to use pattern matching on the results. The occurrence of certain patterns, such as "403 error" and "no result" in the results received from a module indicate that the quality of results returned by that module may be low.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a mapping between a textual representation in a document and a concept, comprising:
   a communications interface configured to receive a document; and
   a processor configured to:
      identify a set of candidate textual representations in the document;
      determine, the set of candidate textual representation included in the set, a set of associated concepts included in a taxonomy of concepts; and
      sum a plurality of category vectors to generate a document vector, each category vector associated with an associated concept of the set of associated concepts and indicating correspondence of related concepts to the associated concept;
      compute a set of document similarity scores for the set of associated concepts according to a correspondence of the category vectors corresponding thereto and the document vector;
      select at least one representative concept of the associated concepts according to the set of document similarity scores;
      provide as output the representative concept and a candidate textual representation of the set of candidate textual representations corresponding thereto; and
   a memory coupled to the processor and configured to provide the processor with instructions.

2. The system of claim 1 wherein the processor is configured to identify the set of candidate textual representations at least in part by performing a greedy match against a list of entries included in the taxonomy.

3. The system of claim 2 wherein performing a greedy match includes detecting a preposition.

4. The system of claim 1 wherein the processor is further configured to prune the set of candidate textual representations based at least in part on a blacklist.

5. The system of claim 1 wherein the processor is further configured to prune the set of candidate textual representations based at least in part on a regular expression.

6. The system of claim 1 wherein the processor is further configured to prune the set of candidate textual representations based at least in part on a detection of a proper noun sequence.

7. The system of claim 1 wherein the processor is further configured to determine a part of speech of the at least one candidate textual representation.

8. The system of claim 1 wherein the processor is further configured to populate a feature vector associated with the candidate textual representation.

9. The system of claim 8 wherein the processor is configured to populate the feature vector at least in part by computing a part-of-speech score.

10. The system of claim 1 wherein the processor is further configured to determine an inverse document frequency score.

11. The system of claim 1 wherein determining the associated concept includes resolving a synonym.

12. The system of claim 1 wherein determining the associated concept includes performing a disambiguation.

13. The system of claim 12 wherein performing a disambiguation includes determining that a second textual representation is synonymous with the first textual representation.

14. The system of claim 1 wherein the processor is further configured to determine a threshold number of pairs of candidate textual representations and associated concepts to be provided as output.

15. The system of claim 1, wherein the processor is further configured to:
   determine a set of linkworthiness scores for the set of associated concepts; and
   further select the at lest one representative concept according to the linkworthiness scores of the set of associated concepts.

16. The system of claim 1, wherein the processor is further configured to:
   determine a set of freshness scores for the set of associated concepts; and
   further select the at lest one representative concept according to the freshness scores of the set of associated concepts.

17. A method for determining a mapping between a textual representation in a document and a concept, comprising:
   receiving a document;
   identifying a set of candidate textual representations in the document;
   determining, for the set of candidate textual representations, a set of associated concepts included in a taxonomy of concepts;

summing a plurality of category vectors to generate a document vector, each category vector associated with an associated concept of the set of associated concepts and indicating correspondence of related concepts to the associated concept;

computing a set of document similarity scores for the set of associated concepts according to a correspondence of the category vectors corresponding thereto and the document vector;

selecting at least one representative concept of the associated concepts according to the set of document similarity scores; and providing as output the at least one representative concept and a candidate textual representation of the set of candidate textual representations corresponding thereto.

18. The method of claim 17, further comprising:
determining a set of linkworthiness scores for the set of associated concepts; and
further selecting the at lest one representative concept according to the linkworthiness scores of the set of associated concepts.

19. The method of claim 17, further comprising:
determining a set of freshness scores for the set of associated concepts; and
further selecting the at lest one representative concept according to the freshness scores of the set of associated concepts.

20. A computer program product for determining a mapping between a textual representation in a document and a concept, the computer program product being embodied in a computer readable storage medium and comprising computer instructions for:

receiving a document;

identifying a set of candidate textual representations in the document;

determining, for the set of candidate textual representation included in the set, a set of associated concept included in a taxonomy of concepts;

summing a plurality of category vectors to generate a document vector, each category vector associated with an associated concept of the set of associated concepts and indicating correspondence of related concepts to the associated concept;

computing a set of document similarity scores for the set of associated concepts according to a correspondence of the category vectors corresponding thereto and the document vector;

selecting at least one representative concept of the associated concepts according to the set of document similarity scores; and providing as output the at least one representative concept and a candidate textual representation of the set of candidate textual representations corresponding thereto.

* * * * *